Figure 1:
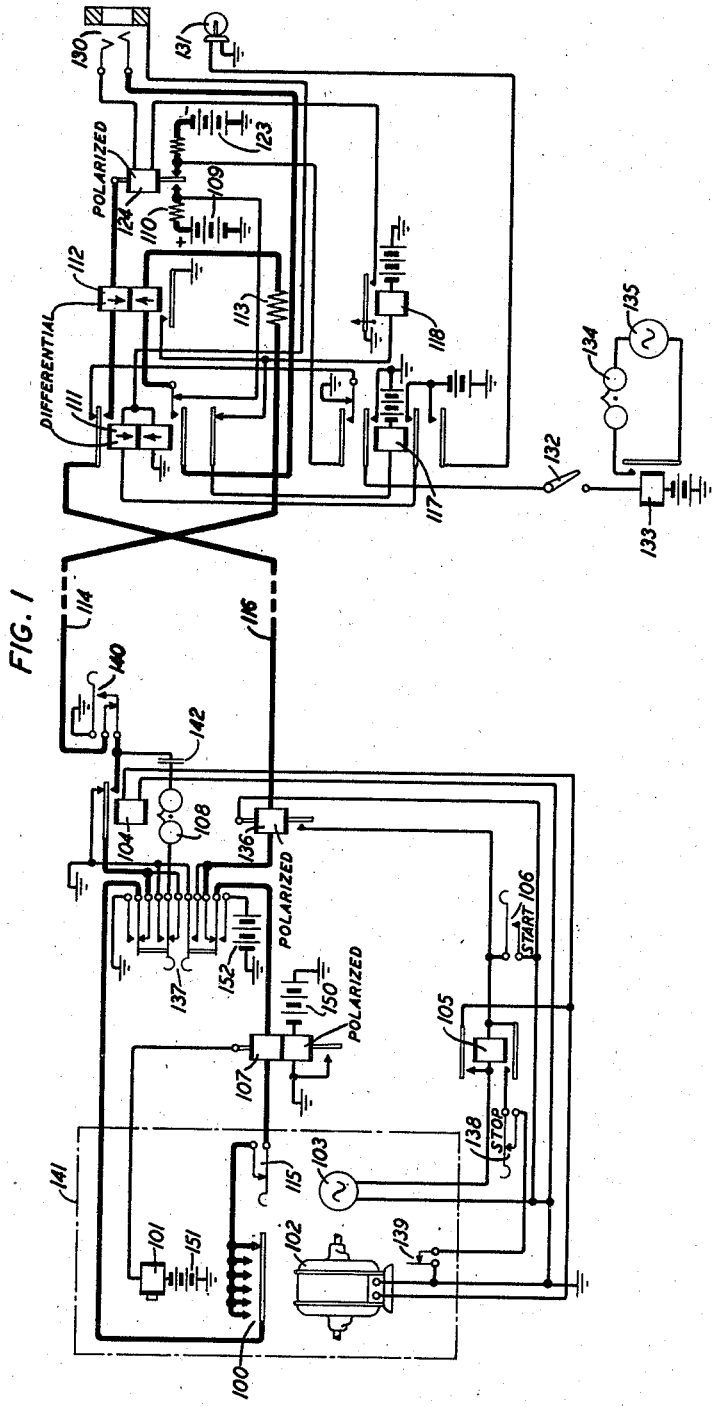
Figure 2:
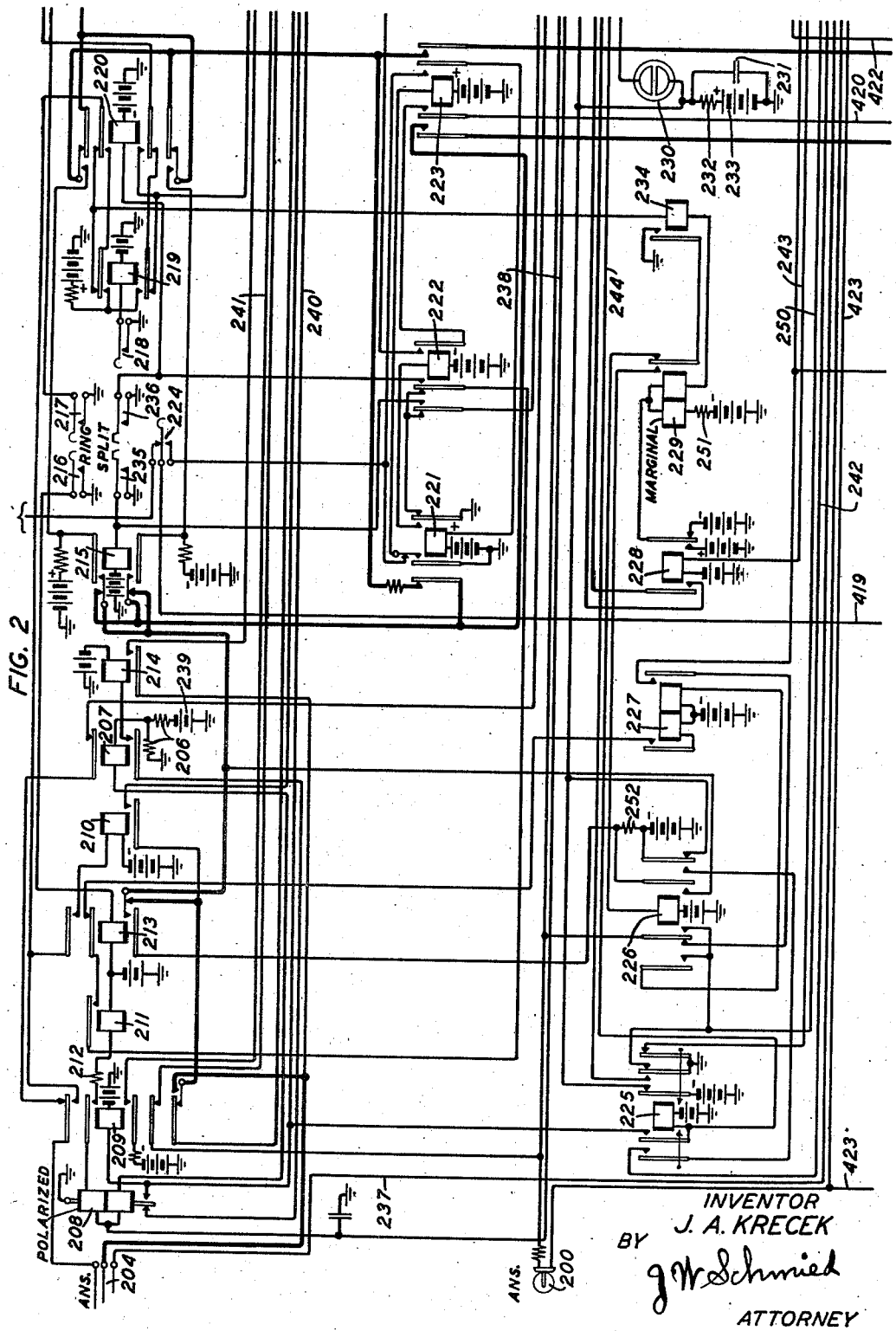

Nov. 12, 1940.     J. A. KRECEK     2,220,931
TELEGRAPH SYSTEM
Filed Oct. 22, 1938     17 Sheets-Sheet 1

INVENTOR
J. A. KRECEK
BY
J. W. Schmied
ATTORNEY

Nov. 12, 1940.    J. A. KRECEK    2,220,931
TELEGRAPH SYSTEM
Filed Oct. 22, 1938    17 Sheets-Sheet 4

INVENTOR
J. A. KRECEK
BY
J W Schmied
ATTORNEY

Nov. 12, 1940.  J. A. KRECEK  2,220,931
TELEGRAPH SYSTEM
Filed Oct. 22, 1938  17 Sheets-Sheet 5

INVENTOR
J. A. KRECEK
BY
J. W. Schmied
ATTORNEY

Nov. 12, 1940. J. A. KRECEK 2,220,931
TELEGRAPH SYSTEM
Filed Oct. 22, 1938 17 Sheets-Sheet 9

INVENTOR
J. A. KRECEK
BY
J. W. Schmied
ATTORNEY

Nov. 12, 1940.   J. A. KRECEK   2,220,931
TELEGRAPH SYSTEM
Filed Oct. 22, 1938   17 Sheets-Sheet 16
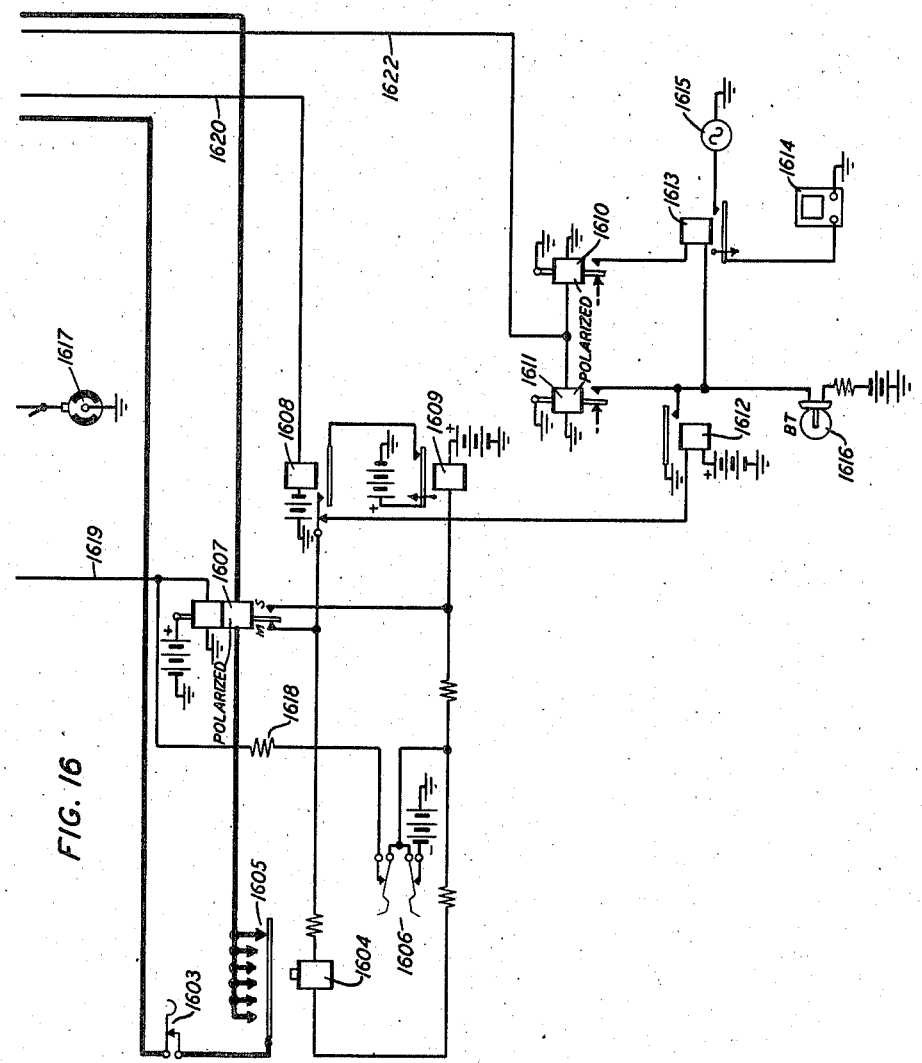
FIG. 16
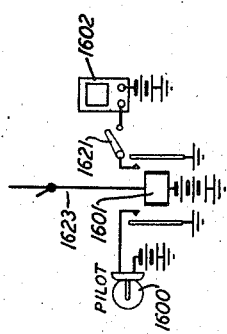
INVENTOR
J. A. KRECEK
BY
J. W. Schmied
ATTORNEY

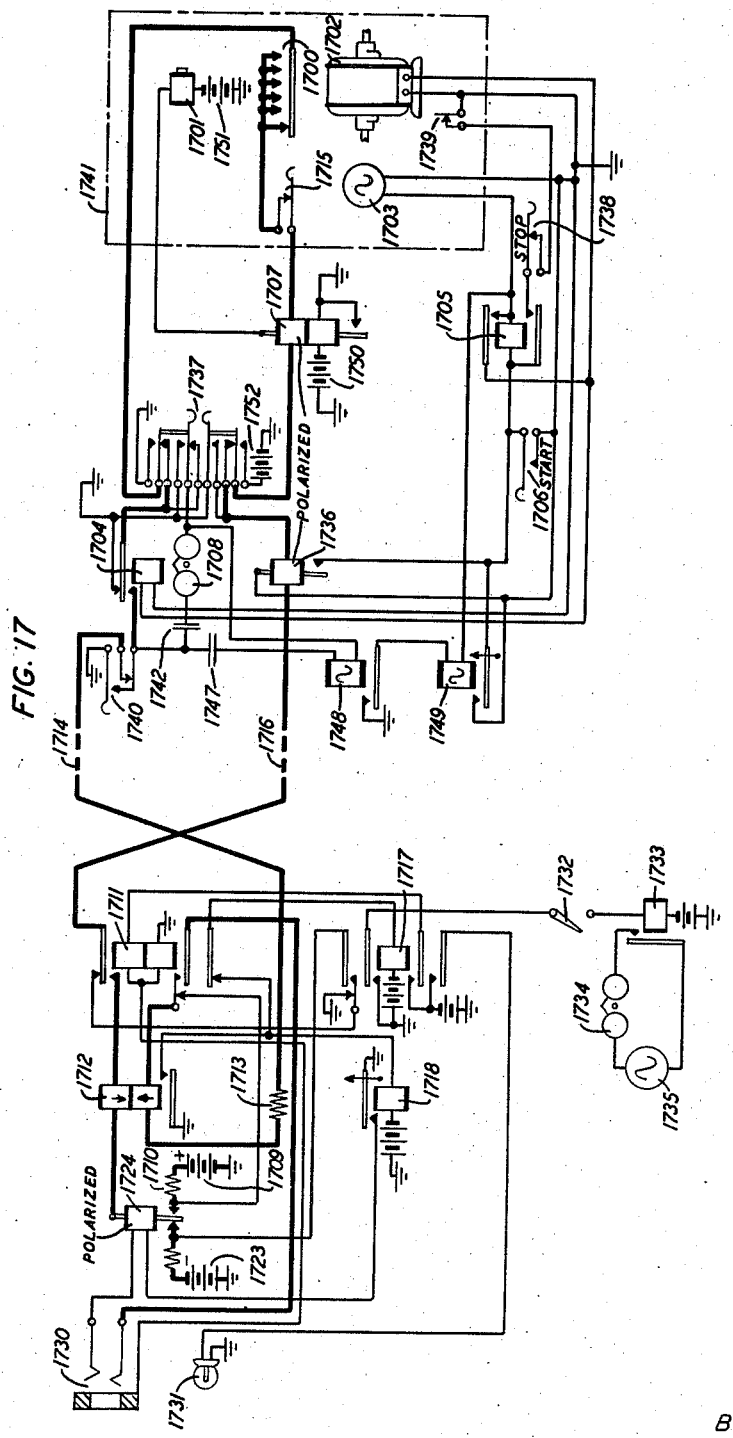

Patented Nov. 12, 1940

2,220,931

UNITED STATES PATENT OFFICE 2,220,931

TELEGRAPH SYSTEM

Joseph A. Krecek, Larchmont, N. Y., assignor to Bell Telephone Laboratories, Incorporated, New York, N. Y., a corporation of New York Application October 22, 1938, Serial No. 236,511

11 Claims. (Cl. 178—2)

This invention relates to a communication system and more particularly to supervision between switching stations of a comprehensive telegraph switching or exchange system.

Supervision signals have usually been transmitted between telegraph central exchange stations by means of break signals of different lengths, the length of the break signal determining the character of the supervisory signal. Thus the supervision was dependent largely upon the absence of any signals and then was slow and rather uncertain. In addition, these systems were usually operated on the "ring-down" basis, that is, the operator upon selecting a trunk to a distant central office would have to ring the operator at the distant office or transmit some sort of a calling signal, as for example, a break signal of some predetermined length.

An object of this invention is to provide an improved supervisory system in which supervisory signals are transmitted over a line with only slight delays and in which the supervisory signals are at all times under the positive control of the operator or subscriber.

Another object of this invention is to provide a supervisory system which operates a so-called "straightforward" method of operation. That is, the method of operation in which the mere selecting and connecting to an idle trunk by an operator automatically serves to transmit a calling signal to the distant operator at a second switching station.

Another object of this invention is to provide circuit arrangements for transmitting sufficient supervisory signals over a full duplex telegraph channel or path capable of transmitting only two current or signaling conditions to enable the first operator to maintain complete supervision of the connection or circuit.

A feature of this invention relates to the build up of a transmission circuit and supervisory signals necessary therefor through a plurality of two or more central exchanges.

Another feature of this invention relates to the transmission of all the necessary telegraph signaling impulses and also all of the necessary supervisory signal conditions over a single full duplex channel or communication path extending between the various switching stations. This communication channel is arranged to transmit only two different signaling conditions. These signaling conditions are usually referred to as the marking conditions and the spacing conditions. The marking is the condition of the circuits after a connection has been established when no signaling impulses are being transmitted. The spacing condition is the other condition.

A further feature of this invention relates to circuit arrangements for maintaining both ends of the trunk circuits extending between the various central stations in such a condition that they test busy until both ends of the circuit have been disconnected.

A further feature of this invention relates to a method of supervision over a comprehensive built-up connection such that the first or originating operator maintains complete supervision over the call and is the only operator to receive supervisory signals direct from the subscribers as well as from each of the succeeding operators employed in establishing the circuit.

Still another feature of this invention relates to providing means for by-passing supervisory signals around the operators not concerned with them and to transmitting supervisory signals capable of being so by-passed.

In circuit connections of this type involving a number of operators and circuit links or units it is desirable to provide means to indicate false operation or manipulation of the circuit and also to release the different units or sections as soon as possible so it will be available for use on another call.

It is therefore, one of the objects of this invention to indicate to the operator false or improper manipulation of the circuit.

It is also an object of this invention to provide circuit means for automatically releasing the communication circuits terminating at a switching station when they are connected together and when disconnect signals are simultaneously received from both of the communication circuits without requiring the operator to remove the connection.

In accordance with still another feature of this invention a universal cord circuit is provided which may be employed to connect two subscribers' stations together, a subscriber's station and a trunk circuit or two trunk circuits. The supervisory signals received by the operator during connections involving these various conditions are all substantially the same and the operator operates various keys in substantially the same manner. Furthermore, all the different types of service usually provided between local subscribers may be provided between distant subscribers over the cord and trunk circuits designed in accordance with this invention including automatic ringing, recall and unattended service.

The foregoing objects of features of this invention can be more readily understood from the following description when with reference to the attached drawings, in which:

Figs. 1 to 17 show the detailed circuit arrangements of a typical telegraph switching system employing three switching stations; and Fig. 18 shows the manner in which Figs. 1 to 17 are positioned adjacent to each other to form this system.

General description

In accordance with this invention a single full duplex channel or telegraph path is utilized between each of the switching stations for transmitting both of the telegraph signaling impulses and the supervisory signals between the stations. This full duplex channel may be of any type employed in the transmission of the telegraph signaling impulses including submarine cable circuits, open wire lines, full metallic telegraph lines, telegraph channels of a composite telephone and telegraph line, voice frequency carrier current telegraph channels, high frequency carrier current telegraph channels, radio telegraph channels, and multiplex telegraph channels.

These channels or lines extending between the switching stations may comprise any of the foregoing types of telegraph transmitting channels including any combinations of these types of channels. The channels may include suitable repeater circuits, suitable balancing networks, filter networks, composite sets, and compensating networks usually employed in the respective telegraph systems.

The only requirements of the channels are that they be capable of simultaneously transmitting in each direction two signaling conditions at the maximum speed necessary to transmit the telegraph signaling impulses simultaneously in both directions. These channels may include interpolating apparatus where it is necessary to secure transmission of the desired speed over the systems.

When the trunk circuits are in their idle condition, that is, they are not in use, they are maintained in their spacing condition. When an operator selects one of these trunks by inserting a calling plug in the jack associated with one end, a marking condition is transmitted to the distant exchange. When this marking condition is received it causes a calling lamp to be lighted before an operator at this distant exchange and at the same time puts a busy condition on the sleeve so that operators at non-answering positions cannot seize it before it is answered. When the operator at this distant exchange answers this calling lamp by inserting a plug in the jack associated with the distant end of the trunk a marking condition is transmitted back over the trunk from the second switching station to the first switching station or exchange. When this marking condition is received at the first switching station it causes the calling lamp in the cord circuit before the first operator to be extinguished. The first operator then transmits the necessary information to the second operator to enable her to connect the circuit either to the desired subscriber's line or to a trunk to another central exchange.

In the specific system shown in detail in Figs. 1 to 17 it has been assumed that it is necessary to establish a connection through three switching stations in order to connect the desired subscribers' stations together. It is to be understood, however, that it is within the scope of this invention to establish the connection through any number of switching stations in order to connect the desired subscribers' stations together.

The second operator upon receiving the necessary information to connect the circuit to a similar trunk extending to the third switching central station will insert the calling plug of the cord circuit in the jack of an idle line to the third switching station. When the second operator inserts the plug in the jack associated with the trunk to the third station a spacing impulse is transmitted back over the trunk to the first switching station where it causes a supervisory lamp in the cord circuit to light.

The insertion of the plug at the second switching station in the jack of the trunk extending to the third switching station causes a marking condition to be transmitted to the third switching station. This marking condition when it is received at the third switching station causes a calling lamp to light before an operator thereat. When the operator answers the call by inserting an answering plug in the jack of the trunk a marking signal is transmitted back over the trunk to the second switching station through the cord circuit at the second switching station and over the trunk to the first switching station where it causes the calling supervisory lamp to be again extinguished. This indicates to the operator at the first switching station that the circuit has been extended to an operator at the third switching station whereupon the first operator will transmit information to the third operator to enable her to connect the circuit to the desired subscriber's line.

Sometimes the first switching station is called the "originating" switching station or an "outward" switching station and the operator thereat is sometimes called an "outward operator" or "originating operator." The second switching station is sometimes called a "through" switching station and the operator a "through operator," the third switching station is sometimes called a "terminating" switching station or an "inward" switching station and the operator thereat the "terminating operator" or "inward operator." Sometimes the switching stations are all referred to as central stations or exchanges. In order to avoid confusion these stations and operators will be referred to in this specification, first, second and third switching stations or central stations and the operators as first, second or third operators.

Upon receiving the necessary information the third operator will insert the calling plug of the cord in the jack connected to the subscriber's line. This will cause the transmission of a spacing impulse back over the trunk to the second central station, through the cord of the second station and over the trunk to the first central station and cause the calling supervisory lamp of the associated cord to light.

The calling subscriber's station or bell may be rung either by the third operator by momentarily depressing her ringing key or by the first operator momentarily depressing her ringing key. The calling subscriber's station may also be rung by the second operator depressing her ringing key. However, the second operator will not receive any of the supervisory signals to indicate to her when to press this key so that she will not normally start ringing or in any way further supervise the connection except to disconnect the circuit at the termination of the transmission.

When the subscriber answers, a marking signal is transmitted from the third station through the second station back to the first station where it causes the supervisory lamp before the first operator to be extinguished and indicates to the operator that the connection has been established whereupon she will normally retire from the circuit and permit the two subscribers to communicate with each other.

Either subscriber may interrupt the transmission from the other subscriber by transmitting a break signal. A break signal comprises a long spacing signal of indefinite duration transmitted during a connection from one of the teletypewriters connected in the circuit. In order to distinguish the break signal from the supervisory signals the break signal is transmitted over the trunk circuit by a short spacing signal which in the preferred embodiment of this invention is approximately .3 second followed by the ringing current for the remainder of the break signal. The ringing current, both during the transmission of the break signal and during the ringing of a subscriber's station which is transmitted over the trunk is transmitted as a series of alternate marking and spacing impulses of substantially unit length. The ringing current transmitted during break intervals is distinguished from the ringing current transmitted for ringing the subscribers by transmitting a short spacing signal preceding the ringing current or a break signal whereas when it is desired to transmit ringing current for ringing subscribers no such short spacing signal precedes the ringing current.

When the subscribers wish to terminate communication, they may transmit disconnect signals either by operating their stop keys or transmitting suitable telegraph signals over the system which cause the operation of the automatic stop contacts at the subscriber's station. The disconnect signal is transmitted from the calling subscriber to the first operator in the normal manner. The disconnect signal is transmitted from the called subscriber to the third switching station in the same manner as on local connections except that no indication is given to the operator at this station at this time. The disconnect signal is transmitted from the third switching station over the trunk circuit to the second switching station as a long spacing signal. At the second switching station the trunk circuit is arranged to wait for approximately .4 second before repeating or relaying the disconnect signal since it must first be determined whether the spacing signal is a break signal or a disconnect signal. If the spacing signal indicates the break signal after approximately .3 second, it will be followed by ringing current or a series of impulses of alternate marking and spacing character of substantially unit length. If the signal is a disconnect signal no ringing current will be transmitted. Hence at the end of .4 second the spacing or disconnect signal is repeated and relayed through the second switching station without giving any indication to the operator at this station, over the trunk to the first switching station. Here again, the trunk circuit is arranged to wait for approximately .4 second for ringing current to determine if the signal represents a break signal or a disconnect signal. After this time interval a disconnect signal is relayed to the operator at the first switching station. Here the spacing signal causes the calling supervisory lamp to light and thus indicates to the operator that the subscribers have terminated the communication. The operator will then remove the plug from the jacks.

This returns the calling subscriber's line circuit and the cord circuit at the first switching station to their normal conditions and transmits a spacing condition representing a disconnect signal over the trunk circuit to the second switching station. After a short interval of time this disconnect signal is relayed to the cord circuit before the second switching operator, where it initiates the operation of a timing circuit comprising a condenser, a high resistance and an electron discharge tube. After a predetermined time interval, the charge on the condenser has reached the value which causes a discharge through the tube. The discharge causes the operation of certain relays which causes both of the supervisory lamps to light and indicate to the second operator that the communication has terminated, whereupon she will remove the plug from the jacks of the trunk circuits. This returns the cord circuit at the second switching station to its normal condition. Even before she removed the plug from the jack, but after the discharge is initiated through the electron discharge tube, the trunk circuits are restored to their idle conditions and become available for the use in other circuit connections.

When the first operator removes her plug from the jack of the trunk circuit extending to the second central station and transmits a spacing condition over this trunk to the second station as described above, this spacing condition in addition to causing the supervisory lamp to light before the second operator, is repeated over the trunk circuit to the third central station.

A short interval of time after the spacing condition is received at the third central station it is transmitted to the cord circuit before the third operator where it causes the answering supervisory lamp to immediately light and also initiates the operation of a timing circuit similar to that described at the second switching station.

At the end of the time interval measured by the timing circuit, the calling supervisory lamp lights and indicates to the third switching operator that the communication has terminated and that she should disconnect her cord circuit from the trunk circuit and from the subscriber's line. Here again, on the completion of the operation of the timing circuit the trunk and subscriber's line circuits are restored to normal or idle conditions so that they are available for handling other calls. When the operator removes her plugs from the jack of the trunk circuit and the subscriber's line circuit, the cord circuit is restored to its normal condition.

At the termination of communication over a circuit both ends of the trunk circuits are not normally simultaneously released. As described above, the end of the trunk circuit at the first switching station is released before the other end of this trunk at the second switching station is released. Similarly, the end of the trunk circuit between the second and third switching station at the second switching station will normally be released before the end at the third switching station is released. In order to prevent improper operation of these circuits and insure that they return to normal after each call, it is desirable to hold both ends of the trunk circuit busy until both ends have been released. Consequently, the end of the trunk circuit which is disconnected first is held busy until the other end of the trunk is disconnected.

When the last end is disconnected a short marking impulse is transmitted back over the trunk circuit to the first end. This short marking impulse serves to completely restore the trunk circuit at that end to its normal condition and removes negative potential from the sleeve of the jack associated with the trunk which had caused the trunk to test busy.

The circuits are also arranged so that either the third or the first operator may start the called subscriber's station in case he does not answer and thus permit the calling subscriber to leave a message. In case it is desired to have the first operator provide this unattended service, it is necessary to equip the called subscriber's station with remote start apparatus controlled by ringing current. In the preferred embodiment of this invention the called subscriber's station equipment is arranged to start the called subscriber's motor and otherwise condition his station equipment for the reception of telegraph signaling impulses by the continuous application of ringing current for a period of time exceeding six seconds. The operator at the first switching station may hold her ringing key operated for some period of time in excess of six seconds and thus condition the called subscriber's station apparatus.

In case the third switching operator remotely starts the called subscriber's station equipment she may do this in the same manner as for local calls.

Both subscribers may recall the first switching operator by momentarily operating their recall keys or by operating their stop keys and then their starting keys. The recall signal is transmitted from the calling subscriber's station in the same manner as for local calls. The recall signal is transmitted from the called subscriber's station in the same manner as a disconnect signal followed by an answering signal.

In case either or both subscribers have disconnected, the operator at the first switching station may recall either or both of the subscribers by operating the proper ringing keys. Under special circumstances or in case of trouble, any of the operators may recall either of the subscribers. Normally, however, only the first operator receives the disconnect signals, so that she would be the only one who would normally recall either of the subscribers.

The first switching operator may recall the third switching operator by momentarily operating her unattended start key. This causes a spacing signal to be transmitted over the trunk circuit to the second switching station where it is repeated over the trunk circuit to the third switching station. After a short interval of time this spacing signal is repeated to the cord circuit before the third switching operator where it causes the answering supervisory lamp to light. When the first operator releases the unattended start key a marking condition is transmitted over the trunk circuit to the second switching station where it is repeated over the trunk circuit to the third switching station. This marking condition when it arrives at the third switching station causes certain relays to function and they in turn cause the answering supervisory lamp before the third switching operator to flash. This indicates that the first switching operator desires to communicate with her whereupon the third switching operator will operate her typing key and communicate with the first switching operator. The operation of the typing key by the third switching operator extinguishes the calling supervisory lamp.

Under special circumstances or trouble conditions, the third switching operator may also recall the first switching operator in a similar manner by momentarily operating her unattended start key. At these times when either the first or third switching operator operates her unattended start key it may be considered desirable for them to also operate their splitting keys so that the signals are transmitted in only one direction from the cord circuits.

The trunk circuits are arranged so that if any of the operators accidentally removes a plug from a jack of any of the trunk circuits before a disconnect signal is received the calling lamp associated with the trunk will flash and thus indicate to the operator that she has improperly operated the circuit whereupon she must reinsert the plug and thus reestablish connection.

It is, however, possible for any of the operators to transmit a disconnect signal over the system by removing her plug from the jack without receiving any disconnect signal from either of the subscribers or another operator. To accomplish this the operator must first operate her unattended key and then remove her plug from the jack of the trunk while she holds this key operated. This serves to transmit a disconnect signal to the distant operator who will then disconnect her cord circuits. During the normal operation of these circuits only the first operator will transmit disconnect signals to the other operators in this manner. However, under special circumstances or under trouble conditions any of the operators may send disconnect signals in this manner.

Thus the operator at the first switching station receives all of the supervisory signals direct from the subscribers while the operators at the other switching stations do not. In addition, the signals are at all times positively maintained by the condition of the circuits and are not dependent upon the length of the spacing or break signals transmitted over the system.

A detailed circuit operation of the system shown in Figs. 1 to 17 when arranged as shown in Fig. 18 will now be described.

*Normal condition*

Figure 3:
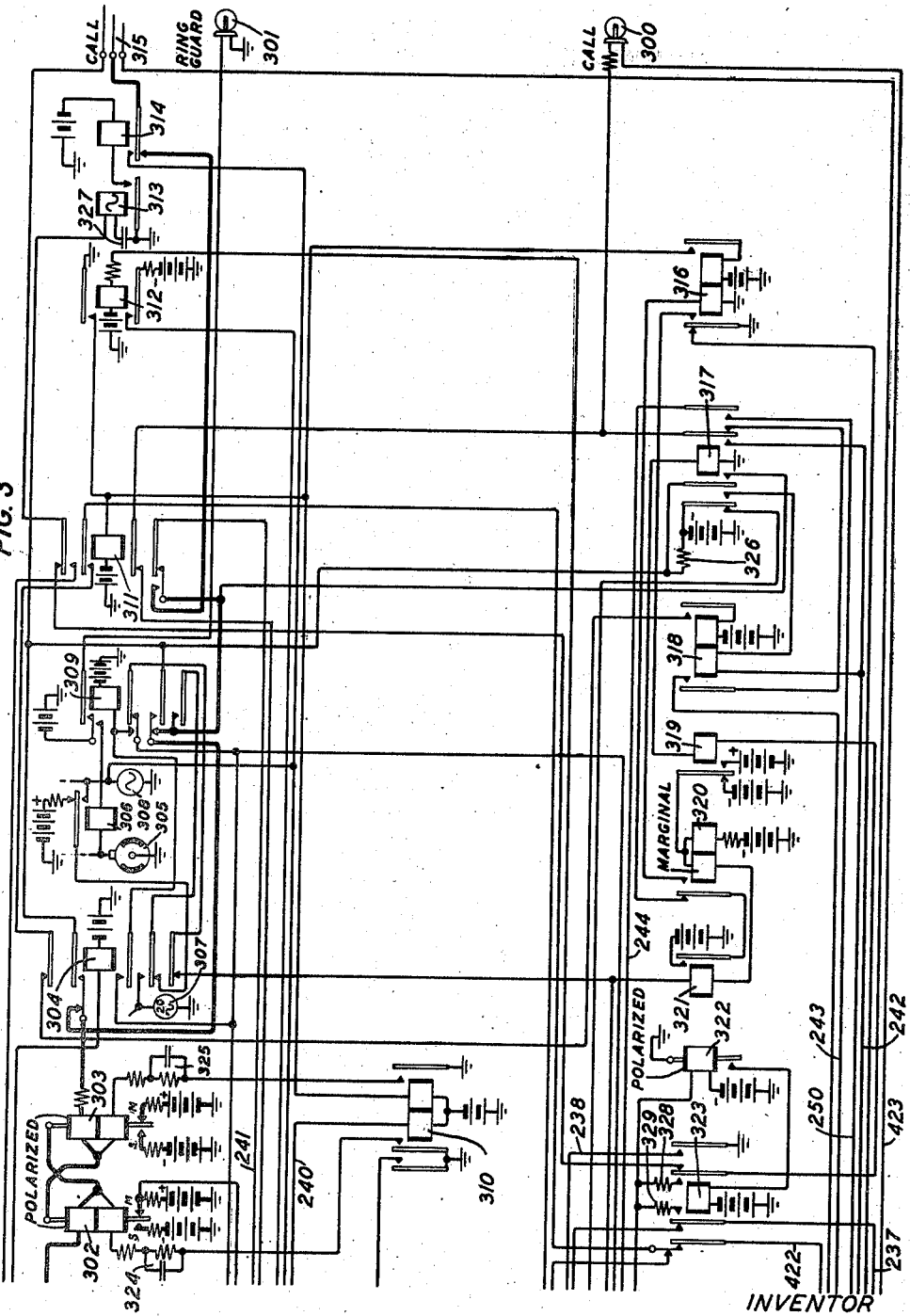
Figure 4:
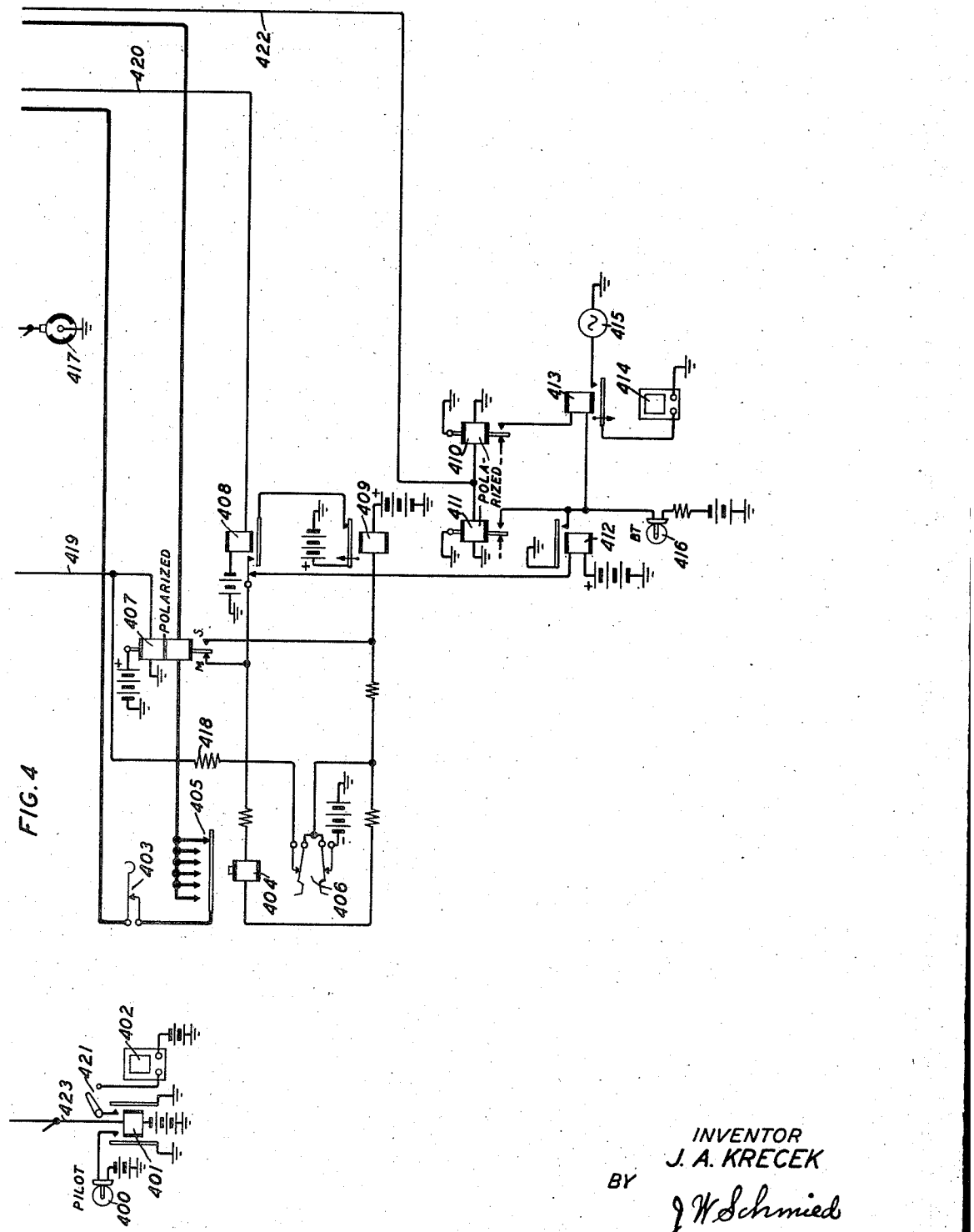
Figure 5:
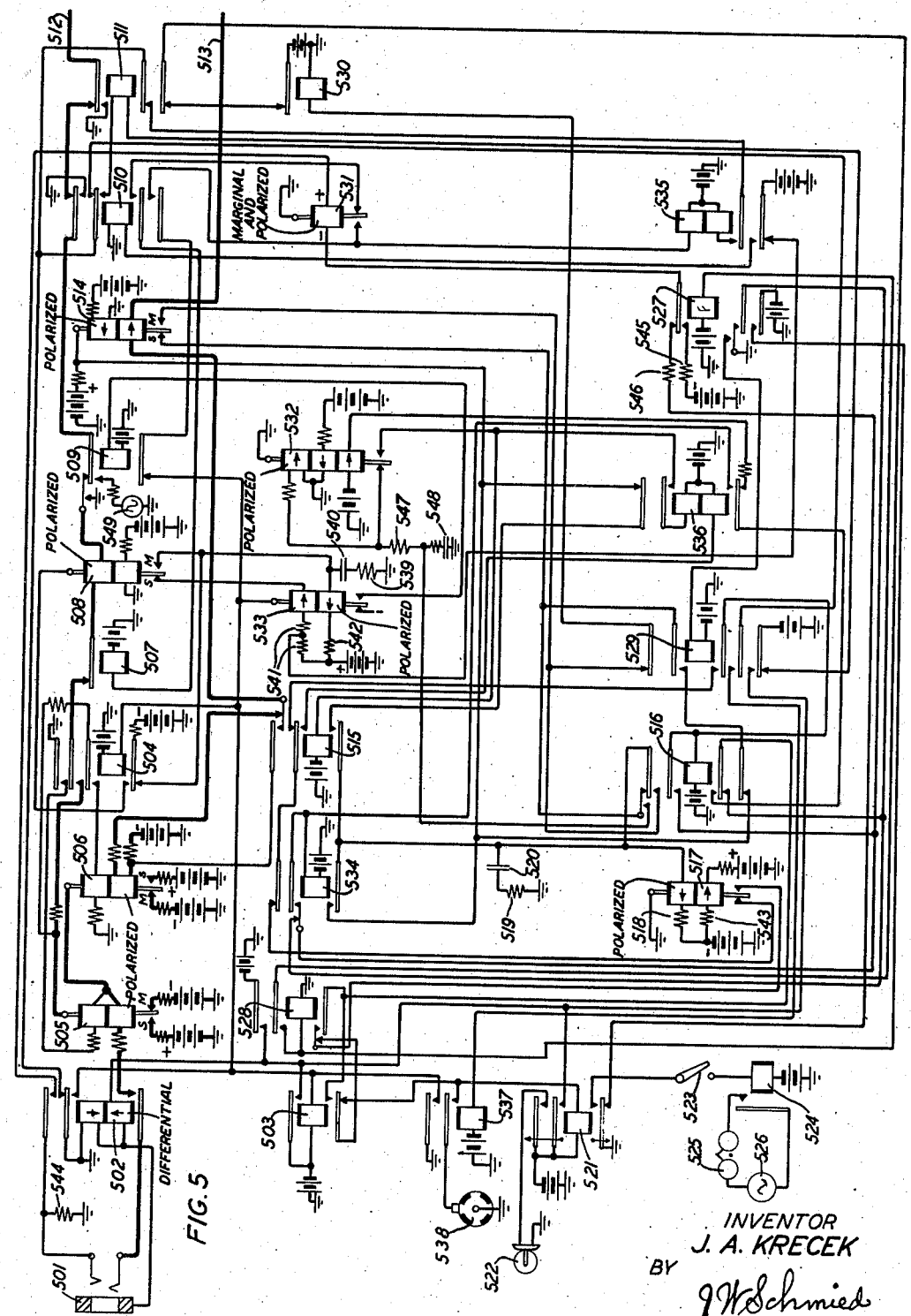

During the idle or normal condition, most of the relays normally assume the positions shown. In addition, certain of the relays are maintained in the position shown by current flowing through certain of their windings. For example, relay 401 of the operator's position circuit shown in Fig. 4 is maintained in the position shown when the position is occupied and the battery key 406 operated in a circuit from battery through the contacts of key 406, resistance 418 and the upper winding of relay 401 to ground. During the time the operator is not answering any call, the remaining circuits of the windings of relay 401 are incomplete. Consequently, the current flowing in the above-described circuit through the upper winding of relay 401 maintains this relay in its marking position as shown on Fig. 4 of the drawings. The repeating relays 302 and 303 shown in Fig. 3 are usually resting in the position shown in the drawings. However, they may be in their other position during idle condition. The condition of these relays, however, during idle periods is immaterial. Corresponding relays in Figs. 9, 10, 15 and 16 are similarly maintained in the same positions. Similarly, relay 514 shown in Fig. 5 is maintained in its spacing position by current flowing in an obvious circuit through its upper winding and relay 508 is maintained in the position shown by current flowing in an obvious circuit through its lower winding. The lower winding of relay 514 has negative battery connected to both of its terminals. The left-hand terminal is connected to negative battery through the contacts of relay 515 and the lower winding of relay 506 while the right-hand terminal is connected to negative battery over conductor 513 and the spacing contacts of relay 604. The circuit of the upper winding of relay 508 is open at the upper contacts of relay 504 so no current can flow through its upper winding. Relay 532 is maintained in the position shown by current flowing in an obvious circuit through its center winding. The circuit of the lower winding of this relay is normally open at lower contacts of relay 516 while the upper winding of this relay has ground connected to both of its terminals. These windings, other than the center winding, therefore, produce no effect upon a relay during the idle condition of the circuit.

Relay 533 is maintained in the position shown by current flowing through its lower winding from positive battery through resistance 542, the lower winding of relay 533 to negative battery through the lower contacts of relay 504. The circuit through the upper winding of this relay is open at the lower contacts of relay 504. Relay 517 is normally maintained in the position shown during the time the circuit is in the normal or idle condition by current flowing through its upper winding in a circuit from negative battery through resistance 518, the upper winding of relay 517, the upper break contacts of relay 516, spacing contacts of relay 514 to positive battery. It is noted that current also flows in an obvious circuit through the lower winding of relay 517 during this time. This current produces a magnetic effect on the relay, which is opposite to the effect of the current flowing through its upper winding. However, resistances 518 and 543 are so proportioned with respect to each other and the other constants of the windings of relay 517 that the magnetic effect of the current flowing through the upper winding of relay 517 overpowers the magnetic effect of current flowing through the lower winding of this relay and causes the relay to normally remain in the position shown in Fig. 5.

Relays 505 and 506 will normally remain in the positions shown in the drawings. However, they may on occasion remain in the opposite position without materially affecting operation of the circuit.

Figure 7:
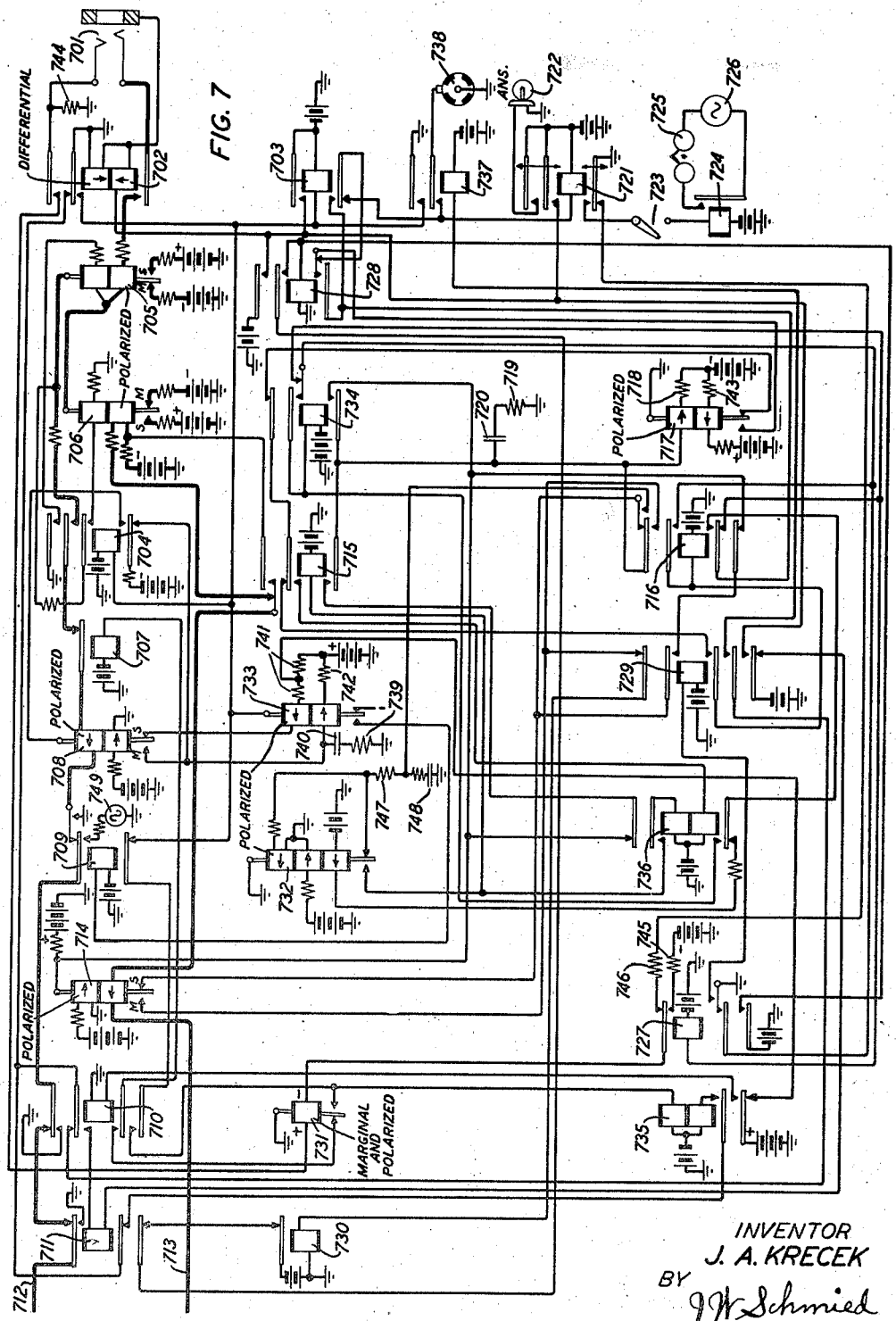
Figure 8:
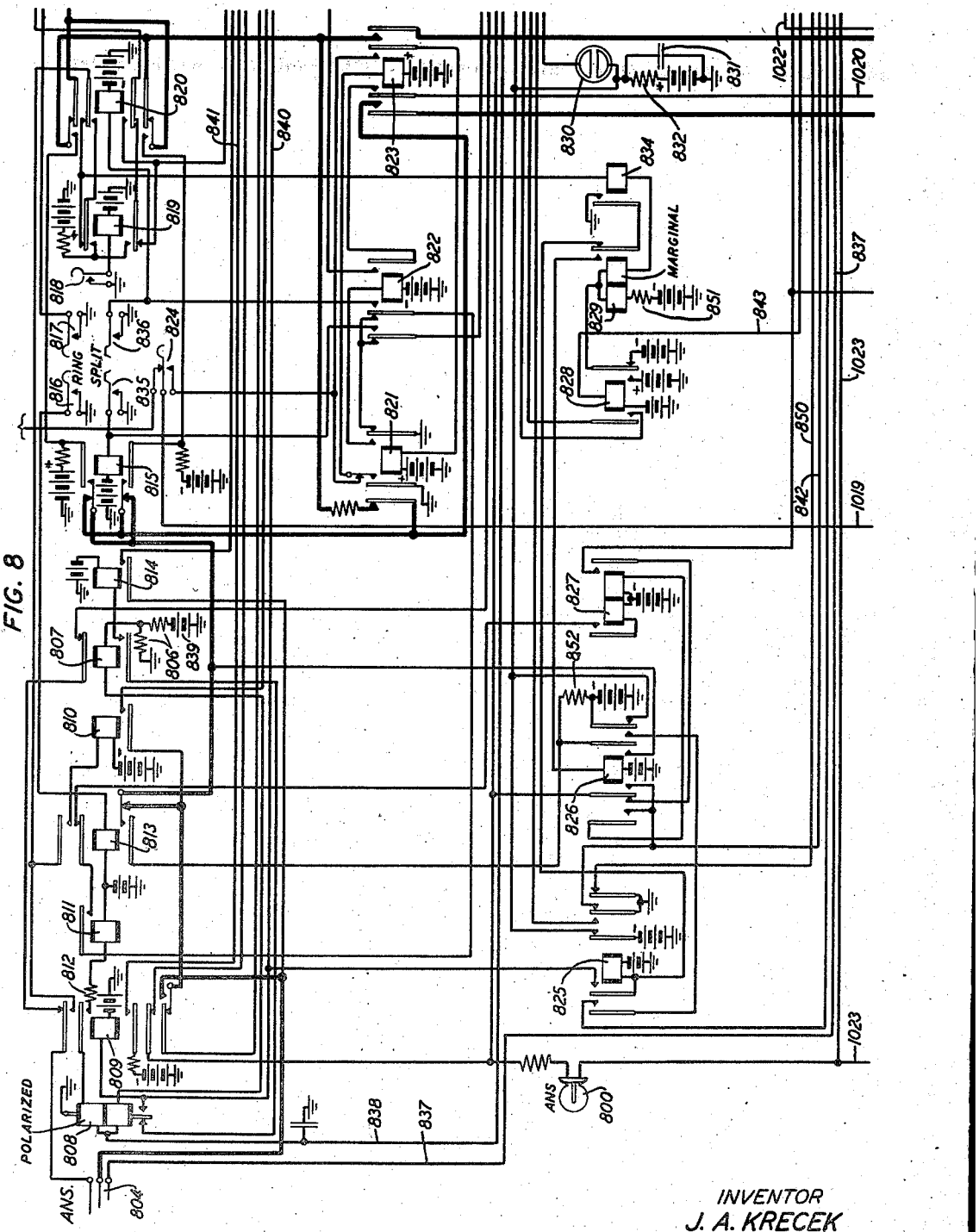
Figure 9:
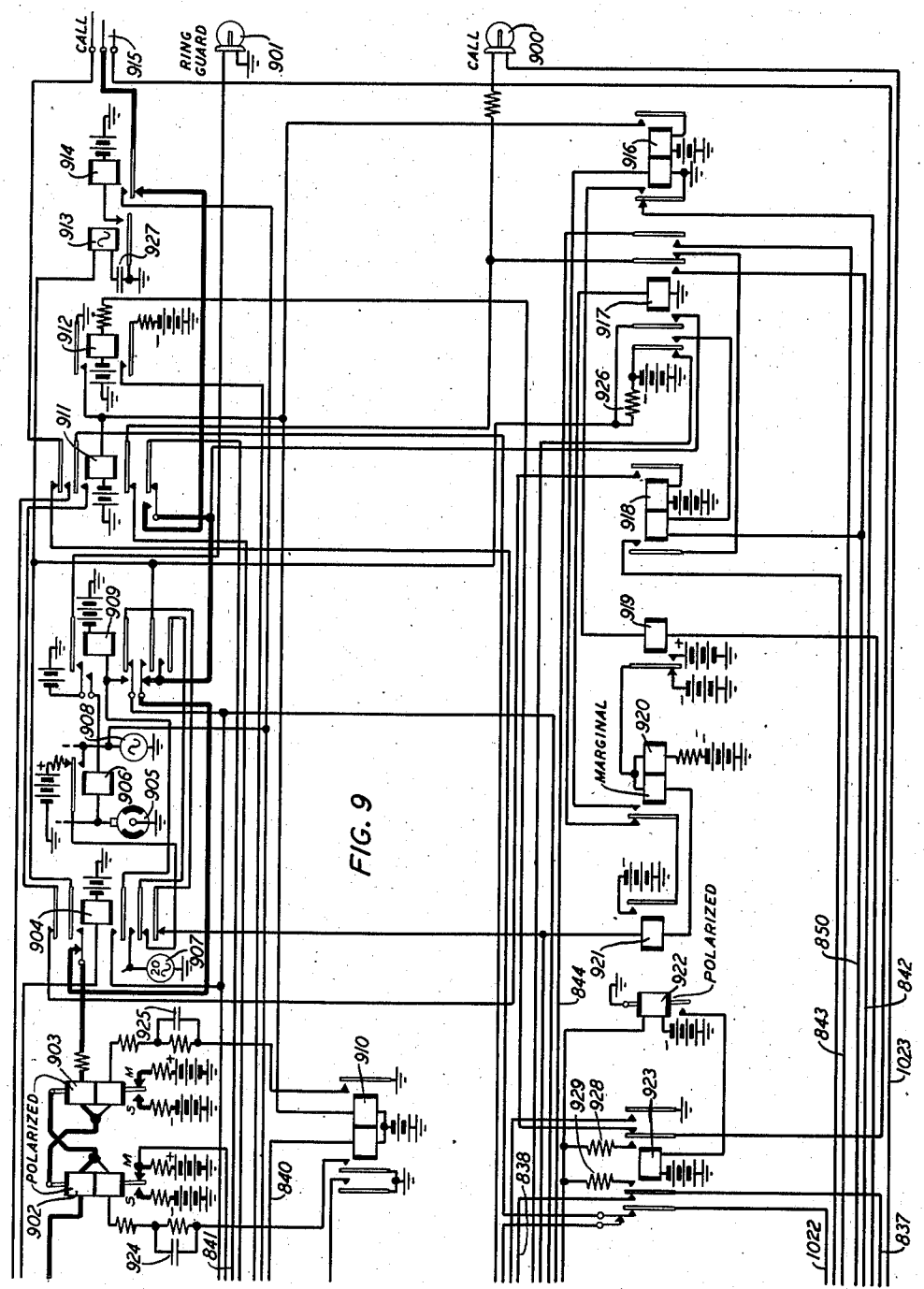
Figure 10:
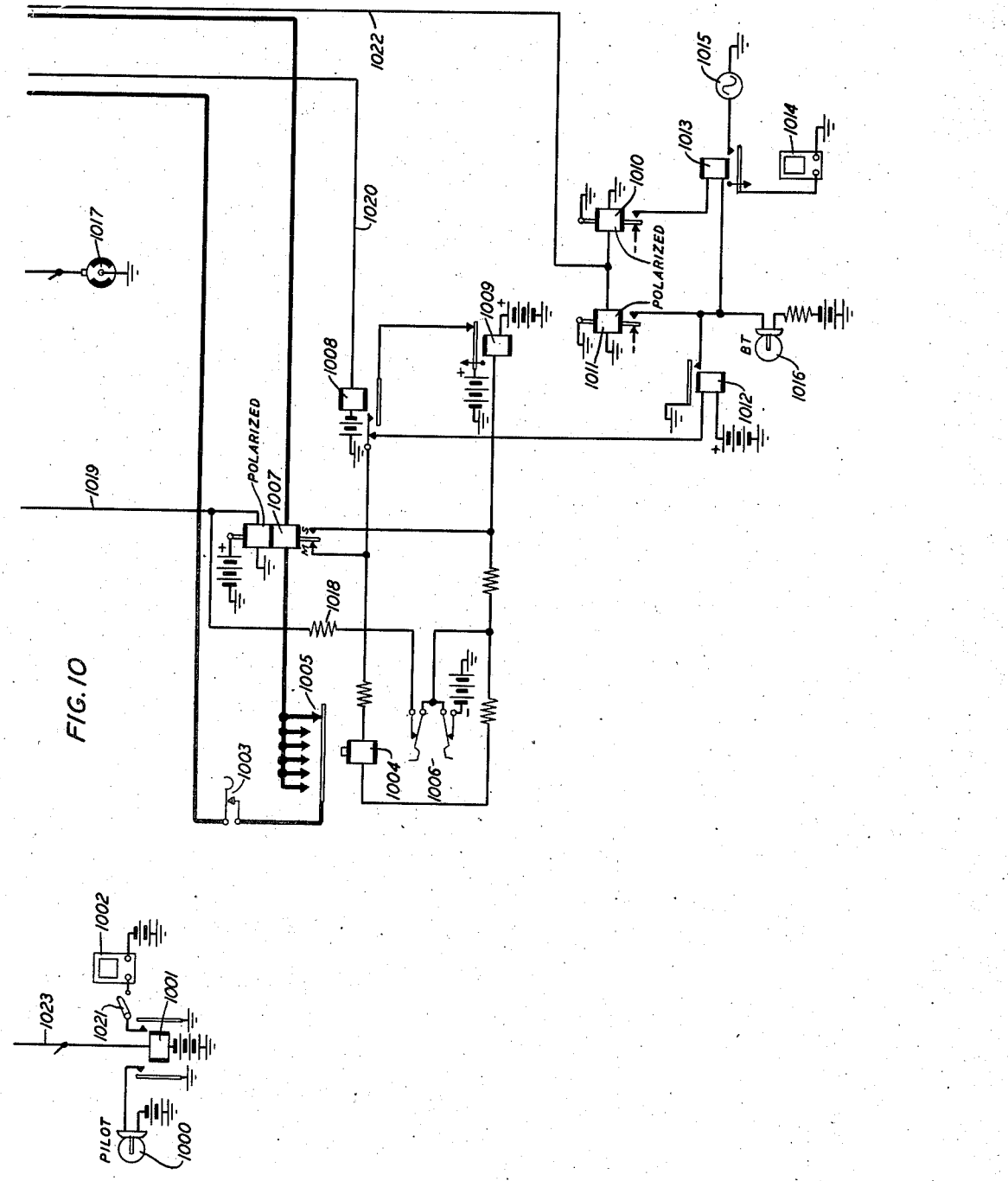
Figure 11:
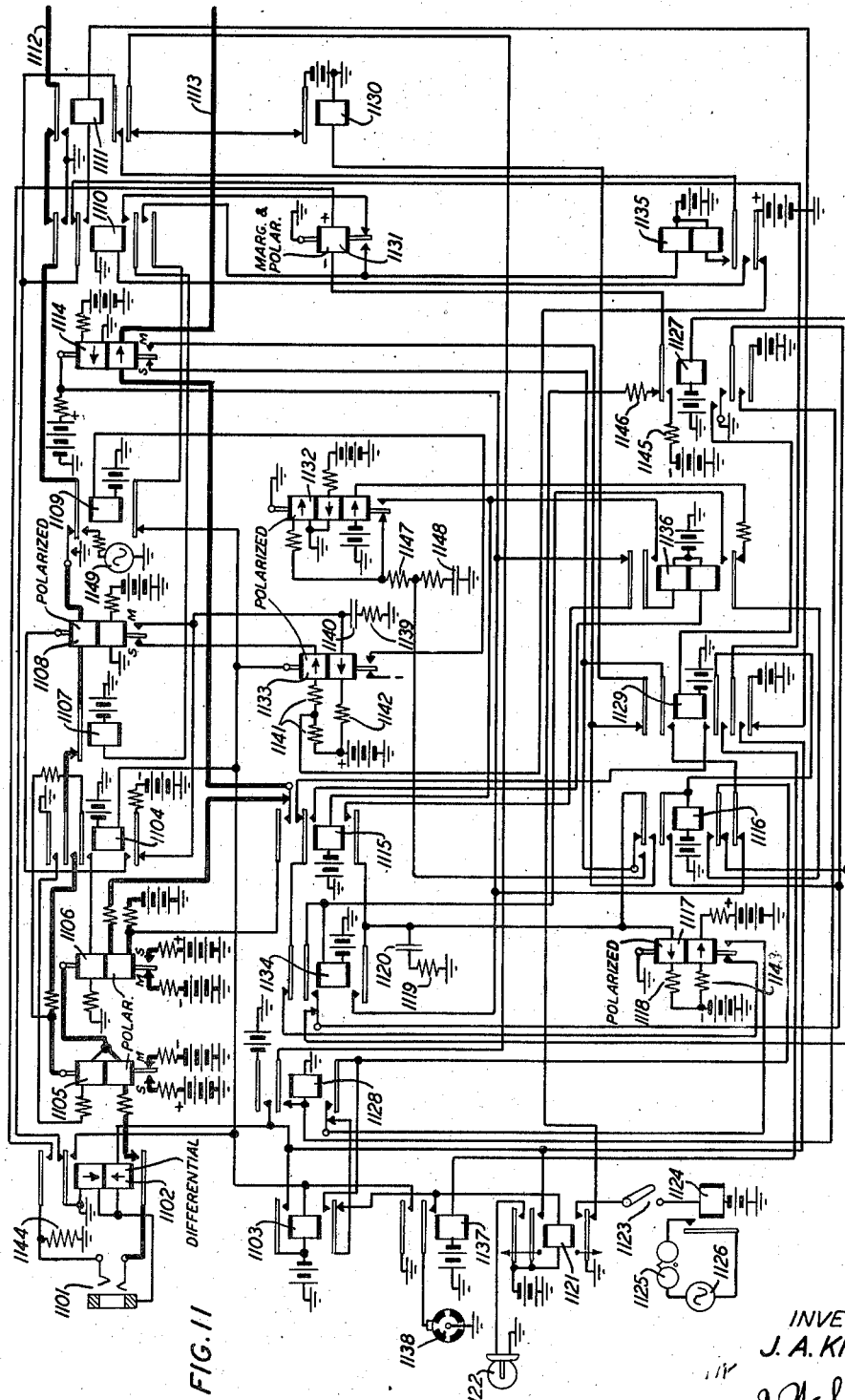
Figure 13:
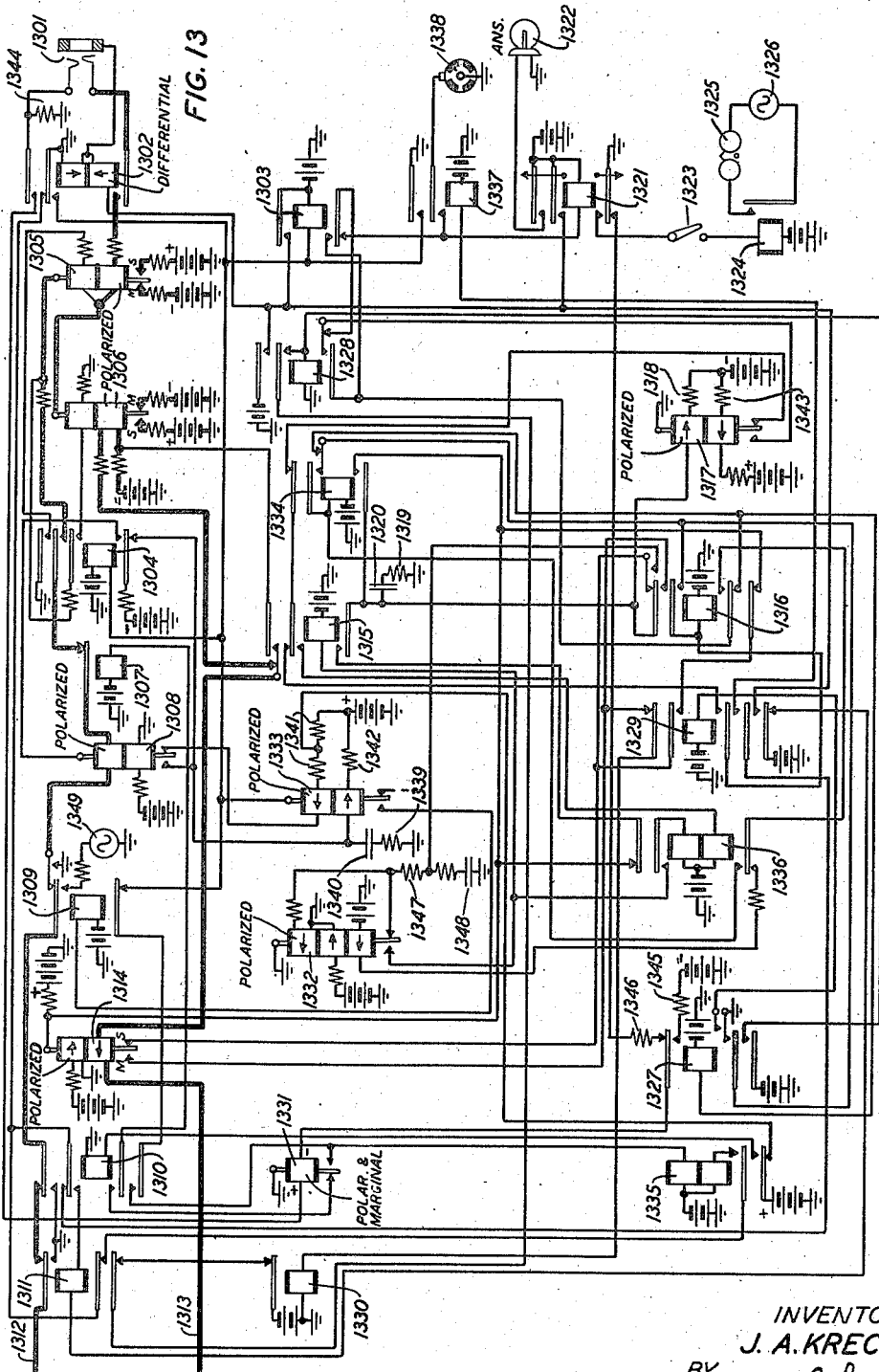
Figure 14:
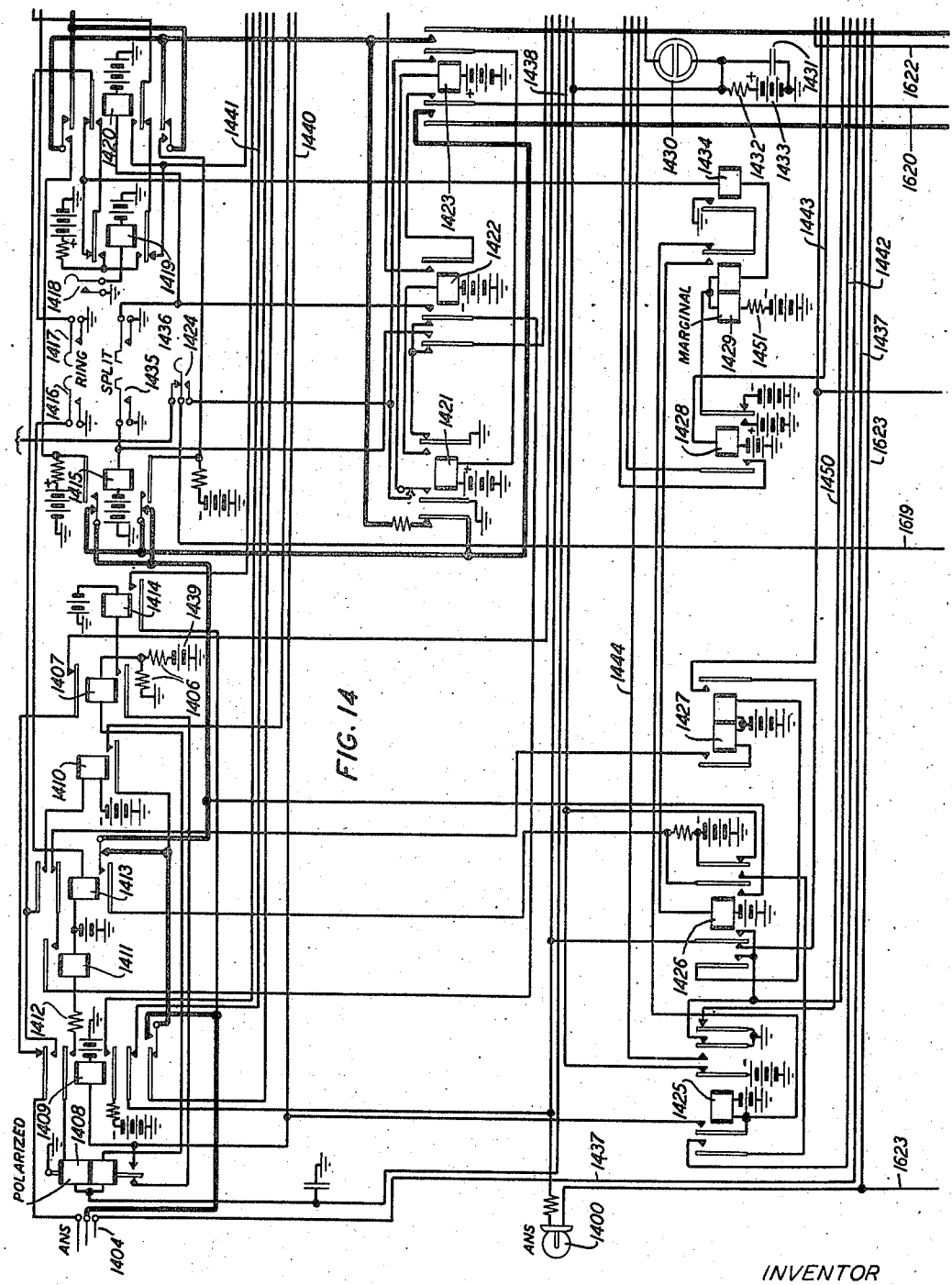
Figure 15:
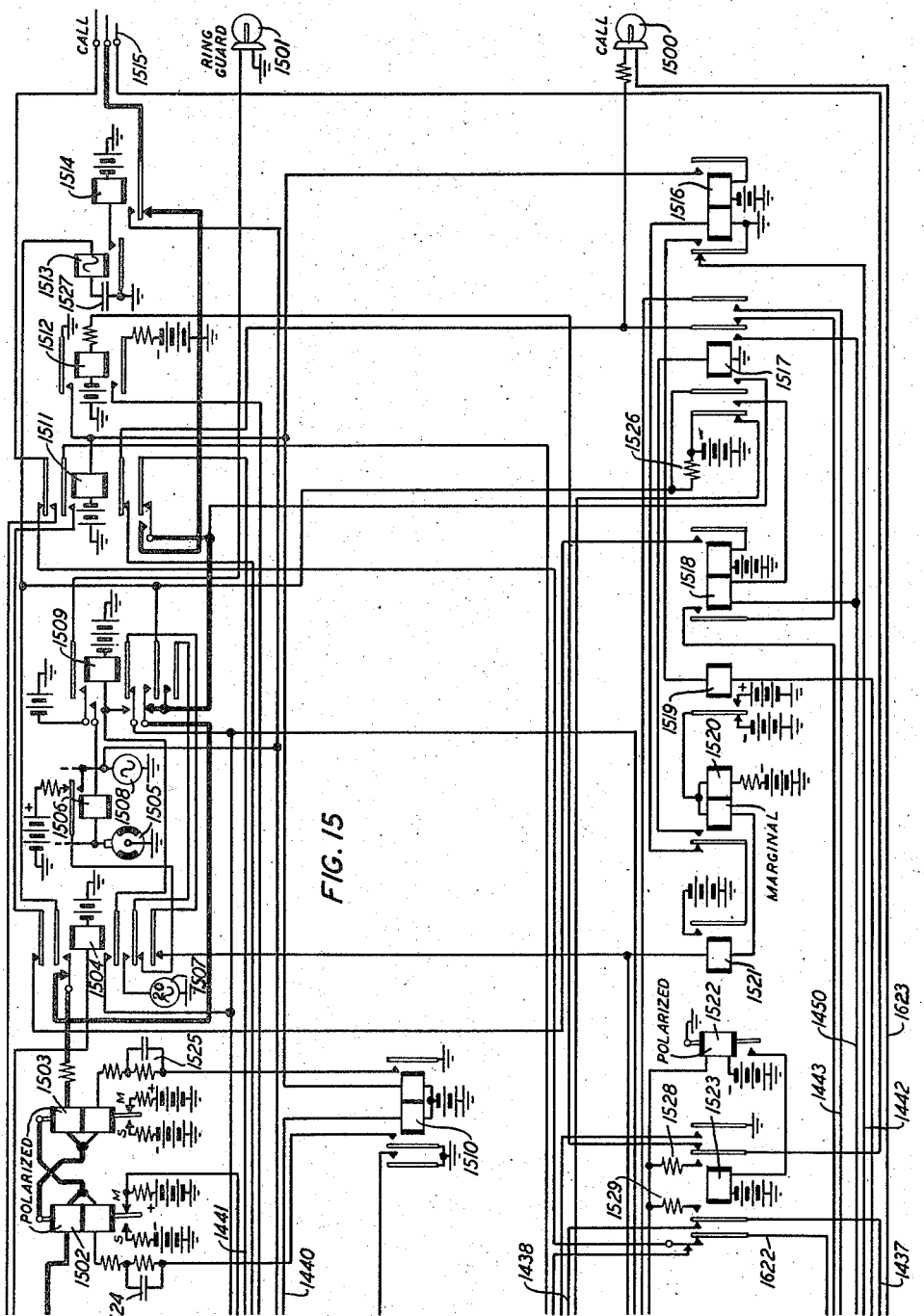

Corresponding relays of Figs. 7, 11 and 13 are similarly maintained in the position shown in the drawings by current flowing through similar circuits.

Figure 6:
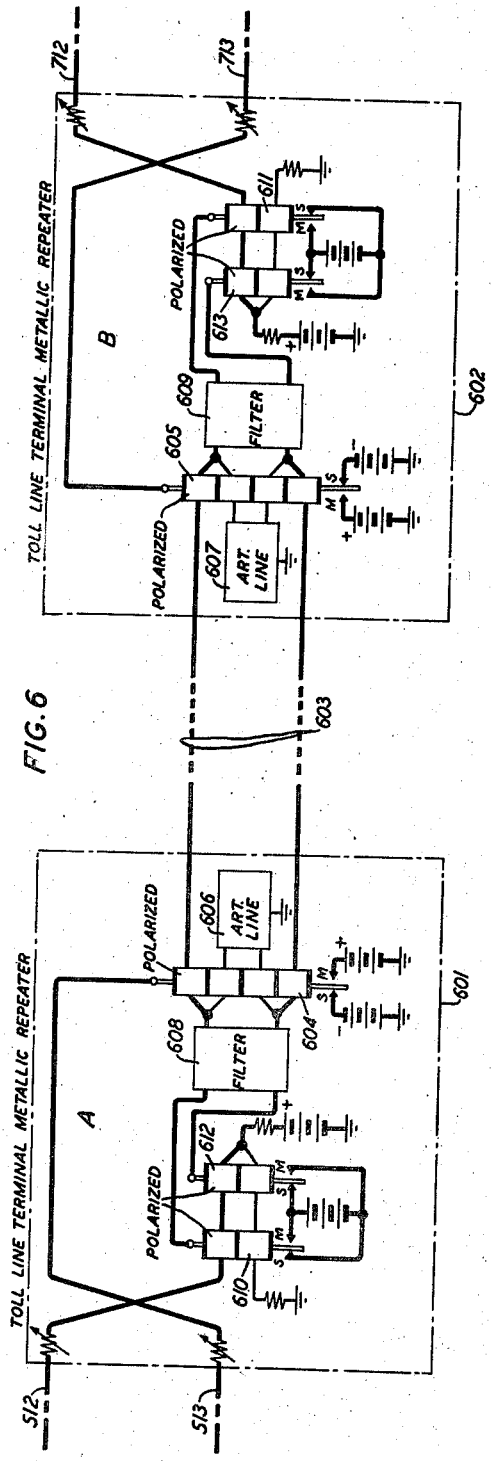

Relays 610 and 612 shown in Fig. 6 are maintained in the spacing position during idle periods by current flowing in an obvious circuit through the lower windings of these relays. The circuit of the upper windings of these relays is opened at the upper contacts of relay 504. Consequently, no current flows through the upper windings of these relays at this time. Relays 611 and 613 are similarly maintained in their spacing positions as shown on the drawings by an obvious circuit through their lower windings. The upper windings of these relays are open at the upper contact of relay 704.

Figure 12:
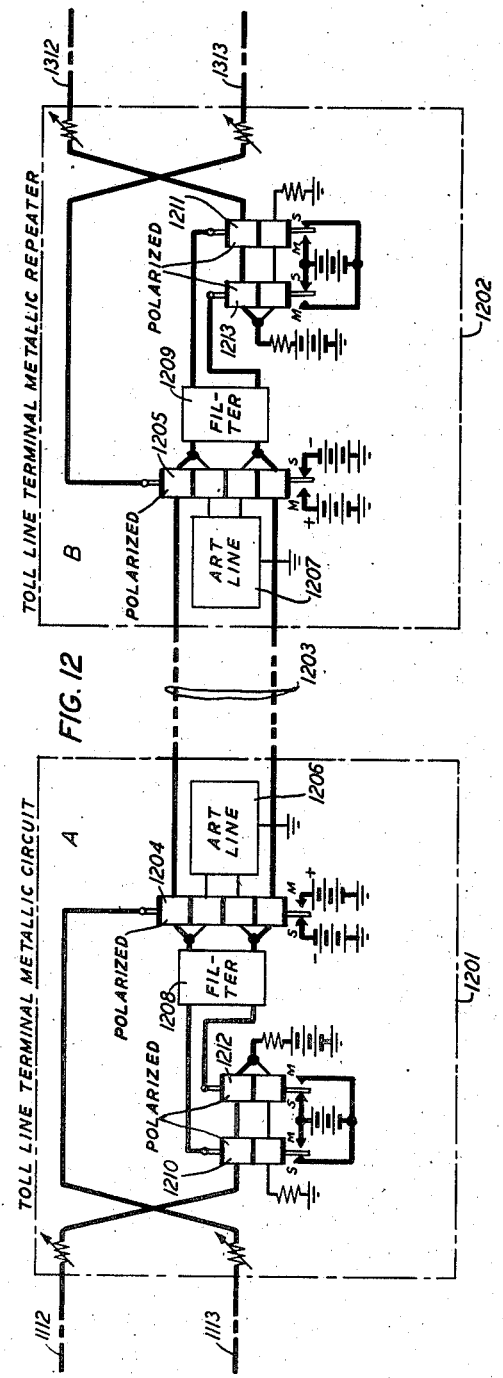

Relays 610 and 612 in their spacing position maintain relay 605 connected to the opposite end of line 603 in its spacing position. Similarly, relays 611 and 613 while in their spacing positions maintain relay 604 of the repeater 601 in its spacing position. The corresponding relays of Fig. 12 are also maintained in their spacing positions in a like manner.

Sources of potential 150, 151 and 152 are usually supplied by a rectifier or motor-generator set connected in parallel with motor 102. Consequently, during idle conditions when the circuit of motor 102 is deenergized, the rectifier or motor-generator will likewise be deenergized so no sources of potential will be provided for the circuits supplied by these sources of potential. Consequently, relay 107 may be in either position during the idle condition without materially affecting the operation of the circuits of the system.

*A subscriber originates a call*

Assume now that a subscriber located at the station, shown in Fig. 1, desires to originate a call for a subscriber located in a distant city shown in Fig. 17. The subscriber will operate the start key 106 of station 1. This completes a circuit for the operation of relay 105 from one terminal of source 103 through the winding of relay 105 and the contacts of key 106 to the other terminal of source 103. Relay 105 when operated completes a circuit for locking itself operated from one terminal of source 103 through the winding of relay 105, lower operated contacts of relay 105, contacts of stop key 138, and the automatic stopping contacts 139 to the opposite terminal of source 103. Relay 105 in operating also connects source 103 to motor 102 and also to relay 104. If sources of potential 150, 151 and 152 are supplied by rectifier or motor-generator, the operation of relay 105 will also connect source 103 to this equipment to supply power for these sources of potential. When motor 102 is connected to source 103 it becomes energized and starts to rotate, thus conditioning the subscriber's teletypewriter 141 for the transmission and reception of telegraph signaling impulses.

The operation of relay 104 completes a circuit for the operation of relay 112 in the subscriber's line circuit equipment located at the central office from positive battery 109 through resistance 110, lower inner break contacts of relay 111, lower winding of differential relay 112, conductor 114 to the subscriber's station, normal contacts of key 140, operated contacts of relay 104, upper contacts of key 137, contacts 100 of the transmitting apparatus, break contacts 115, upper winding of relay 107, lower contacts of key 137, winding of relay 136, conductor 116 back to the central station, the upper break contacts of relay 111 to ground through the upper break contacts of relay 117. The operation of relay 112 in the above circuit completes the circuit for the operation of relay 117 from ground through the operated contacts of relay 112, the lower break contacts of relay 111 to battery through the winding of relay 117. Relay 112 in operating also completes a circuit for the operation of relay 118 which performs no function at this time.

The operation of relay 117 connects battery in an obvious circuit to the calling lamp 131 for lighting this lamp and indicating to the operator that the subscriber located at the station shown in Fig. 1 wishes to initiate a call. The operation of relay 117 also substitutes negative battery for the ground connected to relay 117 through the upper contacts of relay 111, thus providing more current for the subscriber's loop and providing ample margin for the operation of relay 107 at the subscriber's station. Relay 117 in operating also connects battery through its lower inner operated contacts through the upper and lower winding of relay 111 to ground. These windings are connected in opposition so that the current flowing in this circuit does not cause relay 111 to operate at this time. By connecting battery to the upper winding of relay 111, a negative potential is caused to appear at the junction point between these two windings, which point is connected to the sleeve of jack 130. This negative potential is applied to the sleeve to indicate to any operators who may have a call directed to the station shown in Fig. 1 that the line is busy since a negative potential is applied to the sleeve of jack 130 and all jacks connected in multiple therewith.

During periods of light traffic it is sometimes desirable to connect an audible signal or night alarm to the system to indicate that the subscriber wishes to originate a call, in addition to lighting lamp 131. In this case, switch 132 is closed. Then when relay 117 operates as described above, a circuit is completed for the operation of relay 133 from ground through the upper inner contacts of relay 117, switch 132 to battery through the winding of relay 133. Relay 133 in operating completes an obvious circuit from the source of ringing current or other energy source 135 to the ringer, bell or audible signal device 134.

The operator answers

The operator noting lighted lamp 131 inserts plug 204 in jack 130. In case other lamps are connected in parallel with lamp 131 and more than one operator attempts to answer the call, the operation of the circuits are as described in Patent 2,073,468 granted March 9, 1937, to K. E. Fitch. The detailed operation of the circuits under these conditions has been described in detail in this patent and will not be repeated here. However, this description of the operation of the circuits under these conditions is hereby incorporated into this application as if fully included herein.

As described in said patent, assuming only one operator answers by inserting plug 204 in jack 130 a circuit is completed for the operation of relays 111 and 208 from the negative potential 239, the potentiometer comprising resistances 206, winding of relay 207, lower winding of relay 208, conductor 238, left-hand normal contacts of relay 323, conductor 237, sleeve of plug 204, sleeve of jack 130, to battery and ground from the potentiometer comprising the windings of relay 111. Current flowing through this circuit causes the operation of relays 111, 208 and 207. Relay 208 in operating completes an obvious circuit for the operation of relay 209 and also a circuit for the operation of relay 310 from battery through the left-hand winding of relay 310, lead 240 to ground through the operated contacts of relay 208. Relay 207 performs no useful function in operating at this time. The operation of relays 310 and 209 condition the repeating relays 302 and 303 for repeating telegraph signals and causes them to move to their marking positions if they have previously been resting in their spacing positions.

The operation of relay 209 transfers the tip conductor of plug 204 from the operator's busy test circuit to the windings of relays 234 and 229. Relay 209 also connects the upper winding of relay 208 to negative battery through the winding of relay 211. Negative potential connected to the upper winding of relay 208 in this circuit alters the potential upon the sleeve of jack 130 and in jacks connected in multiple therewith so as to prevent the operation of a second relay 208 in case a second operator attempts to answer the call as described in the above-identified patent. Relay 211 also operates in this circuit but performs no useful function at this time. Relay 209 in operating extends the transmission circuit from the ring conductor of plug 204 to the upper winding of relay 302 through the lowermost operated contacts of relay 209, lower normal contacts of relay 213, normal contacts of relay 215, normal contacts of relay 221, normal contacts of relay 220 to the upper winding terminal of relay 302. Relay 209 also connects negative battery to the upper winding of relay 303 through its innermost lower contacts, lead 241, lowermost break contacts of relay 311, break contacts of relay 309, upper break contacts of relay 304 to the upper winding terminal of relay 303. The operation of relays 209 and 310 thus completely conditions relays 302 and 303 for repeating telegraph signaling impulses and causes them to assume or remain in the positions shown in the drawings.

Either before or after the operator has inserted plug 204 in jack 130 she will operate the teletypewriter or listening key 224. This completes a circuit for the operation of relay 223 from positive battery through the winding of relay 223, the inner left-hand normal contacts of relay 221, operated contacts of teletypewriter key 224, lead 419, resistance 418, contacts of key 406 to negative battery. Relay 223, in operating, completes a circuit for the operation of relay 221 from positive battery through the winding of relay 221, the right-hand inner operated contacts of relay 223, the lower operated contacts of key 224, lead 419, resistance 418, contacts of key 406 to negative battery. Relay 221, in operating, completes a locking circuit for holding relay 223 operated from ground through its left-hand operated contacts to positive battery through the winding of relay 223. At the same time relay 221 interrupts the operating circuit of relay 223. Relay 221, in operating, also completes the operating circuit for relay 222 from ground through its right-hand operated contacts to battery through the winding of relay 222.

When the teletypewriter key 224 is operated, connecting positive battery first through the winding of relay 223 and then through the winding of relay 221 to lead 419 as described above, the potential applied to the upper winding of relay 407 is reversed. This is accomplished by adjusting the value of resistance 418 so that it exceeds the value of the resistance of the winding of relay 221. When the potential applied to the upper winding of relay 407 reverses it causes a reverse current to flow therethrough which in turn tends to cause relay 407 to move to its spacing position.

However, the operation of relays 223, 222 and 221 as described above completes additional circuits to the position equipment, as shown in Fig. 4. The operation of relays 223 and 221 inserts the break key 403, the contacts 405 of the operator's transmitting apparatus and the lower winding of the receiving relay 407 in series with the transmission circuit between the ring of plug 204 and the upper winding of the repeating relay 302. Under this condition the transmission circuit may be traced from the ring of plug 204 through the lowermost operated contacts of relay 209, the unoperated lower contacts of relay 213, the normal contacts of relay 215, the left-hand outer operated contacts of relay 223, the break contacts 403, contacts 405 of the operator's transmitting apparatus, lower winding of relay 407, the right-hand outer operated contacts of relay 223, the unoperated contacts of relay 220 to the upper winding of relay 302. The operation of relay 222 completes a circuit for the operation of relay 408 of the operator's position equipment from battery through the winding of relay 408, lead 420, the inner left-hand operated contacts of relay 223, the right-hand operated contacts of relay 222 to ground through the left-hand outer operated contacts of relay 310. Relay 408, in operating, disconnects the winding of relay 412 from the marking contacts of the line relay 407, thus preparing the operator's position circuit for transmission and reception of telegraph signaling impulses.

At this time the operator may communicate with the subscriber located at the subscriber's station shown in Fig. 1. The operator communicates with the subscriber by operating the transmitting device which in turn operates contacts 405. This causes relay 407 to follow these impulses and produces an operator's copy of the signaling impulses transmitted by her. These impulses are transmitted to the subscriber's station and cause relay 107 thereat to respond to them and repeat them to the printer magnet 101 of the subscriber's teletypewriter, causing it to record the message. The subscriber may then communicate to the operator at the central station the necessary information to permit the operator to establish the desired connection. In order to accomplish this, the subscriber will operate the teletypewriter transmitting apparatus which in turn causes the transmitting contacts 100 to transmit the corresponding telegraph signaling impulses. Relay 107 at the subscriber's station follows these impulses and produces a copy of the messages transmitted at the subscriber's station. These impulses are transmitted over the subscriber's line comprising conductors 114 and 116, to the central station where relay 407 of the operator's position follows these signaling impulses and repeats them to the receiving magnet 404 of the operator's teletypewriter. This causes them to be recorded on her instrument.

*First operator calls second operator*

Assuming now that the subscriber in Fig. 1 desires to transmit or be connected to the subscriber's station shown in Fig. 17, which is in a distant city, circuits to which can only be established through an intermediate switching point by means of the circuits shown in Figs. 7, 8, 9, 10 and 11, and the equipment at the switching station relatively near to the subscriber's station shown in Fig. 17. The equipment at this third switching station is shown in Figs. 13, 14, 15 and 16. The operator upon receiving information that the subscriber at the station shown in Fig. 1 wishes to communicate to the subscriber's station shown in Fig. 17, will insert the calling plug 315 of the cord circuit in the jack of a trunk circuit such as jack 501 of Fig. 5. This jack is connected through the associated equipment to a similar jack 701 located at the intermediate switching point.

Prior to the operator inserting plug 315 fully into jack 501, she will test this circuit to determine if it is busy, by touching the tip of plug 315 to the sleeve of jack 501. This will complete a circuit from the sleeve of jack 501, the tip of calling plug 315 to the busy test relays in the operator's position circuit over a circuit traced from the tip of the plug 315, the upper break contacts of relay 311, the outer left break contacts of relay 323, lead 422 to ground through the windings of relays 410 and 411. If the trunk circuit is busy or out of order a potential will be connected to the sleeve of the jack. This potential is sufficient to cause either relay 411 or 410 to operate, depending upon whether the line is busy or out of order. If the line is busy the potential on the sleeve of jack 501 will cause relay 411 to operate. This in turn completes an obvious circuit for the operation of the busy lamp 416 which indicates to the operator that that particular trunk is busy. She will thereupon test the next trunk to this same intermediate switching point and the process will be repeated until the operator has located an idle trunk. In case the trunk is out of order, a potential of opposite polarity will be applied to the sleeve of jack 501 by an out-of-order plug (not shown) which will cause relay 410 of the operator's position circuit to operate instead of relay 411. This causes relay 413 to operate in addition to lighting the busy lamp 416. Relay 413, in operating, completes an obvious circuit for the operation of buzzer 414 from the source of potential 415. This indicates to the operator that this particular trunk is out of order whereupon she will again try another trunk until a working trunk which is not busy to the intermediate switching point is located.

When the operator locates an idle trunk she will insert plug 315 in jack 501. This causes the operation of relay 312 of the cord circuit in series with relay 502 of the trunk circuit. The circuit for the operation of these relays may be traced from negative battery through the winding of relay 312, the inner right-hand break contacts of relay 323, the sleeve of plug 315, the sleeve of jack 501 to ground through the upper winding of relay 502. The operation of relay 312 in the cord circuit completes a circuit for the operation of relay 311 from ground through the upper operated contacts of relay 312 to battery through the winding of relay 311. The operation of relay 312 also completes a circuit for the operation or locking of relay 310 from ground through the upper operated contacts of relay 312 to battery through the right-hand winding of relay 310.

Relay 310 has already been operated as described above, consequently the operation of relay 312 merely completes a second operating circuit or a holding circuit for this relay. The operation of relay 311 disconnects the tip of plug 315 from the busy test circuit as described above and connects it to the windings of relays 320 and 321. The operation of relay 311 also completes the transmission circuit from the upper winding of relay 303 to the ring of the calling plug 315.

In the trunk circuit the operation of relay 502 extends the transmission circuit from the ring of jack 501 to the lower winding of relay 505. The operation of relay 502 also completes an obvious circuit for the operation of relays 503 and 504. Relay 502 also completes a circuit from the tip of jack 501 through the upper operated contacts of relay 502, the winding of relay 531, upper break contacts of relay 527, resistance 546 to ground through the lower break contacts of relay 521. This ground from the lower contacts of relay 521 which is connected to the tip of jack 501 in the circuit traced above causes the operation of relays 320 and 321 in the cord circuit over a circuit traced from ground through the tip of jack 501, tip of plug 315, the upper operated contacts of relay 311, the inner lower normal contacts of relay 220, lower contacts of relay 219, innermost lower break contacts of relay 309, lowermost break contacts of relay 304, winding of relay 321, left-hand winding of relay 320 to negative battery through the break contacts of relay 319. Relays 321 and 320, in operating in this circuit, complete a path for the operation of relay 317 which may be traced from negative battery through the operated contacts of relay 321, operated contacts of relay 320 to ground through the winding of relay 317. Relay 317, in operating, completes a circuit for lighting lamp 300 from ground through the outermost right-hand break contacts of relay 225, lead 250, the inner right-hand operated contacts of relay 317, lamp 300 to battery over lead 423 and through the pilot relay 401. Current flowing in this path lights the calling lamp 300 and operates pilot relay 401. The operation of the pilot relay 401 lights the pilot lamp in an obvious circuit and, when desired, the audible signaling device 402, if switch 421 is operated.

When either or both lamps 200 and 300 light, relay 401 is operated which in turn lights the pilot lamp 400. Similarly, at the second and third switching stations whenever lamp 800 or 900 or both light, pilot lamp 1000 also lights and whenever lamp 1400 or 1500 or both of them light, pilot lamp 1600 also lights. In addition, if the audible alarm switches are closed at these stations the audible signal will also sound.

The operation of relay 503 at this time connects negative battery to the lower winding of relay 502 which, under certain conditions, provides a source of negative potential for the sleeve of jack 501 to cause the circuit to test busy. Relay 503, in operating, also partially prepares other circuits which will be described in detail hereinafter.

Relays 502 and 504 in operating, as pointed out above, complete the transmission circuit from the ring of jack 501 to repeater 601 and cause relay 505 to move to its marking position if it had previously been in its spacing position. Relays 610 and 612 then move to their marking positions in a circuit traced from positive battery through the upper windings of relays 612 and 610, lead 512, upper break contacts of relay 511, upper break contacts of relay 510, upper break contacts of relay 509, upper winding of relay 508, upper break contacts of relay 507, upper operated contacts of relay 504 to negative battery through the marking contacts of relay 505. Current flowing in this path overcomes the effect of the current flowing through the lower windings of relays 610 and 612 and causes these relays to move to their marking positions. Similarly, current flowing through the upper winding of relay 508 overcomes the effect of the current flowing through the lower winding of this relay and causes this relay to move to its marking contact. Relay 508, in operating to its marking contact, maintains relay 533 in the position shown, in a circuit from battery through the lower operated contacts of relay 504, marking contacts of relay 508 to negative battery through the lower winding of relay 533.

Relays 610 and 612, in operating to their marking positions, transmit marking current over line 603 to a distant station where the receiving relay 605 of the repeater 602 is operated to its marking contact. Relay 605, in operating to its marking contact, completes a circuit for the operation of relays 714 and 706 to their marking contacts from positive battery through the marking contacts of relay 605, conductor 713, lower winding of relay 714, upper break contacts of relay 715, to negative battery through the lower winding of relay 706. Relay 706, if it had been in its spacing position, is moved to its marking position at this time but performs no useful function at this time.

Relay 714, in operating to its marking contact, interrupts a circuit through the upper winding of relay 717 from negative battery through resistance 718, the upper winding of relay 717, the upper break contacts of relay 716 and spacing contacts of relay 714 to positive battery. The current through the upper winding of relay 717 does not immediately fall to zero because condenser 720 starts to discharge through this winding. So long as relay 714 is on its spacing contacts the left-hand terminal of condenser 720 is maintained at positive potential. When relay 714 leaves its spacing position the positive potential on this terminal of condenser 720 starts to discharge through the upper winding of relay 717 and eventually the potential upon this terminal of the condenser tends to reach a negative potential. So long as the magnetic effect of this discharging and charging current of condenser 720 through the upper winding of relay 717 exceeds the magnetic effect of the current through the lower or biasing winding of this relay, relay 717 is maintained in its right-hand position. However, when the magnetic effect of this current upon relay 717 falls below the magnetic effect of the current through the lower winding of this relay, relay 717 is operated to its left-hand position. In the preferred embodiment of this invention, it requires approximately two-tenths of a second after relay 714 has moved from its spacing position until relay 717 moves to its left-hand position. This time delay of about .2 second is introduced to render the circuits less susceptible to interference and noise currents.

In the left-hand position, relay 717 completes a circuit for the operation of relay 721 from ground through the left-hand contacts of relay 717, the lower break contacts of relay 728, lower break contacts of relay 703 to battery through the winding of relay 721. Relay 721, in operating, completes an obvious circuit for lighting the answering lamp 722 at the second or intermediate switching station. Relay 721, in operating, also connects battery to the lower winding of the sleeve relay 702. Current flowing in this path through the lower winding in series with the upper winding of relay 702 does not operate this relay, since these windings are connected in opposition. Current flowing through these windings, however, causes a negative potential to be placed upon the sleeve of jack 701 so that the circuit will test busy should an operator at the intermediate switching point desire to make a connection to the first switching station over this trunk. Relay 721, in operating, also completes a circuit for energizing relay 724 of the night alarm circuit, provided key 723 is closed. Relay 724, in operating, completes an obvious circuit for operating the night alarm bell or other audible device 725 from source 726.

*Second operator answers*

The operator at the second or through-switching station, upon observing the lighted answering lamp 722, will insert plug 804 of an idle cord circuit in jack 701. This causes the operation of relays 808 and 807 of the cord circuit and 702 of the trunk circuit in a circuit from negative battery 839 through the potentiometer comprising resistances 806, the winding of relay 807, the lower winding of relay 808, conductor 838, the inner left-hand break contacts of relay 923, conductor 837 to the sleeve of plug 804, sleeve of jack 701 to battery and ground through the potentiometer comprising the windings of relay 702.

Should two operators attempt to answer this trunk at about the same time, the cord circuits and position equipment operate as described in the above-identified Fitch patent, so that the second operator will remove her plug from the jack in parallel with jack 701 upon observing that her busy lamp lights.

Relay 807 performs no useful function in operating at this time. Relay 808, in operating, completes an obvious circuit for the operation of relay 809. Relay 808, in operating, also completes a circuit for the operation of relay 910 from negative battery through the left-hand winding of relay 910, conductor 840 to ground through the operated contacts of relay 808. The operation of relays 809 and 910 condition the repeating relays 902 and 903 for the repeating of signaling impulses and establishing the communication circuit from the ring of plug 804 to the upper winding of relay 902. Relay 809, in operating, completes a circuit for the operation of relay 811 from negative battery through the winding of relay 811, resistance 812, the inner upper operated contacts of relay 809, the upper winding of relay 808, conductor 838 through the left-hand inner break contacts of relay 923, conductor 837, the sleeve of plug 804, and sleeve of jack 701, to battery and ground through the potentiometer comprising the windings of relay 702. (The operation of relay 811 performs no useful function at this time but merely prepares a locking circuit for relay 827, the operation of which will be described hereinafter.

Relay 809, in operating, disconnects the tip of the plug 804 from the busy test circuit in the operator's position and connects it to the windings of relays 834 and 829. This causes the operation of relay 834, but not the operation of relay 829, in a circuit from ground through a relatively high resistance 744, tip of jack 701, tip of plug 804, upper operated contacts of relay 809, the inner upper break contacts of relay 820, through the winding of relay 834, the right-hand winding of relay 829 to negative battery through the right-hand break contacts of relay 823. Relays 834 and 829 are so adjusted that under this condition relay 834 will operate but relay 829 will not operate. It is to be noted that the circuit from the tip of jack 701 through the upper contact of relay 702, winding of relay 731 and upper break contacts of relay 727 is open at this time at the lower break contacts of relay 721, which has previously been operated. Relay 834, in operating, completes a circuit for the operation of relay 825 through the operated contacts of relay 834, the break contacts of relay 829 to battery through the winding of relay 825. Relay 825, in operating, completes a locking circuit from battery through its winding and left-hand inner operated contacts to ground through the operated contacts of relay 808. Operation of relay 825 performs no other useful function at this time but merely conditions the various circuits, as will be described hereinafter.

As before, when the operator inserts plug 804 in jack 701 or shortly thereafter, she will operate the teletypewriter or printing key 824. This in turn operates relay 823, which in turn causes the operation of relays 821 and 822. These relays in turn condition the operator's equipment in Fig. 10 in the same manner as described with reference to Fig. 4 so that the operator may transmit and receive telegraph signals from the trunk circuit through the cord circuit.

However, before the second operator can transmit or receive over the trunk, various relays of the trunk circuit must operate so the second operator will be instructed to wait until she receives signals from the first operator.

When the operator inserted plug 804 in jack 701, relay 702 operated as described above. Relay 702, in operating, completed an obvious circuit for the operation of relays 703 and 704. Relay 703, in operating, completes a circuit for the operation of relay 727 from positive battery through the winding of relay 727, the inner lower break contacts of relay 716, the lower operated contacts of relay 703, the lower break contacts of relay 728 to ground through the left-hand contacts of relay 717. Relay 717 was previously operated to its left-hand position as described above. Relay 727, in operating, completes a locking circuit from ground through its lower operated contacts, the inner upper break contacts of relay 734 to battery through the winding of relay 727. Relay 727, in operating, also completes an obvious circuit from ground through its lower operated contacts for the operation of relay 729. Relay 727, in operating, also connects negative battery to the tip of jack 701 through resistance 745, the upper operated contacts of relay 727, winding of relay 731 and upper operated contacts of relay 702 to the tip of jack 701.

Relay 703, in operating, also interrupts the operating circuit of relay 721 at its lower break contacts. Relay 721 thereupon releases. Relay 721, however, is a slow release relay and does not release until after relay 727 has operated, as described above. Consequently, relay 721 does not connect ground to the tip of jack 701 at this time because the circuit from its lower break contacts is open at the upper break contacts of relay 727. Relay 727, in connecting negative battery to the tip of jack 701, does not cause the relays 834 and 829 of the cord circuit to function. Relay 834 remains operated, while relay 829 remains non-operated. It is noted that under this condition, resistances 745 and 744 have such values that sufficient current will flow through relay 834 for it to remain operated but this current will be insufficient to operate relay 829.

The operation of relay 727 completes a circuit for the operation of relay 728 from negative battery through the lower operated contacts of relay 727 to ground through the winding of relay 728. Relay 728, in operating, short-circuits the lower operated contacts of relay 703.

Relay 729, in operating, as pointed out above, in an obvious circuit from the lower contacts of relay 727, completes a circuit for the operation of relay 717 back to its right-hand position from positive battery connected to the armature of relay 714, through the lower break contacts of relay 716, the inner upper operated contacts of relay 729, the upper break contacts of relay 716 to negative battery through the upper winding of relay 717 and resistance 718. This positive battery again charges the left-hand terminal of condenser 720 to substantially the same positive potential as the potential of the positive battery. Relay 717, in operating to its right-hand position, now completes a circuit for the operation of relay 716 from ground through its right-hand contacts, the upper break contacts of relay 734, the inner upper break contacts of relay 715, the lower inner operated contacts of relay 729 to battery through the winding of relay 716. Relay 716, in operating, connects positive battery through the armature and marking contacts of relay 714 and the upper operated contacts of relay 716 to negative battery through the upper winding of relay 717, thus holding relay 717 in its right-hand position so long as relay 714 remains in its marking position.

Relay 729, in operating as described above, interrupts the operating circuit of relay 730 from ground through the winding of relay 730, the upper break contacts of relay 729 to battery through the marking contacts of relay 714, thus allowing relay 730 to release. Relay 730 had previously been operated when relay 714 was operated to its marking contact. Relay 730, in releasing, completes a locking circuit for relay 728 from battery through its break contacts, the lower break contact of relay 711 through inner upper make contacts of relay 728 to ground through the winding of relay 728.

Relay 716, in operating, completes a circuit for locking itself operated from battery through its winding and upper inner operated contacts to ground through the lower inner operated contacts of relay 727.

It is to be noted that relay 703, in operating, connects negative battery to the lower winding of relay 702. This negative battery supplies a negative potential to the sleeve of jack 701 under certain conditions to cause the circuit to test busy should another operator at the second switching station desire to communicate to the first switching station over this particular circuit. This battery, however, does not in any way interfere with the operation of the circuits in case two operators attempt to answer a call from the first station as described in the above-identified patent to Fitch.

Relay 702, in operating, completes a circuit for the operation of relay 704 from ground through the inner upper operated contacts of relay 702 to battery through the winding of relay 704. Relays 702 and 704, in operating, condition repeating relays 705 and 706 and complete the transmission circuit from the ring of jack 701 to the repeater 602. When relay 705 is operated to its marking position and relay 704 operated, a circuit is completed for operating relays 611 and 613 to their marking positions from positive battery through the upper windings of relays 613 and 611, lead 712, upper break contacts of relays 711, 710, 709, upper winding of relay 708, upper break contacts of relay 707, upper operated contacts of relay 704 to negative battery through the marking contacts of relay 705. This transmits a marking impulse over trunk 606 to the first central switching station.

The receiving relay 604 of repeater 601 at the first central station is operated to its marking position in response to the marking current transmitted over line 603 by relays 611 and 613 when they are moved to their marking positions. Relay 604, in moving to its marking position, causes relays 506 and 514 to be operated to their marking positions in a circuit from positive battery through the marking contacts of relay 604, conductor 513, lower winding of relay 514, upper break contacts of relay 515, to negative battery through the lower winding of relay 506. The current flowing through the lower windings of relays 506 and 514 in the circuits just traced is in the opposite direction from the current flowing through the upper windings of these relays and produces a magnetic effect which overpowers the magnetic effect of the current in the upper windings and causes these relays to move to their marking positions. Relay 506, in operating to its marking position if it had previously been in the spacing position, merely repeats the marking signal to the cord circuit and performs no other useful function at this time.

Relay 514, in moving to its marking position, interrupts the current flowing through the upper winding of relay 517 in a circuit from positive battery through the armature and spacing contacts of relay 514, the upper break contacts of relay 516 to negative battery through the upper winding of relay 517. Relay 517 does not immediately move to its right-hand position, however, because the right-hand terminal of condenser 520 had been previously charged to a positive potential by the positive battery connected to the upper winding of relay 517 through the spacing contact of relay 514. Condenser 520 starts to discharge through the upper winding of relay 517. So long as the discharge current of condenser 520 exceeds a certain value, the magnetic effect of which overcomes the magnetic effect of the current in the lower winding of relay 517, relay 517 remains in the position shown. However, when this discharging current of condenser 520 falls below this particular value, relay 517 is operated to its right-hand position by current flowing through its lower winding.

It is noted that when relay 514 is operated to its marking position a circuit is completed for the operation of relay 530 from positive battery through the armature and marking contact of relay 514, the upper break contacts of relay 529 to ground through the winding of relay 530. Relay 530 in operating merely interrupts the locking circuit of relay 528, which relay has not yet operated.

Relay 517, in operating to its right-hand position, completes a circuit for the operation of relay 527 from ground through its armature and right-hand contacts, the lower break contacts of relay 528, lower operated contacts of relay 503, inner lower break contacts of relay 516 to battery through the winding of relay 527. Relay 527, in operating, completes a locking circuit from ground through its lower operated contacts, upper inner break contacts of relay 534 to battery through the winding of relay 527. Relay 527, in operating, also completes a circuit for operating relay 528 from battery through its lower contacts to ground through the winding of relay 528. Relay 527, in operating, completes an obvious circuit from ground through its lower operated contacts to battery through the winding of relay 529 for the operation of relay 529.

Relay 529, in operating, interrupts the operating circuit for relay 530 traced above, whereupon relay 530 releases and completes a locking circuit for relay 528 from battery through the upper break contacts of relay 530, the lower break contacts of relay 511, the inner upper operated contacts of relay 528 to ground through the winding of relay 528. The operation of relay 529 completes a circuit for the operation of relay 517 to its left-hand position from positive battery connected to the armature of relay 514 through the lower break contacts of relay 516, upper inner operated contacts of relay 529, upper break contacts of relay 516 to negative battery through the upper winding of relay 517. Current flowing in this circuit overpowers current flowing through the lower winding of relay 517 and causes relay 517 to move to its left-hand position. It is also to be noted that the right-hand terminal of condenser 520 is again charged to positive battery potential in this circuit. Relay 517, in operating to its left-hand position, completes a circuit for the operation of relay 516 from ground through the armature and left-hand contacts of relay 517, the upper break contacts of relay 534, the upper break contacts of relay 515, lower inner operated contacts of relay 529 to battery through the winding of relay 516. Relay 516, in operating, completes a locking circuit from battery through its winding and upper inner operated contacts to ground through the lower operated contacts of relay 527. Relay 516, in operating, also transfers or connects the upper winding of relay 517 to the marking contact of relay 514, thus during the time relay 514 remains in its marking position a circuit is maintained for holding relay 517 operated from positive battery through the armature and marking contacts of relay 514, the upper operated contacts of relay 516 to negative battery through the upper winding of relay 517. It is also to be noted that a positive charge is maintained upon the right-hand terminal of condenser 520 during this time.

Relay 527, in operating as described above, also connects negative battery through resistance 545 and its upper operated contacts to the tip of jack 501 through the winding of relay 531 and the upper operated contacts of relay 502. This negative battery causes relay 320 in the cord circuit at the first switching station to release, since negative battery is now connected to both of its terminals. It is to be noted, however, that relay 321 does not release at this time due to the fact that high resistance 544 is connected from the tip of jack 501 to ground. Current flowing from negative battery through the left-hand break contacts of relay 319, the left-hand winding of relay 320, winding of relay 321, lower break contacts of relay 304, lower inner break contacts of relay 309, lower break contacts of relays 219 and 220, upper outer operated contacts of relay 311, tip of plug 315, tip of jack 501 to ground through resistance 544 causes relay 321 to remain operated. This current, while causing relay 321 to remain operated, is insufficient to hold relay 320 operated, so relay 320 releases.

It is to be noted that a small current also flows from negative battery through resistance 545, the upper operated contacts of relay 527, winding of relay 531, upper operated contacts of relay 502 to ground through resistance 544. This current is in the proper direction to operate the polarized relay 513. However, relay 531 is so adjusted that it will not operate on this current.

Relay 320, in releasing, interrupts the operating circuit for relay 317 and in turn causes relay 317 to release. Relay 320, in releasing, completes the operating circuit for relay 316 from battery through the operated contacts of relay 321, the break contacts of relay 320 to ground through the left-hand winding of relay 316. Relay 316, in operating, completes a locking circuit from battery through its right-hand winding and its right-hand operated contacts to ground through the upper operated contacts of relay 312.

Relay 317, in releasing, interrupts the circuit of the calling lamp 300 and thus extinguishes this lamp.

The operator at the first switching station, upon noting the extinguishing of the calling lamp 300, which indicates that an operator at the second switching center has been connected to the trunk, will operate her transmitting device 405 to transmit to the second operator the information required by the second operator to enable her to connect the circuit to the desired subscriber's line. Still assuming that it is desired to connect the circuit to the subscriber's line shown in Fig. 17 associated with the third central station, the first operator will transmit to the second operator the information necessary to enable the second operator to connect the circuit to a trunk to the desired third switching point.

*Calling the third operator*

The operator at the second central station will connect the circuit to a trunk to the third central station. To accomplish this, the operator at the second central station, after she has received the necessary information, will insert plug 915 into jack 1101 of an idle trunk to the third central station, having previously tested the trunk by touching the tip of the plug to the sleeve of the jack and observing her busy lamp. If the trunk is busy negative potential will be connected to the sleeve of the jack and this will cause the busy lamp to light as described above when the first operator selected a trunk to the second central station. Similarly, if a trunk is out of order positive potential will be supplied to the trunk so that the operator at the second central station will receive an audible signal in addition to the busy lamp.

When the operator at the second central station inserts plug 915 into jack 1101 a circuit is completed for the operation of relays 1102 and 912 in a circuit from battery through the winding of relay 912, the right-hand inner break contacts of relay 923, sleeve of plug 915, sleeve of jack 1101 to ground through the upper winding of relay 1102. Relay 1102, in operating, completes a circuit from ground through its inner upper operated contacts to battery through the winding of relay 1103 for the operation of relay 1103. Relay 1102, in operating, also completes a circuit for the operation of relay 1104 from ground through its inner upper operated contacts to battery through the winding of relay 1104. Relay 1104, in operating, transfers the holding circuit through the lower winding of relay 1133 from its lower break contacts to a circuit extending from battery through its lower operated contacts, armature and marking contact of relay 1108 to positive battery through the lower winding of relay 1133. Relay 1102, in operating, also connects ground from the lower break contacts of relay 1121, resistance 1146 and upper break contacts of relay 1127, winding of relay 1131 and upper make contacts of relay 1102 to the tip of jack 1101.

Turning now to the cord circuit at the second central station, the operation of relay 912 completes a circuit for the operation of relay 911 from ground through the upper operated contacts of relay 912 to battery through the winding of relay 911. The operation of relay 912 also completes an obvious circuit through the right-hand winding of relay 910 for holding relay 910 operated from battery through the right-hand winding of relay 910 to ground through the upper operated contacts of relay 912.

Relay 911, in operating, disconnects the tip of plug 915 from busy test circuit in the operator's position over lead 1022 and connects it to the windings of relays 920 and 921. The ground connected to the tip of jack 1101 from the lower break contact of relay 1121 in a circuit traced above causes relays 921 and 920 to operate in a circuit from the tip of plug 915 through the upper operated contact of relay 911, the lower inner break contact of relay 829, lower break contact of relay 819, lower inner break contact of relay 909, lower break contact of relay 904, winding of relay 921, left-hand winding of relay 920 to negative battery through the left break contacts of relay 919.

Relays 920 and 921, in operating, complete a circuit for the operation of relay 917 from battery through the operated contacts of relay 921 and 920 to ground through the winding of relay 917. Relay 917, in operating, completes a circuit for the operation of relay 828 from battery through the winding of relay 828, lead 843, the operated right-hand outer contacts of relay 917, lead 844 to ground through the operated right-hand contacts of relay 825. Relay 828, in operating, connects positive battery to the windings of relays 829 and 834. This positive battery causes the operation of relay 731 in the trunk circuit extending to the first central station in a circuit from positive battery through the operated contacts of relay 828, the right-hand winding of relay 829, the winding of relay 834, the upper break contacts of relay 820, the upper operated contacts of relay 809, tip of jack 701, the upper operated contacts of relay 702, winding of relay 731 to negative battery through the upper operated contacts of relay 727 and resistance 745. Relay 834 remains operated in this circuit while relay 829 does not. Relay 829 is arranged so that the current in the circuit through its left-hand winding from positive battery through the right-hand operated contacts of relay 828, left-hand winding of relay 829, and resistance 851 to negative battery is substantially equal to the current through the right-hand winding of relay 829 in the circuit traced above. Resistances 851 and 745 are so related that the currents through these two windings of relay 829 are substantially equal. The windings of this relay are so connected that when these currents flow through them they flow in opposite directions and hence do not cause the operation of this relay.

Relay 731, in operating, completes a circuit for the operation of relay 735 from ground through the right-hand contacts of relay 731 to battery through the upper winding of relay 735. The operation of relay 735 in turn causes the operation of relay 710 in a circuit from battery through the lower operated contacts of relay 735 to ground through the winding of relay 710. Relay 710 completes a locking circuit for locking relay 735 operated, from battery through the upper winding of relay 735, lower operated contacts of relay 710, lower break contacts of relay 709 to ground through the inner upper operated contacts of relay 702. Relay 710, in operating, interrupts the transmission circuit over lead 712 and connects ground to the transmission circuit through the upper make contacts of relay 719, the upper break contacts of relay 709, upper winding of relay 708, upper break contact of relay 707, upper operated contact of relay 704 to negative battery through the marking contacts of relay 705. Relay 708 is maintained in its marking position in this circuit. Relay 710, in interrupting the transmission circuit over lead 712, interrupts current flowing through the upper windings of relays 611 and 613 and causes these relays to release or be operated to their spacing positions by current flowing in an obvious circuit through the lower windings of these relays. Relays 611 and 613, in operating to their spacing positions, transmit spacing current over line 603 and cause receiving relay 604 of repeater 601 to be moved to its spacing position. Relay 604, in operating to its spacing position, causes relays 506 and 514 to be operated to their spacing positions. Relay 506, in operating to its spacing position, repeats the spacing signal over the ring of jack 501.

Relay 514, in operating to its spacing position, interrupts current flowing through the upper winding of relay 517 in a circuit from negative battery through the upper winding of relay 517, upper operated contacts of relay 516 to positive battery through the marking contact and armature of relay 514. After condenser 520 has become sufficiently discharged, current flowing through the upper winding of relay 517 falls below the value required to maintain relay 517 in the position shown, whereupon relay 517 moves to its right-hand position. In the right-hand position relay 517 completes a circuit for the operation of relay 532 from ground through the right-hand contacts of relay 517, lower operated contacts of relay 528, lower operated contacts of relay 516, lower break contacts of relay 536 to battery through the lower winding of relay 532. Relay 532, in operating, removes the short circuit from its upper winding and thus causes locking current to flow through this winding from ground through the upper winding of relay 532, resistance 547, uppermost operated contacts of relay 516 to positive battery through the spacing contacts of relay 514. Relay 532, in operating, also completes a circuit for the operation of relay 515 from ground through its right-hand operated contacts to battery through the winding of relay 515. Relay 515, in operating, interrupts the circuit through the lower winding of relay 506 and thus insures that this relay will remain in its spacing position. Relay 515, in operating, also completes a circuit for the operation of relay 517 from negative battery through the upper winding of relay 517, the lower operated contacts of relay 515, the upper break contacts of relay 536 to positive battery connected to the armature of relay 514. Relay 517, in operating to its left-hand position, then completes a circuit for the operation of relay 536 from ground through its left-hand operated contacts, upper break contacts of relay 534, upper operated contacts of relay 515 to battery through the lower winding of relay 536. Relay 536, in operating, interrupts the above traced circuit through the upper winding of relay 517 and completes a locking circuit from battery through its upper winding and inner upper operated contact to ground through the right-hand contact and armature of relay 532.

Condenser 520 again starts to discharge and after a time interval which is approximately two-tenths of a second in the preferred embodiment of this invention, relay 517 will again move to its right-hand position where a circuit is completed for the operation of relay 534 from ground through the armature and right-hand contacts of relay 517, lower operated contacts of relay 528, lower inner operated contacts of relay 516, lower operated contacts of relay 536 to battery through the winding of relay 534. Relay 534, in operating, again connects positive battery from the armature of relay 514 through its lower operated contacts to the upper winding of relay 517. This causes relay 517 to again operate to its left-hand position and also charges condenser 520 to a positive potential. Relay 534, in operating, also completes a locking circuit from battery through its winding and inner upper operated contacts to ground through the lower operated contacts of relay 527. Relay 534, in operating, also interrupts the locking circuit of relay 527 at the upper inner break contacts of relay 534. This allows relay 527 to release. Relay 527, in releasing, in turn causes relays 529, 516 and 534 to release. Relay 516, in releasing, connects positive battery through the armature and spacing contacts of relay 514 and the upper break contacts of relay 516 to negative battery through the upper winding of relay 517, thus tending to hold relay 517 in its left-hand position. Relay 516, in releasing, also interrupts the locking circuit through the upper winding of relay 532. A short time interval thereafter, when condenser 548 is sufficiently discharged through the upper winding of relay 532 to ground, current current flowing through the middle winding of relay 532 will overpower the discharge current from condenser 548 and cause relay 532 to release. This in turn causes relays 515 and 536 to release.

Relay 527, in releasing, connects ground from the lower break contact of relay 521, through resistance 546, upper break contact of relay 527, winding of relay 531, upper make contacts of relay 502 to the tip of jack 501. This causes the operation of relay 320 in the cord circuit at the first switching station in a circuit from this ground on the tip of jack 501, tip of plug 315, the upper operated contacts of relay 311, the lower inner break contacts of relay 220, lower break contacts of relay 219, lower inner break contacts of relay 309, lower break contacts of relay 304, winding of relay 321 to negative battery through the left-hand winding of relay 320 and the break contacts of relay 319. Relay 321 remains operated in this circuit and relay 320 operates. This causes the operation of relay 317 in a circuit from battery through the operated contacts of relay 321, operated contacts of relay 320 to ground through the winding of relay 317. Relay 317, in operating, completes a circuit for lighting lamp 300 from battery through relay 401, lead 423, lamp 300, right-hand inner operated contacts of relay 317, lead 250 to ground through the right-hand break contacts of relay 225.

When lamp 300 lights it indicates to the operator at the first switching station that the operator at the intermediate or through station has inserted plug 915 in jack 1101.

As previously described, when the operator at the second or through-switching station inserted plug 915 in jack 1101, relays 911 and 912 in the cord circuit were operated and relays 1102 and 1104 had been operated. These relays in operating complete a transmission circuit and condition relays 1105 and 1106 for repeating signaling impulses. Relay 1105 will then be operated to its marking position if it previously had been in its spacing position, or remain in its marking position, and this together with the operation of relay 1104 completes a circuit for the operation of relays 1210 and 1212 to their marking positions from negative battery through the marking contacts of relay 1105, middle upper operated contacts of relay 1104, the upper break contacts of relay 1107, upper winding of relay 1108, upper break contacts of relay 1109, upper break contacts of relays 1110 and 1111, lead 1112, upper windings of relays 1210 and 1212 to positive battery. Relays 1210 and 1212, in operating to their marking positions, transmit marking current over line 1203 to the third switching station to which the subscriber's line shown in Fig. 17 is connected. The receiving relay 1205 of repeater 1202 at this station moves to its marking position in response to marking current transmitted over line 1203. Relay 1205, in operating to its marking position, completes a circuit for the operation of relays 1314 and 1306 to their marking positions from positive battery through the marking contacts of relay 1205, lead 1313, lower winding of relay 1314, upper break contacts of relay 1315, lower winding of relay 1306 to negative battery. Relay 1306, in operating to its marking contact or remaining on its marking contact, performs no useful function at this time.

Relay 1314, in operating to its marking contact, interrupts the circuit through the upper winding of relay 1317. This circuit is traced from negative battery through the upper winding of relay 1317, upper break contacts of relay 1316, spacing contacts of relay 1314 to positive battery. Relay 1314, in moving to its marking position, also completes a circuit for the operation of relay 1330 from positive battery through the armature and marking contacts of relay 1314, upper break contacts of relay 1329 to ground through the winding of relay 1330. Relay 1330, in operating at this time, merely interrupts the locking circuit for relay 1328. When relay 1314 interrupted the circuit through its spacing contacts, condenser 1320 started to discharge through the upper winding of relay 1317. After an interval of time of approximately two-tenths of a second in the preferred embodiment of this invention, the discharge current from condenser 1320 through the upper winding of relay 1317 falls to such a value that the current through the lower winding of relay 1317 overpowers current through the upper winding of this relay and causes relay 1317 to operate to its left-hand position. In operating to its left-hand position, relay 1317 completes a circuit or the operation of relay 1321 from ground through the left-hand contacts of relay 1317, the lower break contacts of relay 1328, lower break contacts of relay 1303 to battery through the winding of relay 1321. The operaation of relay 1321 connects negative battery through its inner upper operated contacts to the lower winding of differential relay 1302. This circuit supplies a negative potential to the sleeve of jack 1301 and causes it to test busy should another operator at the terminating or third central station attempt to establish a communication path to the second switching station over this circuit. The operation of relay 1321 also completes an obvious circuit for the lighting of the answering lamp 1322. In addition, if the night alarm switch 1323 is closed, the operation of relay 1321 completes an obvious circuit for the operation of relay 1324 which in turn completes a circuit for the operation of the audible calling device or ringer 1325 from source 1326.

*Third operator answers*

The operator at the third central station upon noting lamp 1322 will insert the plug 1404 of an idle cord in the jack 1301 associated with lamp 1322.

Here again the circuits operate as described in detail in the above-identified patent granted to Fitch in case two or more operators attempt to simultaneously insert plugs in jacks in multiple with jack 1301.

Assuming only one operator answers lamp 1322, or that the other operators have retired from the circuit, relays 1302, 1408 and 1407 operate when the operator inserts plug 1404 in jack 1301 in a circuit from battery 1439, the potentiometer comprising resistances 1406, winding of relay 1407, lower winding of relay 1408, lead 1438, inner left-hand break contact of relay 1523, lead 1437, sleeve of plug 1404, sleeve of jack 1301 to battery and ground through the patentiometer comprising the lower and the upper windings of relay 1302. Relay 1302 completes obvious circuits for the operation of relays 1303 and 1304. The operation of relay 1303 interrupts the operating circuit of relay 1321, which starts to release.

The operation of relay 1303 completes a circuit for the operation of relay 1327 from ground through the left-hand operated contacts of relay 1317, lower break contacts of relay 1328, lower operated contacts of relay 1303, lower inner break contacts of relay 1316 to battery through the winding of relay 1327. Relay 1327 operates before relay 1321 has released because relay 1321 is a slow release relay. Relay 1327, in operating, connects negative battery through resistance 1345 to the tip of jack 1301 in a circuit from negative battery through the resistance 1345, upper operated contacts of relay 1327, winding of relay 1331 and upper operated contacts of relay 1302 to the tip of jack 1301 and prevents the ground through the lower break contacts of relay 1321 from being connected to the tip of jack 1301 when relay 1321 releases. Relay 1321, in releasing, interrupts the operating circuit for lamp 1322 and thus extinguishes the lamp at this time. If switch 1323 has been operated, release of relay 1321 will also cause the release of relay 1324 and interrupt the operating circuit of the audible calling device 1325.

The operation of relay 1327 completes an obvious circuit for the operation of relay 1329. The operation of relay 1327 completes a locking circuit for holding itslef operated, from battery through its winding, the upper inner break contacts of relay 1334 to ground through the lower operated contacts of relay 1327. Relay 1327, in operating, also completes a circuit for the operation of relay 1328 from battery through its lower operated contacts to ground through the winding of relay 1328. The operation of relay 1329 interrupts the operating circuit for relay 1330 and permits this relay to release. Relay 1330, in releasing, completes a locking circuit for relay 1328 from battery through the break contacts of relay 1330, lower break contacts of relay 1311, upper inner operated contacts of relay 1328 to ground through the winding of relay 1328. Relay 1329, in operating, also completes a circuit for the operation of relay 1317 to its right-hand position from positive battery connected to the armature of relay 1314, lower break contacts of relay 1316, upper inner operated contacts of relay 1329, upper break contacts of relay 1316 to negative battery through the upper winding of relay 1317. This battery also charges the left-hand terminal of condenser 1320 to positive battery potential. Relay 1317, in operating to its right-hand position, completes a circuit for the operation of relay 1316 from ground through the armature and right-hand contacts of relay 1317, upper break contacts of relay 1334, upper break contacts of relay 1315, lower inner operated contacts of relay 1329 to battery through the winding of relay 1316. Relay 1316, in operating, completes a locking circuit from battery through its winding and upper inner operated contacts to ground through the lower operated contacts of relay 1327. Relay 1316, in operating, completes a circuit from the marking contact of relay 1314 for holding relay 1317 in its right-hand position from positive battery through the armature and marking contacts of relay 1314, the upper operated contacts of relay 1316 to negative battery through the upper winding of relay 1317. The left-hand terminal of condenser 1320 also acquires a positive charge from the positive battery connected to the armature of relay 1314.

Turning now to the cord circuit, the operation of relay 1408 completes circuits for the operation of relays 1409 and 1510. The operation of relays 1409 and 1510 condition the repeating relays 1502 and 1503 and extend the transmission circuit from the ring of plug 1404 to the repeating relays 1502 and 1503. The operator at the third switching station will operate her teletypewriter key 1424 either before or after she inserts plug 1404 in jack 1301. When this key is operated and plug 1404 inserted in jack 1301, the transmission path of the cord circuit is extended to the operator's position equipment including her teletypewriter. Other circuits and apparatus have to function before the communication path is extended to the first switching station. The operator at the third switching station will therefore wait until she receives information transmitted over the system from the first switching station. Meantime the operation of relay 1407 serves to disconnect the busy test circuit from the tip of plug 1404. The operation of relay 1408 completes an obvious circuit for the operation of relays 1409 and 1510. The operation of relay 1409 completes a circuit for the operation of relay 1411 from negative battery through the winding of relay 1411, resistance 1412, inner upper operated contacts of relay 1409, upper winding of relay 1408, lead 1438, left-hand inner break contacts of relay 1523, lead 1437, sleeve of jack 1404, and the sleeve of plug 1301 to battery and ground through the potentiometer comprising the upper and lower winding of relay 1302. The operation of relay 1411 performs no useful function at this time.

The operation of relay 1409 connects the tip of plug 1404 to the windings of relays 1434 and 1429. When the operator first inserts plug 1404 in jack 1301 only the high resistance 1344 is connected from the tip of jack 1301 to ground because relay 1321 is operated at this time and relay 1327 has not as yet operated. This causes the operation of relay 1434 but does not cause the operation of relay 1429 in the circuit traced from ground through high resistance 1344, tip of jack 1301, tip of plug 1404, upper operated contacts of relay 1409, upper inner break contacts of relay 1420, winding of relay 1434, right-hand winding of relay 1429 to negative battery through the right-hand break contacts of relay 1428. Relay 1434 is adjusted to operate on current flowing in this circuit; however, relay 1429 is a marginal relay and it is so adjusted that it will not operate on the low value of current flowing through resistance 1344. The operation of relay 1434 at this time completes a circuit for the operation of relay 1425 from ground through the operated contacts of relay 1434, the break contacts of relay 1429 to battery through the winding of relay 1425. Relay 1425 in operating, completes a locking circuit from battery through its winding and inner left-hand operated contacts to ground through the operated contacts of relay 1408. Relay 1425, in operating, merely serves to condition certain other circuits which will be described more fully hereinafter.

Later, when relay 1327 operates and connects negative battery to the tip of jack 1301, relay 1434 remains operated and relay 1429 remains normal, or released. Under this condition negative battery is connected to all of the terminals of marginal relay 1429 and since the resistances 1451 and 1341 are so adjusted that current through these windings is substantially the same, relay 1429 does not operate; however, sufficient current flows through the right-hand winding of relay 1429 and winding of relay 1434 to ground through the high resistance 1344 to maintain relay 1434 operated. The operation of relays 1409 and 1510 condition the repeating relays 1502 and 1503 of the cord circuit for repeating telegraph signaling impulses and cause these relays to move to their marking contacts. In addition, relay 1409 completes the transmission circuit from the upper winding of repeating relay 1502 to the ring of jack 1404. In the trunk circuit the operation of relays 1302 and 1304 conditions repeating relays 1306 and 1305 for repeating telegraph signaling impulses and relay 1302 extends the transmission circuit from the ring of jack 1301 to the lower winding of relay 1305. Relay 1305 is caused to move to or remain in its marking position in this circuit. Relay 1304, in operating, and relay 1305, in moving to its marking position, complete a circuit for the operation of relays 1211 and 1213 from positive battery through the upper windings of relays 1213, 1211, lead 1312, upper break contacts of relays 1311, 1310, 1309, upper winding of relay 1308, upper break contacts of relay 1307, upper middle operated contacts of relay 1304 to negative battery through the marking contact of relay 1305. Relays 1213 and 1211, in operating to their marking positions in this circuit, transmit marking current back over the line 1203 to the repeater 1201 at the intermediate or through-switching station. The receiving relay 1204 of repeater 1201 responds to this marking current by moving to its marking position and completes a circuit for the operation of relay 1114 to its marking position. It also completes a circuit for the operation of relay 1106. The circuit for the operation of these relays may be traced from negative battery, through lower winding of relay 1106, upper break contact of relay 1115, lower winding of relay 1114, conductor 1113 to positive battery through the armature and marking contacts of relay 1204. Relay 1114, in operating to its marking position, interrupts the circuit through the upper winding of relay 1117 and also completes a circuit through its marking contacts for the operation of relay 1130 from positive battery through the armature and marking contacts of relay 1114, upper break contacts of relay 1129 to ground through the winding of relay 1130. The operation of relay 1130 interrupts the locking circuit for relay 1128. When relay 1114 interrupts the circuit from positive battery through its spacing contacts and the upper break contacts of relay 1116 to negative battery through the upper winding of relay 1117, the right-hand terminal of condenser 1120 which had previously acquired a positive charge from positive battery connected to the armature of relay 1114, starts to discharge through the upper winding of relay 1117. At a certain time interval thereafter, determined by the constants of condenser 1120, resistance 1119, windings of relay 1117, resistances 1118 and 1143, which in the preferred embodiment of this invention is approximately two-tenths of a second, relay 1117 moves to its right-hand position. Relay 1117, in operating to its right-hand position, completes a circuit for the operation of relay 1127 from ground through the armature and right-hand contacts of relay 1117, the lower break contacts of relay 1128, lower operated contacts of relay 1103, lower inner break contacts of relay 1116 to battery through the winding of relay 1127. Relay 1127 in operating completes a locking circuit for maintaining itself operated from battery through the winding of relay 1127, the upper inner break contacts of relay 1134 to ground through the lower operated contacts of relay 1127. Relay 1127, in operating, completes an obvious circuit for the operation of relay 1129. Relay 1127, in operating, also completes a circuit for the operation of relay 1128 from battery through its lowermost operated contacts to ground through the winding of relay 1128. The operation of relay 1129 interrupts the operating circuit of relay 1130 at its uppermost break contacts and causes relay 1130 to release. Relay 1130, in releasing, completes a locking circuit for relay 1128 from battery through the upper break contacts of relay 1130, lower break contacts of relay 1111 to ground through the inner upper operated contacts of relay 1128 and the winding of relay 1128. The operation of relay 1129 completes the circuit for the operation of relay 1117 to its left-hand position from negative battery through resistance 1118, upper winding of relay 1117, upper break contacts of relay 1116, upper inner operated contacts of relay 1129, lower break contacts of relay 1116 to positive battery connected to the armature of relay 1114. The operation of relay 1117 to its left-hand position completes a circuit for the operation of relay 1116 from ground through the armature and left-hand contacts of relay 1117, the upper break contacts of relay 1134, upper inner break contacts of relay 1115, the lower inner operated contacts of relay 1129 to battery through the winding of relay 1116. Relay 1116, in operating, completes a locking circuit from battery through its winding and upper inner operated contacts to ground through the lower operated contacts of relay 1127. Relay 1116, in operating, completes a circuit for holding relay 1117 in its left-hand position from negative battery through resistance 1118, upper winding of relay 1117, upper operated contacts of relay 1116 to positive battery through the armature and marking contacts of relay 1114.

The operation of relay 1127 as described above connects negative battery through resistance 1145, winding of relay 1131, and upper operated contacts of relay 1102 to the tip of jack 1101. This negative battery causes relay 920 in the cord circuit to release. The negative battery is connected from the tip of jack 1101 to the tip of cord 915 through the upper operated contacts of relay 911, lower inner break contacts of relay 820, lower break contacts of relay 819, lower inner break contacts of relay 909, lower break contacts of relay 904, winding of relay 921, left-hand winding of relay 920 to negative battery through the break contacts of relay 919. Relay 920 releases at this time since negative battery is connected to all of its winding terminals. However, relay 921 does not release since sufficient current still flows through its windings to ground through high resistance 1144 connected to the tip of jack 1101 to maintain relay 921 operated. However, relay 920 is a marginal relay and will release with this small current flowing through its left-hand winding. Relay 920 in releasing completes a circuit for the operation of relay 916 from battery through the operated contacts of relay 921 and the break contacts of relay 920 to ground through the winding of relay 916. Relay 916 when operated completes a circuit for maintaining itself operated from battery through its right-hand winding and right-hand operated contacts to ground through the upper operated contacts of relay 912. Relay 920, in releasing, interrupts the operating circuit of relay 917, which in turn releases. The release of relay 917 interrupts the operating circuit of relay 828 from negative battery through the winding of relay 828, lead 843 to the released contacts of relay 917.

Relay 828, in releasing, disconnects positive battery from the tip of plug 804 and connects negative battery thereto in a circuit from negative battery through the right-hand break contacts of relay 828, right-hand winding of relay 829, winding of relay 834, the upper inner break contacts of relay 820, upper operated contacts of relay 809 to the tip of plug 804. When relay 828 connects negative battery to the tip of plug 804, relay 731 is released because negative battery is connected to both of its winding terminals from the tip of jack 701, upper operated contacts of relay 702, winding of relay 731 to negative battery connected to the upper operated contacts of relay 727. As before, current from the negative battery through resistance 745 and upper operated contacts of relay 727 through the winding of relay 731 and upper operated contacts of relay 702 to ground through the high resistance 744 is not sufficient to maintain relay 731 operated. Relay 731 will release under this condition with this small current flowing through its winding. Relay 731, in releasing, completes a circuit for the operation of relay 707 from ground through the armature and left-hand contacts of relay 731, lower inner operated contacts of relay 710 to battery through the winding of relay 707. Relay 707, in operating, interrupts the circuit through the upper winding of relay 708 and allows this relay to be operated to its spacing position by current flowing through its lower winding. When relay 708 is operated to its spacing position it interrupts the circuit through the lower winding of relay 733 and completes a circuit through the upper winding of relay 733. Current flowing through the circuit of the upper winding of relay 733 is in such a direction as to tend to cause relay 733 to operate to its left-hand position.

However, relay 733 does not immediately operate to its left-hand position because condenser 740, the upper terminal of which has been previously charged to a negative potential from negative battery through the marking contacts of relay 708, now starts to discharge through the lower winding of relay 733. This discharge current is sufficient to hold relay 733 in its right-hand position for a period of time depending upon the constants of condenser 740, resistances 739, 742 and 741 as well as the constants of relay 733. In the preferred embodiment of this invention this time interval is of the order of three-tenths of a second. At the end of this time interval the magnetic effect of the current flowing through the upper winding of relay 733 overcomes the magnetic effect of the current flowing through the lower winding of this relay and causes relay 733 to operate to its left-hand position. Relay 733, in operating to its left-hand position, completes a circuit for the operation of relay 709 from ground through the inner upper operated contacts of relay 702, the armature and left-hand contacts of relay 733 to battery through the winding of relay 709. Relay 709, in operating, interrupts the locking circuit for relay 735 from battery through the upper winding of relay 735, the lowermost operated contact of relay 710 at the lower operated contacts of relay 709. Relay 735, in releasing, interrupts the operating circuit of relay 710 which in turn releases. Relay 710, in releasing, interrupts the operating circuit of relay 707 which in turn releases.

When relay 707 releases a circuit through the upper winding of relay 708 is again completed from ground through the upper operated contacts of relay 709 through the upper winding of relay 708, upper break contact of relay 707, upper middle operated contact of relay 704 to negative battery connected through the armature and marking contacts of relay 705. Relay 708 is operated to its marking position by this current flowing through its upper windings since it overpowers the current flowing through the lower winding of this relay. Relay 708, in operating to its marking position, interrupts the circuit through the upper winding of relay 733 and completes a circuit through the lower winding of this relay. This causes relay 733 to be operated to its right-hand position substantially immediately, which in turn causes relay 709 to release. This restores the transmission circuit from the marking contact of relay 705 to the upper winding of the repeater relays 613 and 611. These relays then move to their marking contacts and transmit marking current over line 603 to the repeater at the first central station.

Receiving relay 604 of repeater 601 responds to this marking current received over line 603 by operating to its marking position. Relay 604 in operating to its marking position causes relays 506 and 514 to be operated to their marking positions in a circuit extending from negative battery through the lower winding of relay 506, upper break contacts of relay 515, lower winding of relay 514, lead 513 to positive battery through the armature and marking contacts of relay 604. Relay 506, in operating to its marking position, repeats the marking impulse over the ring of jack 501 to the operator's cord circuit at the first switching station.

The operation of relay 514 to its marking position completes a circuit for the operation of relay 530 from positive battery through the armature and marking contact of relay 514, upper break contact of relay 529 to ground through the winding of relay 530. The operation of relay 530 interrupts the locking circuit of relay 528 which causes this relay to release. The operation of relay 514 also interrupts the circuit through the upper winding of relay 517 and causes relay 517 to start to release. Approximately two-tenths of a second later relay 517 is operated to its right-hand position and completes a circuit for the operation of relay 527. The circuits for the operation of these relays have been traced in detail previously. Relay 527, in operating, causes relays 528 and 529 to operate. Relay 529, in operating, causes relay 517 to operate to its left-hand position. Relay 517, in operating to its left-hand position, completes a circuit for the operation of relay 516. Relay 516, in operating, connects the upper winding of relay 517 to the marking contact of relay 514 so that relay 517 is maintained in its left-hand position so long as relay 514 remains on its marking contact.

The operation of relay 527 disconnects ground and connects negative battery through resistance 545 to the tip of jack 501. When ground is disconnected from the tip of jack 501 and the tip of plug 315 and negative battery connected thereto, relay 320 of the cord circuit will release. However, relay 321 remains operated as described above. Relay 320, in releasing, interrupts the operating circuit for relay 317 which in turn releases. Relay 317, in releasing, extinguishes the call lamp 300 before the outward or first operator. This indicates to the outward operator that the circuit has been extended to the third operator, whereupon the first or outward operator will operate her teletypewriter or other transmitting device which causes transmitting contacts 405 to operate and transmit the desired information to the third operator to enable the operator to connect the circuit to the desired called subscriber's line.

*Extending the connection to the called subscriber's line*

The third operator upon receiving the information enabling her to connect the circuit to the desired subscriber's line, will test the subscriber's line by connecting the tip of plug 1515 to the sleeve of jack 1730. If the subscriber's line is busy or out of order a potential will appear upon the sleeve of jack 1730 and cause the operation of either relay 1611 or 1610, respectively, and give the operator the proper indication, whereupon the operator would inform the first operator that the subscriber's line was busy.

Assuming that the subscriber's line is idle, the third operator will insert plug 1515 into jack 1730. This causes the operation of relays 1711 and 1512 in a circuit from battery through the winding of relay 1512, the right-hand inner break contacts of relay 1523, sleeve of plug 1515, sleeve of jack 1730 to ground through the lower winding of relay 1711. Relay 1711, in operating, extends the transmission circuit over leads 1714 and 1716 to the subscriber's station circuit and causes relay 1712 to operate in a circuit traced from negative battery 1723 through the left-hand contact and armature of relay 1724, upper winding of relay 1712, upper operated contacts of relay 1711, lead 1716, winding of relay 1736, lower break contacts of test key 1737, upper winding of relay 1707, contacts of break key 1715, contacts of the transmitting device 1700, upper break contacts of test key 1737, upper break contacts of relay 1704 to ground. The circuit through the lower winding of relay 1712 from the ring of jack 1730, lower operated contacts of relay 1711, lower winding of relay 1712, conductor 1714, recall key 1740 is open at the upper contacts of relay 1704, consequently no current flows through the lower winding of relay 1712. Under these conditions the current flowing through the upper winding of relay 1712 causes relay 1712 to operate. Relay 1712, in operating, completes an obvious circuit for the operation of relay 1718 which in turn connects ground through the winding of relay 1724 to the tip of jack 1730.

In the cord circuit at the third switching station relay 1512, in operating, causes the operation of relay 1511 in an obvious circuit and also completes an obvious circuit through the right-hand winding of relay 1510 to hold this relay operated. Relay 1511, in operating, disconnects the operator's busy test circuit from the tip of plug 1515 and connects the windings of relays 1521 and 1520 to the tip of this plug 1515. The ground connected to the tip of jack 1730 from the operated contacts of relay 1718 causes both relays 1520 and 1521 to operate. The operation of relays 1520 and 1521 completes a circuit for the operation of relay 1517. The operation of relay 1517 connects negative battery to the upper winding of relay 1503 from negative battery through the operated left-hand inner contacts of relay 1517, lower break contacts of relay 1509, upper inner break contacts of relay 1504 to the upper winding of relay 1503. This causes relay 1503 to remain in marking position even though the ring of the subscriber's loop circuit is open at the contacts of relay 1704 at the subscriber's station. Relay 1503, in remaining in its marking position, transmits a marking impulse back over the circuit to the other switching stations. Since similar circuits have been described in detail in connection with the operation of the cord circuit at the first and second switching stations, the details of each specific circuit will not be described, it being understood that the corresponding relays operate in similar circuits.

The operation of relay 1517 completes a circuit for the operation of relay 1428. Relay 1428, in operating, connects positive battery through the windings of relays 1429 and 1434 to the tip of plug 1404. This causes the operation of relay 1331 in a circuit from the tip of jack 1301 to negative battery connected to the upper operated contacts of relay 1327 through resistance 1345.

The operation of relay 1331 completes a circuit for the operation of relay 1335, which in turn completes a circuit for the operation of relay 1310. Relay 1310, in operating, connects ground through its inner upper operated contacts to the transmission circuit extending to negative battery connected through the marking contacts of relay 1305 and thus provides a circuit for holding relay 1308 in its marking position. The operation of relay 1310 interrupts the transmission circuit extending over lead 1312 to the upper windings of relays 1213 and 1211 which causes these relays to be operated to their spacing positions. Relays 1213 and 1211, in operating to their spacing positions, transmit spacing current over line 1203 to the repeater 1201 at the second switching station. Relay 1204 of repeater 1201 responds to the spacing current and operates to its spacing position. This in turn causes relays 1106 and 1114 to operate to their spacing positions.

The operation of relay 1106 to its spacing position transmits a spacing impulse over the transmission circuit through the ring of jack 1101. This spacing impulse is transmitted from the ring of plug 915 through the repeating relay 903 to the ring of plug 804. From the ring of plug 804 it is transmitted over the ring of jack 701 and causes relay 705 to repeat a spacing impulse to repeater 602. Relay 705, in moving to its spacing contacts at this time, causes relay 708 to move to its spacing contact. In the spacing position relay 708 interrupts the circuit through the lower winding of relay 733 and completes a circuit through the upper winding of this relay. After approximately three-tenths of a second relay 733 is operated to its left-hand position where it completes a circuit for the operation of relay 709.

Relay 709, in operating, connects ground to the transmission circuit extending from the upper operated contacts of relay 709, upper winding of relay 708, upper contacts of relay 707, upper operated contacts of relay 704 to the armature of relay 705. The operation of relay 709 also connects ringing current from source 749 through the upper operated contacts of relay 709 to the upper break contacts of relays 711 and 710 to positive battery through the upper windings of relays 611 and 613. Relays 611 and 613 will follow the ringing current and will transmit a series of impulses of substantially unit length of alternate marking and spacing character over line 603.

When the spacing impulse is first received by relay 705, relay 705 repeats this spacing impulse to relays 613 and 611 of repeater 602. These relays in turn repeat the impulse over line 603 to the receiving relay 604 of repeater 601. Repeater relay 604 in turn repeats the spacing impulse to relays 506 and 514. Relay 506 repeats the spacing impulse through the lower winding of relay 505 and over the ring of jack 501. Relay 514, in operating to its spacing position in response to this spacing impulse, interrupts the circuit through the upper winding of relay 517. About two-tenths of a second later relay 517 operates to its right-hand position where it completes a circuit for the operation of relay 532. Relay 532, in operating, completes a circuit for the operation of relay 515. Relay 515 in turn completes a circuit through the upper winding of relay 517 which causes this relay to again be operated to its left-hand position. Relay 515, in operating, also disconnects the lower winding of relay 506 from the transmission circuit extending through the lower winding of relay 514, conductor 513 to repeater 601 and thus insures that a spacing signal will continue to be transmitted over the ring of jack 501.

Relay 517, in operating to its left-hand position, completes a circuit for the operation of relay 536. Relay 536, in operating, interrupts the circuit from negative battery through resistance 518, upper winding of relay 517, lower operated contacts of relay 515 and upper operated contacts of relay 536 to positive battery connected to the armature of relay 514, whereupon relay 517 again starts to be operated to its right-hand position. However, it should be noted that relay 517 started to operate to its right-hand position the first time at substantially the same time that relay 733 started to operate to its left-hand position. Three-tenths of a second later relay 733 operated to its spacing position and completed a circuit through its left-hand contacts which operated relay 709. Relay 709 in operating applied ringing current to the line extending to the first switching station. This ringing current arrives at the second switching station at about the middle of the second two-tenths-second interval of relay 517. This ringing current which is transmitted to the first switching station is received by relay 514 as a series of impulses of alternate character of substantially unit length. This causes the armature of relay 514 to be operated alternately between its marking and spacing contacts for short intervals of time. During the time relay 514 is connected to its marking contacts it charges the right-hand terminal of condenser 520 to a positive potential and thus prevents it from ever discharging sufficiently to permit relay 517 to operate to its right-hand position. During the time intervals or impulses during which relay 514 is connected to its spacing contact, it connects positive battery to the upper terminal of condenser 548 and to the upper winding of relay 532. The constants of this relay winding, condenser 548 and resistance 547 are such that relay 532 will remain operated at these times. The circuit at the first switching station remains in this condition so long as the ringing current is received over line 603.

When relay 506 was operated to its spacing position it repeated the spacing impulse over the ring of jack 501 to the ring of plug 315. This spacing impulse is received by relay 303 which in turn repeats the spacing impulse both to the operator at the first switching station and to the subscriber's station shown in Fig. 1. This indicates to the operator and the subscriber that the circuits are being established. If it is considered undesirable to transmit this spacing impulse to the subscriber's station, the operator at the first central station may operate splitting key 235. This operates relay 215 and connects positive battery to the transmission circuit extending through the upper operated contacts of relay 215, lower break contacts of relay 213, lower operated contacts of relay 209 to the ring of plug 204. It is then transmitted through the ring of jack 130 to the subscriber's station shown in Fig. 1 where it maintains relay 107 operated, thus preventing the reception at the subscriber's station of this break signal. Operation of this splitting key will also prevent the reception at the subscriber's station shown in Fig. 1 of the various signals and information transmitted by the first operator over the system to establish the connection to the called subscriber's station circuit shown in Fig. 17.

Returning now to the circuits at the intermediate station, when the break signal transmitted by the operation of relay 1310 is first received by relay 1114, relay 1114 is operated to its spacing position. Here it interrupts the circuit through the upper winding of relay 1117. About two-tenths of a second later relay 1117 is operated to its right-hand position where it completes a circuit for the operation of relay 1132. Relay 1132, in operating, completes a circuit for the operation of relay 1115. Relay 1115, in operating, disconnects the lower winding of relay 1106 from the transmission circuit extending over lead 1113 and again establishes a circuit through the upper winding of relay 1117, causing this relay to be operated substantially at once to its left-hand position where it completes a circuit for the operation of relay 1136. Relay 1136 locks operated in a circuit controlled through the right-hand contacts of relay 1132 and again interrupts the circuit through the upper winding of relay 1117. Approximately two-tenths of a second later relay 1117 is again operated to its right-hand position where it completes a circuit for the operation of relay 1134. Relay 1134, in operating, interrupts the locking circuit of relay 1127 and locks operated to a circuit controlled through the lower operated contacts of relay 1127. Relay 1127 releases and in turn releases relays 1134, 1129 and 1116. Relay 1128 remains operated in the circuit extending from ground through its winding, its upper operated contacts, lower break contacts of relay 1111 and upper break contacts of relay 1130 to battery. Relay 1116, in releasing, interrupts the locking circuit of relay 1132 and permits this relay to be operated to its left-hand position by current flowing through its center winding. Relay 1132, in releasing, in turn releases relays 1115 and 1136.

Relay 1127, in releasing, connects ground through resistance 1146 to the tip of jack 1101. The ground connected to the tip of jack 1101 causes relay 920 to operate in a circuit extending from the tip of jack 1101 and the tip of plug 915 through the windings of relays 920 and 921. Relays 920 and 921, when operated, complete a circuit for the operation of relay 917. Relay 917, in operating, completes a circuit from negative battery through resistance 926, inner left-hand operated contact of relay 917, lower break contacts of relay 909, upper break contacts of relay 904 through the upper winding of relay 903 to positive battery through the armature and marking contacts of relay 902. This causes relay 903 to be operated to its marking contact and thus transmit marking current over the transmission circuit extending through the ring of plug 804 and jack 701.

Relay 705 responds to this marking current by operating to its marking position. This causes relay 708 to be operated to its marking position and in turn causes relay 733 to be operated to its right-hand position substantially at once. Relay 733, in operating to its right-hand position, interrupts the operating circuit for relay 709. Relay 709 thereupon releases and removes ringing current from the transmission circuit extending to repeater 602 and reconnects this transmission circuit to the armature of relay 705. Since the armature of relay 705 is now resting upon its marking contact, marking current is transmitted to repeater 602. Repeater 602 in turn repeats the marking current to repeater 601. Repeater 601 repeats this current to relay 514. Relay 514 responds to the marking current by operating to its marking position. In operating to its marking position relay 514 interrupts the locking circuit through the upper winding of relay 532 thus permitting relay 532 to be operated to its left-hand position by current flowing through its center winding. Relay 532, in operating to its left-hand position, interrupts the operating circuit of relay 515 and the locking circuit of relay 536, thus permitting these relays to release. The release of relay 515 reconnects the lower winding of relay 506 to the transmission conductor 513 extending from the repeater 601. Since a marking impulse is now being transmitted by relay 604 over line 513, relay 506 is operated to its marking position. This repeats marking current over the ring of jack 501 to the ring of plug 315 and thence to the operator's position circuit and to the subscriber's circuit shown in Fig. 1, provided splitting key 235 has not been operated. If the splitting key 235 had been operated the circuit to the subscriber's station shown in Fig. 1 is maintained in the marking position at all times so that the marking impulse is only repeated to the operator's position circuit.

Returning again to the intermediate station, the operation of relay 917 also completes a circuit for the operation of relay 828. The operation of relay 828 connects positive battery to the tip of plug 804 through the right-hand winding of relay 829 and winding of relay 834. Positive battery connected to the tip of jack 701 from the operated contacts of relay 828 through the tip of plug 804 causes relay 731 to operate. Relay 731, in operating, causes relay 735 to operate and relay 735 in turn completes an operating circuit for relay 710. Relay 710, in operating, connects ground to the transmission circuit extending through the upper break contacts of relay 709, the upper winding of relay 708, upper break contacts of relay 707, and the upper middle operated contacts of relay 704 to negative battery through the marking contacts of relay 705. Operation of relay 710 interrupts the transmission circuit extending over lead 712 to repeater 602. Repeater 602 recognizes this interruption as a spacing signal which it repeats over line 603 to repeater 601. Repeater 601 in turn repeats this spacing signal to relays 514 and 506. Relay 506 repeats the spacing signal over the ring of jack 501 to the ring of plug 315 and thence to the operator's position circuit and subscriber's station circuit shown in Fig. 1.

The operation of relay 514 to its spacing position interrupts the circuit through the upper winding of relay 517. Relay 517 after approximately two-tenths of a second is then operated to its right-hand position where it completes a circuit for the operation of relay 532, in operating, completes a circuit for the operation of relay 515. Relay 515, in operating, interrupts the operating circuit of relay 506 through its lower winding and thus insures that relay 506 will remain on its spacing contacts so long as relay 515 is operated. Relay 515, in operating, again completes a circuit through the upper winding of relay 517 and thus causes this relay to be operated to its left-hand position where it completes a circuit for the operation of relay 536. Relay 536, in operating, completes a locking circuit from battery through its upper winding, upper inner operated contacts to ground through the right-hand contacts and armature of relay 532. Relay 536, in operating, again interrupts the circuit through the upper winding of relay 517. This, of course, assumes that relay 514 remains in its spacing position during all this time, as it normally would. Approximately two-tenths of a second later relay 517 again operates to its left-hand position where it completes a circuit for the operation of relay 534. The operation of relay 534 interrupts the locking circuit of relay 527, thus permitting this relay to release. Relay 527, in releasing, interrupts the operating circuit of relay 529 and the locking circuits of relays 516 and 534, thus permitting these relays to release. The release of relay 516 interrupts the locking circuit of relay 532, thus permitting relay 532 to release. Relay 532, in releasing, interrupts the operating circuit of relay 515 and the locking circuit of relay 536, thus allowing these relays to release.

The release of relay 527 connects ground from the lower break contacts of relay 521, resistance 546 and upper break contacts of relay 527, winding of relay 531, to the tip of jack 501. This ground causes relay 320 of the cord circuit at the first switching station to be operated from the tip of plug 315, winding of relay 321 and left-hand winding of relay 320. Relay 320, in operating, completes an operating circuit for relay 317. Relay 317 operated connects negative battery through resistance 326 to the upper winding of relay 303 and thus causes this relay to be operated to its marking position. This repeats a barking impulse to the subscriber's station circuit provided the splitting key 235 has not been operated and also to the operator's position circuit. The operation of relay 317 also completes a circuit for the lighting of calling lamp 300. This indicates to the operator at the first switching point that the operator at the third central station has inserted a plug in the line of the called subscriber but that the called subscriber has not as yet answered the call.

Ringing the called subscriber

Ringing current may be applied to the called subscriber's line to operate the bell at the subscriber's station shown in Fig. 17 in different ways. One way would be to instruct the third operator, after she has inserted plug 1515 into jack 1730 of the called subscriber's line circuit, to momentarily operate ringing key 1417. The operation of ringing key 1417 causes relay 1504 to operate in a circuit from ground through the operated contacts of ringing key 1417 to battery through the winding of relay 1504. The operation of relay 1504 connects negative battery through resistance 1526 and upper inner operated contacts of relay 1504 to positive battery through the upper winding of relay 1503 and the armature and marking contacts of relay 1502. This circuit maintains relay 1503 in its marking position. The operation of relay 1504 completes a circuit for the operation of relay 1509 from ground through the operated contacts of relay 1718, the winding of relay 1724, tip of jack 1730, tip of plug 1515, upper operated contacts of relay 1511, lower inner break contacts of relay 1420, lower break contacts of relay 1419, lower inner operated contacts of relay 1504 to battery through the winding of relay 1509. The operation of relay 1509 completes an obvious circuit for lighting the ring-guard lamp 1501 and completes a locking circuit from battery through its winding, lower inner operated contacts, lower break contacts of relay 1419, lower inner break contacts of relay 1420, upper operated contacts of relay 1511, tip of plug 1515, tip of jack 1730, winding of relay 1724 to ground through the operated contacts of relay 1718. It should be noted that relay 1724 is a polarized relay and that the current flowing through the winding of relay 1724 is in such a direction as to maintain relay 1724 in the position shown.

The operation of relay 1509 connects ringing current from source 1507, lower inner operated contacts of relay 1504, lowermost operated contacts of relay 1509, lower operated contacts of relay 1511, lower break contacts of relay 1514 to the ring of plug 1515, ring of jack 1730, operated contacts of relay 1711, lower winding of relay 1712, conductor 1714, contacts of recall key 1740, to ground through condenser 1742 and ringer 1708, contacts of key 1737, and upper break contacts of relay 1704, thus causing the subscriber's bell 1708 to ring. It should be noted that the windings of relays 1520 and 1521 remain connected to the tip of plug 1515 in a circuit traced from tip of plug 1515, the upper operated contacts of relay 1511, lower inner break contacts of relay 1420, lower break contacts of relay 1419, left-hand operated contacts of relay 1428, winding of relay 1521, left-hand winding of relay 1520 to negative battery through the break contacts of relay 1519.

When the operator at the third central station releases the ringing key 1417 relay 1504 will release. However, relay 1509 remains operated. Relay 1504, in releasing, transfers the ring of plug 1515 from source of ringing current 1507 to the source of ringing current 1508 through the lower make contacts of relay 1511, lower make contacts of relay 1509, lower middle break contacts of relay 1504, and the upper operated contacts of relay 1506. It should be noted that when relay 1509 operated it connected battery through its upper operated contacts to the winding of relay 1506. Consequently, when the interrupter 1505 is closed, relay 1506 is operated. When interrupter 1505 is open relay 1506 releases. Thus during the time intervals relay 1506 is operated, ringing current is connected to the calling subscriber's station which causes his bell 1708 to operate. During the time that relay 1506 is released positive battery is connected through the break contacts of relay 1506 to the subscriber's station circuit. This is to maintain relay 1707 at the subscriber's station circuit operated when the subscriber answers the call.

It is also possible for the operator at the first station to ring a subscriber at the station shown in Fig. 17. In this case the operator at the third switching station will be instructed not to operate her ringing key 1417. After the operator at the first central station observes the lighted lamp 300, signifying to her that the operator at the third or last switching station has inserted a plug in the called subscriber's line, the operator at the first switching station may apply ringing current to the subscriber's line extending to the subscriber's station shown in Fig. 17 by operating ringing key 217. The operation of key 217 causes the operation of relay 304 in the circuit extending from ground through the operated contacts of key 217 to battery through the winding of relay 304. The operation of relay 304 connects negative battery through resistance 326, upper inner operated contacts of relay 304 to the upper winding of relay 303, thus tending to maintain this relay in the marking position. The operation of relay 304 also completes a circuit for the operation of relay 309 from ground through the lower break contacts of relay 521, resistance 546, upper break contacts of relay 527, winding of relay 531, upper operated contacts of relay 502, tip of jack 501, tip of plug 315, upper operated contacts of relay 311, lower inner break contacts of relay 220, lower break contacts of relay 219, lower inner operated contacts of relay 304 to battery through the winding of relay 309. The operation of relay 309 connects battery in an obvious circuit to light ring-guard lamp 301. The operation of relay 309 connects battery through the upper operated contacts of relay 309 to the winding of relay 306. Relay 306 then follows interrupter 305. The operation of relay 309 connects ringing current from source 307 through the lower middle operated contacts of relay 304, lower operated contacts of relay 309, lower operated contacts of relay 311, lower break contacts of relay 314 to the ring of plug 315. It is to be noted that in this case the operation of relay 304 interrupts the operating circuit of relays 321 and 320 at the lowermost break contacts of relay 304, thus permitting relays 321 and 320 to release. The release of relays 320 and 321 interrupts the operating circuit of relay 317 which in turn interrupts the circuit of lamp 300, thus extinguishing lamp 300.

When the operator releases ringing key 217 relay 304 will release. However, relay 309 does not release but it is locked operated in a circuit from battery through its winding and lower inner operated contacts, lower break contacts of relays 219 and 220, upper operated contacts of relay 311 to tip of plug 315, tip of jack 501, upper operated contacts of relay 502, winding of relay 531, upper break contacts of relay 527, resistance 546 to ground through the lower break contacts of relay 521. The release of relay 304 disconnects source of ringing current 307 from the ring of plug 315 and then connects source of ringing current 308 through the operated contacts of the interrupter relay 306 and break contacts of relay 304, lower operated contacts of relay 309, lower operated contacts of relay 311 and lower break contacts of relay 314 to the ring of plug 315.

The ringing current from the ring of plug 315 is applied to the ring of jack 501, the lower operated contacts of relay 502 to repeating relay 505. Relay 505 follows the ringing current and repeats a series of telegraph signaling impulses of substantially a unit length of alternate marking and spacing character to the repeating relays 610 and 612 of repeater 601. Ringing current or the series of impulses repeated by relay 505 is transmitted through the upper winding of relay 508 which responds thereto by causing its armature to rest first against its marking contact and then against its spacing contact alternately during alternate half cycles of the ringing current. Relay 508, however, does not remain in its spacing position sufficiently long to allow relay 533 to operate to its right-hand position. These relays repeat the impulses over line 603 to the receiving relay 605 of repeater 602. Receiving relay 605 repeats these impulses over line 713 to relays 714 and 706. Relays 714 and 706 follow these signaling impulses which are generated by applying ringing current to the ring of plug 315.

It should be noted that relay 714 in following these ringing impulses remains for short intervals of time first on its marking contact, then on its spacing contact, then on its marking contact, etc. During the time relay 714 is in its marking position positive battery is connected to the left-hand terminal of condenser 720, thus tending to maintain this condenser charged sufficiently positive to hold relay 717 in its right-hand position.

Relay 706 repeats this series of impulses of substantially unit length and alternate character through the lower winding of relay 705, lower operated contacts of relay 702, ring of jack 701, ring of plug 804, lower operated contacts of relay 809, lower break contacts of relay 813, upper and lower break contacts of relay 815, left outer break contacts of relay 821, upper and lower outer break contacts of relay 820 to the upper winding of relay 902. Relay 902 in turn follows these impulses and repeats them over a circuit extending from its armature through the upper winding of relay 903, upper inner break contacts of relay 904, lower middle break contacts of relay 909, left-hand inner operated contacts of relay 917, the winding of relay 913 through condenser 927 to ground. These impulses are also repeated through the lower break contacts of relay 911, lower break contacts of relay 914 to the ring of plug 915 for a short interval of time. However, relay 913 is operated by these impulses of opposite polarity, alternately charging and discharging condenser 927 through its winding. Relay 913, in operating, completes an obvious circuit for the operation of relay 914. Relay 914, in operating, connects source of ringing current 908 to the ring of plug 915 through the lower operated contacts of relay 914. This ringing current is transmitted from the ring of plug 915 through the ring of jack 1101, lower operated contacts of relay 1102, through the lower winding of relay 1105 to battery through the armature and contacts of relay 1106.

Relay 1105 follows the ringing current and transmits a series of impulses of alternate character of substantially unit length to repeater 1201. Ringing current or the repeated series of impulses flows through the upper winding of relay 1108 and causes this relay to alternately close its marking and spacing contacts in response thereto. Relay 1108 does not remain in the spacing position sufficiently long at this time to cause relay 1133 to operate to its right-hand position. Repeater 1201 in turn repeats these impulses to repeater 1202. Repeater 1202 in turn repeats these impulses over conductor 1313 to relays 1314 and 1306.

Here again relay 1314 does not remain in its spacing position sufficiently long to allow condenser 1320 to discharge so that relay 1317 will not operate to its left-hand position but will remain in its right-hand position.

Relay 1306 repeats these impulses through the lower winding of relay 1305, lower operated contacts of relay 1302 to the ring of jack 1301, ring of plug 1404 to the upper winding of relay 1502 through contacts of relays 1409, 1413, 1415, 1421 and 1420. Relay 1502 again repeats these impulses and causes relay 1513 to operate in a circuit traced from the armature of relay 1502, upper winding of relay 1503, upper inner break contacts of relay 1504, lower break contacts of relay 1509, left-hand inner operated contacts of relay 1517, winding of relay 1513, condenser 1527 to ground. Relay 1513, in operating, completes an obvious circuit for operating relay 1514 and relay 1514 in operating connects source of ringing current 1508 through its lower operated contacts to the ring of plug 1515. This ringing current is then applied to the subscriber's line circuit through ring of jack 1730, lower operated contacts of relay 1711, lower winding of relay 1712, conductor 1714, break contacts of recall key 1740 condenser 1742, the winding of ringer 1708, contacts of key 1737 to ground through the upper break contacts of relay 1704, thus causing the subscriber's bell to ring. During the time relay 306 is not operated ringing current is removed from the ring of plug 315. This in turn causes relays 913 and 1513 to release and thus disconnect ringing current from the subscriber's line.

*Subscriber answers*

The subscriber at the station shown in Fig. 17 upon hearing bell 1708, answers by operating start key 1706. This completes a circuit for the operation of relay 1705 from source of alternating current 1703, through the winding of relay 1705, contacts of start key 1706 to the opposite or grounded terminal of source of alternating current power supply 1703. Relay 1705 in operating completes a locking circuit from source of power 1703, winding of relay 1705, lower operated contacts of relay 1705, break contacts of stop key 1738 and automatic stop contacts 1739 to the other side of source of power 1703. Relay 1705, in operating, also connects the source of power 1703 to motor 1702 and to relay 1704. Motor 1702 will start and relay 1704 will operate. If the sources of potential 1750, 1751 and 1752 are supplied by a rectifier from source of power 1703, relay 1705 will also connect alternating current to this rectifier and thus supply power for these sources of potential. When relay 1704 operates it removes ground from ringer 1708 and from conductor 1716 and connects conductors 1714 and 1716 together through the winding of relay 1736, break contacts of key 1737, upper winding of relay 1707, contacts of break key 1715, contacts of transmitting device 1700, contacts of key 1737, operated contacts of relay 1704 and break contacts of recall key 1740.

When relay 1704 removes ground from conductor 1716 relay 1712 at the third switching station will release because both windings of relay 1712 are now connected in series with the line circuit to the subscriber's station. One winding is connected in series with each of the line conductors to the subscriber's station circuit. Consequently, both windings carry the same current and since these windings are connected in opposition to each other, the relay releases. The release of relay 1712 permits relay 1718 to release which in turn disconnects ground from the tip of jack 1730. This disconnects ground from the tip of plug 1515 and permits relays 1520 and 1521 to release.

In case the operator at the third switching station started the ringing by operating the ringing key 1417 relays 1509 and 1506 will also release when the ground is removed from the tip of jack 1730. The release of relay 1509 interrupts the circuit of the ring-guard lamp 1501 which is thus extinguished.

The release of relays 1520 and 1521 interrupts the operating circuit of relay 1517 and thus permits this relay to release. The release of relay 1517 interrupts the operating circuit of relay 1428 and causes this relay to release. The release of relay 1428 disconnects positive battery from the tip of plug 1404 and connects negative battery thereto. When positive battery is disconnected from the tip of plug 1404 and jack 1301, relay 1331 will release. Relay 1331, in releasing, completes a circuit for the operation of relay 1307 from ground through the left-hand contacts of relay 1331, lower inner operated contacts of relay 1310 to battery through the winding of relay 1307. Relay 1307, in operating, interrupts the circuit through the upper winding of relay 1308, thus permitting current flowing through the lower winding of relay 1308 to operate relay 1308 to its spacing or left-hand contact. Some time later, greater than about three-tenths of a second, condenser 1340 becomes sufficiently discharged to permit current flowing through the upper winding of relay 1333 to operate relay 1333 to its left-hand position and thus complete a circuit for the operation of relay 1309 from ground through the upper inner operated contacts of relay 1302, the armature and left-hand contact of relay 1333 to battery through the winding of relay 1309. The operation of relay 1309 interrupts the locking circuit of relay 1335 and permits this relay to release. Relay 1335, in releasing, interrupts the operating circuit of relay 1310 and permits this relay to release. The release of relay 1310 interrupts the operating circuit of relay 1307. The release of relay 1307 completes a circuit through the upper winding of relay 1308 from ground through the upper operated contacts of relay 1309, upper winding of relay 1308, upper break contacts of relay 1307, upper middle operated contacts of relay 1304 to negative battery through the armature and marking contacts of relay 1305. Relay 1308 will operate to its marking position due to current flowing through its upper winding in this circuit. The operation of relay 1308 to its marking position interrupts the circuit through the upper winding of relay 1333 and completes a circuit through the lower winding of this relay and causes it to move immediately to its right-hand position where it interrupts the operating circuit of relay 1309. Relay 1309, in releasing, reestablishes the transmission circuit between the armature of relay 1305 and repeater 1202 which causes relays 1213 and 1211 to move to their marking positions and transmit a marking impulse over line 1203 to the repeater 1201 at the second switching station. Receiving relay 1204 of repeater 1201 is operated to its marking position which causes relays 1106 and 1114 to be operated to their marking positions. The operation of relay 1106 to its marking position causes this relay to repeat a marking impulse or marking current over the ring of jack 1101. The operation of relay 1114 to its marking position completes a circuit for the operation of relay 1130 which in turn interrupts the locking circuit of relay 1128, thus allowing relay 1128 to release.

In operating to its marking position relay 1114 interrupts the circuit of the upper winding of relay 1117 through the spacing contact of relay 1114. Approximately two-tenths of a second later relay 1117 is operated to its right-hand position. In operating to its right-hand position, relay 1117 completes a circuit for the operation of relay 1127. Relay 1127 in turn completes circuits for the operation of relays 1129 and 1128. Relay 1127, in operating, also completes a locking circuit for maintaining itself operated under control of relay 1134. The operation of relay 1129 completes a circuit through the upper winding of relay 1117 and causes this relay to be operated to its left-hand position where it completes a circuit for the operation of relay 1116. Relay 1116, in operating, connects the upper winding of relay 1117 to the marking contact of relay 1104 and thus maintains relay 1117 in its left-hand position as long as relay 1114 remains in its marking position.

The operation of relay 1127 disconnects ground from the tip of jack 1101 and connects negative battery thereto. This causes relay 920 of the cord circuit at the second switching station to release. The release of relay 920 interrupts the operating circuit of relay 917, whereupon relay 917 releases. The release of relay 917 interrupts the operating circuit of relay 828 which in turn releases. The release of relay 828 removes positive battery from the tip of plug 804 and connects negative battery through the windings of relays 829 and 834 thereto. When positive battery is removed and negative battery connected to the tip of plug 804 relay 731 is operated to its left-hand position where it completes a circuit for the operation of relay 707. Relay 707, in operating, interrupts the circuit through the upper winding of relay 708. Relay 708 thereupon is operated to its spacing position where it interrupts the circuit through the lower winding of relay 733 and completes a circuit through the upper winding of relay 733. Over three-tenths of a second later when charging current of condenser 740 has fallen to a sufficiently low value, current flowing through the upper winding of relay 733 causes this relay to move to its left-hand position where it completes a circuit for the operation of relay 709. The operation of relay 709 interrupts the locking circuit of relay 735. The release of relay 735 interrupts the operating circuit of relay 710. The release of relay 710 in turn releases relay 707. The release of relay 707 reestablishes a circuit through the upper winding of relay 708 from ground through the upper operated contacts of relay 709, upper winding of relay 708, upper break contacts of relay 707, upper middle operated contacts of relay 704 to negative battery through the armature and marking contacts of relay 705. Relay 708 operates due to current flowing in this circuit and interrupts the circuit through the upper winding of relay 733 and completes a circuit through the lower winding of this relay which causes this relay to move to its right-hand position at once and interrupt the operating circuit of relay 709. The release of relay 709 reestablishes the transmission path between the armature of relay 705 and repeater 602 and causes the repeating relays 613 and 611 to be operated to their marking positions and transmit a marking impulse over line 603 to repeater 601. Receiving relay 604 of repeater 601 responds to this marking impulse and moves to its marking position. This completes a circuit for the operation of relays 506 and 514 to their marking positions. The operation of relay 506 repeats the marking impulse over the ring of conductor of jack 501. The operation of relay 514 to its marking position completes a circuit for the operation of relay 530. The operation of relay 530 interrupts the locking circuit of relay 528 and thus allows this relay to release. The operation of relay 514 to its marking position interrupts the circuit through the upper winding of relay 517 and the spacing contacts of relay 514. Approximately two-tenths of a second later when the charging current of condenser 520 has fallen to a sufficiently low value, relay 517 is operated to its right-hand position where it completes a circuit for the operation of relay 527. Relay 527, in operating, completes circuits for the operation of relays 528 and 529. Relay 527, in operating, also completes a locking circuit for maintaining itself operated under control of relay 534. The operation of relay 529 again completes a circuit through the upper winding of relay 517 and causes this relay to move to its left-hand position where a circuit is completed for the operation of relay 516. The operation of relay 516 connects the upper winding of relay 517 to the marking contact of relay 514, thus maintaining relay 517 operated so long as relay 514 remains in its marking position.

The operation of relay 527 disconnects ground from the tip of jack 501 and connects negative battery thereto. This causes the release of relay 320 in the cord circuit. The release of relay 320 interrupts the operating circuit of relay 317 and allows this relay to release. The release of relay 317 interrupts the circuit of the call lamp 300, if the ringing was started by the third operator, thus indicating to the operator that the called subscriber has answered and that the circuits are now in condition for communication between the subscribers.

If the first operator started the ringing, then the removal of ground from the tip of jack 501 causes relay 309 to release which in turn interrupts the circuit of the ring-guard lamp 301, thus extinguishing this lamp and indicating to the operator that the called subscriber has answered.

It should be noted that during short intervals of time during which relays 1309 and 709 are operated, ringing current from sources 1349 and 749 is transmitted over the transmission circuit. This ringing current is repeated by the repeating relays and causes relays 1114 and 514 to be operated alternately to their marking and spacing positions for intervals of time of substantially unit signaling periods. This time is too short to permit relay 1117 or 517 to be operated to its right-hand position. Relays 1130 and 530, however, may or may not be operated at the time and may or may not cause the release of relays 1128 and 528. The operation of relays 1130 and 530 and release of relays 1128 and 528 perform no useful function at this time.

*Transmitting circuits*

The subscribers may now communicate with each other over the entire system and any of the operators who so desire may monitor on the circuit by operating their teletypewriter keys 224, 824 or 1424, as the case may be. The subscriber at the station shown in Fig. 1 transmits signaling impulses by operating the transmitting device at this station. This in turn causes transmitting contacts 100 to open and close in accordance with the signaling impulses to be transmitted. These impulses are transmitted to the first central station over the subscriber's line or loop comprising conductors 114 and 116. The differential relay 112 at the first central station does not respond to these impulses because its windings carry the same current, but in opposite directions, so that the magnetic effect of one winding is at all times balanced by an equal and opposite magnetic effect of the other winding during the transmission of these impulses. Relay 302 in the cord circuit at the first subscriber's station, however, does respond to the signaling impulses transmitted by the subcriber at the station shown in Fig. 1. Relay 302 repeats these impulses to relay 505 and relay 505 in turn repeats these impulses to the transmitting relays 610 and 612 of the repeater 601 at the first central station. The transmission path from relay 505 may be traced from the armature of relay 505, upper middle operated contacts of relay 504, upper break contacts of relay 507, upper winding of relay 508, upper break contacts of relay 509, upper break contacts of relay 510, upper break contacts of relay 511, conductor 512 through the upper windings of relays 610 and 612. The impulses are repeated by relays 610 and 612 through the noise reducing filter 608 which may include any of the usual filtering elements or sections suitable for reducing noise or interference currents transmitted over the telegraph system due to the operation of relays 610 and 612. From filter 608 the impulses are transmitted through the upper and lowermost windings of receiving relay 604 over conductors or line 603 to the second or through-switching station. Relay 604, however, does not respond to these signaling impulses because signaling impulses of substantially the same magnitude are transmitted through the central windings of this relay to the artificial line 606. The currents traversing these middle windings are substantially equal and opposite to the currents traversing the upper and lowermost windings of this relay and thus the combined effect of all of these currents is largely neutralized so that relay 604 does not respond to the impulses transmitted by transmitting relays 610 and 612. The signaling impulses are then transmitted over line 603.

It is to be understood that while the metallic circuit is disclosed in this application, any two-way full duplex channel connecting the stations is all that is required. This channel may include open-wire lines, cable lines, carrier current channels, radio channels or any other type of electrical communication channel capable of transmitting messages in both directions simultaneously thereover. Line 603 may also include any combinations of these lines and may also include any and all necessary composite sets usually employed when both telephone and telegraph signaling currents are simultaneously transmitted over one or more conductors of communication line. Line 603 may also include any and all necessary or suitable repeaters which are capable of simultaneously repeating signaling impulses transmitted over the line system or channel in both directions. Receiving relay 605 of repeater 601 at the second or through-switching station responds to these signaling impulses and repeats them over conductor 713 to the repeating relay 706 at the second or through-switching station. Relay 706 in turn repeats these signaling impulses through the lower winding of relay 705, lower break contacts of relay 702 to the ring of jack 701.

It should be noted that relays 508 and 714 have one winding connected in series with the transmission path over which these impulses are being transmitted. These relays are arranged to respond to these signaling impulses. However, in responding to these signaling impulses these relays do not remain in their spacing positions or out of their marking positions sufficiently long to cause the operation of any of the relays controlled by their contacts.

The signals received from the ring of jack 701 are repeated by relay 902 to the ring of plug 915. These signals are then transmitted over the ring of jack 1101 to relay 1105 which responds to these impulses and repeats them over conductor 1112 to relays 1210 and 1212. Relays 1210 and 1212 in turn repeat these signaling impulses over conductor 1203.

Conductor 1203 may include any of the different types of telegraph facilities outlined with reference to the description of line 603. It is not essential that the signals be transmitted over line 603 in the same manner or over the same type of circuits when they are transmitted over line 1203. For example, the signaling impulses may be transmitted over an open-wire circuit in line 603 whereas they may be transmitted over a radio channel included in line 1203 shown in Fig. 12.

At the third central station the receiving relay 1205 of repeater 1202 responds to these signaling impulses and repeats them over line 1313 to relay 1306. Relay 1306 in turn repeats the signaling impulses over the ring of jack 1301 through the lower winding of relay 1305 and lower operated contacts of relay 1302 to the ring of jack 1301.

Here again relays 1108 and 1314 respond to the signaling impulses transmitted over the system. However, as pointed out above with reference to relays 508 and 714, these relays do not remain in their spacing positions sufficiently long to cause the operation of any of the other relays of the system at this time.

From the ring of jack 1301 the signals are transmitted over the ring of plug 1404 to the repeating relay 1502 which in turn repeats the signaling impulses over the ring of plug 1515 to the called subscriber's station circuit shown in Fig. 17. Here again relay 1712 at the third central station does not respond to these signaling impulses. However, relay 1707 at the subscriber's station does respond to them and repeats them to the teletypewriter receiving magnet 1701. This magnet responds to these signaling impulses and controls the teletypewriter or printing telegraph instrument and causes it, in the preferred embodiment of this invention, the signaling impulses to be recorded on the teletypewriter.

The subscriber at the subscriber's station shown in Fig. 17 may also transmit telegraph signaling impulses to the subscriber's station shown in Fig. 1. To do this, the subscriber at the station shown in Fig. 17 properly conditions his teletypewriter apparatus and then causes it to transmit the desired signaling impulses from contacts 1700. These impulses are transmitted to the repeating relay 1503 which in turn repeates them over the ring of plug 1404 through the lower winding of relay 1305. Relay 1305 responds to these signaling impulses and transmits them to the transmitting relays 1213 and 1211 of the repeater 1202 at the third or terminal switching station. Relays 1213 and 1211 in turn repeat the signaling impulses over the telegraph channel 1203. At the second or intermediate switching station the receiving relay 1204 of repeater 1201 responds to these signaling impulses and repeats them over lead 1113 to relay 1106. Relay 1106 responds to these signaling impulses and repeats them through the lower winding of relay 1105, lower operated contacts of relay 1102 to the ring of jack 1101.

Here again relays 1308 and 1114 respond to these signaling impulses. However, in response to the signaling impulses normally transmitted over the telegraph system at this time these relays do not remain in their spacing positions for a sufficiently long interval of time to cause the operation of any of the other relays of the system.

From the ring of jack 1101 these signaling impulses are transmitted over the ring of plug 915 to the repeating relay 903 at the intermediate switching station. Relay 903 repeats them over the ring of plug 804 to relay 705 through the lower operated contacts of relay 702 and lower winding of relay 705. Relay 705 responds to these signaling impulses and in turn repeats them to the transmitting or sending relays 611 and 613 of repeater 602 at the second or intermediate station. Relays 611 and 612 repeat the telegraph signaling impulses over line 603 to the first switching station where relay 604 responds to them and repeats them to relay 506. Relay 506 in turn repeats these signaling impurses over the ring of jack 501 and the ring of plug 315 to the repeating relay 303 at the first switching station. Relay 303 in turn repeats these signaling impulses over the ring of plug 204 to the subscriber's station circuit shown in Fig. 1. Here relay 107 responds to these signaling impulses and repeats them to the printing magnet 101. The signaling impulses actuate the printing magnet 101 and this in turn controls the telegraph receiving apparatus and causes it to print or record the information transmitted by the subscriber at the station shown in Fig. 17.

Here again relays 708 and 514 follow the signaling impulses but do not remain in their spacing positions sufficiently long to cause the operation of any of the other relays of the systesm.

It should be noted that during the time that the subscriber at the station shown in Fig. 1 is transmitting, only repeating relays 302, 505, 610, 612, 605, 706, 902, 1105, 1210, 1212, 1205, 1306 and 1502 respond to these signaling impulses, whereas the other transmitting relays including relays 303, 506, 604, 611, 613, 705, 903, 1106, 1204, 1211, 1213, 1305 and 1503 do not respond to these signaling impulses but are maintained in their marking positions. Similarly when the impulses are transmitted from the subscriber's station shown in Fig. 17 only relays 303, 506, 604, 611, 613, 705, 903, 1106, 1204, 1211, 1213, 1305 and 1503 respond to the signaling impulses but transmitting relays 302, 505, 610, 612, 605, 706, 902, 1105, 1210, 1212, 1205, 1306 and 1502 do not respond. However, relays 107 and 1707 respond to all of the signaling impulses transmitted from either of the subscribers' stations or from any of the operators who have their typing keys operated. Similarly relays 407, 1007 and 1607 respond to all of the signaling impulses transmitted over the system if the operators have the corresponding typing keys operated.

*Break signals*

During the transmission of signaling impulses from either subscriber's station to the other subscriber's station, either subscriber may transmit a break signal over the system. The system operates substantially the same when the break signal is transmitted in either direction over the system, the only difference being that different relays respond to the break signal in the two cases. These different relays operate in circuits substantially the same in every detail only they are located at different stations. Assuming, for example, that the subscriber at the station shown in Fig. 1 wishes to transmit a break signal to the subscriber at the station shown in Fig. 17, the subscriber at Fig. 1 will operate the break key 115. This interrupts the subscriber's line circuit and causes relay 302 of the cord circuit at the first switching station to move to its spacing position. Moving to its spacing position, relay 302 transmits a spacing impulse over the ring of plug 315, ring of jack 501 to relay 505. Relay 505 responds to this break signal by moving to its spacing position and thus repeats the break signal to the sending relays 610 and 612. Relays 610 and 612 in turn repeat the break signal over line 603. Relay 605 at the second switching station responds to this break signal and repeats it to relay 706 which in turn responds by moving to its spacing position and repeats the break signal over the ring of jack 701.

Relays 508 and 714 also respond to this break signal by moving to their spacing positions. However, in this case break signals are usually of sufficient duration to cause the relays controlled by relays 508 and 714 to operate. Thus at the end of approximately two-tenths of a second after relay 714 has operated to its spacing position, relay 717 is operated to its left-hand position where it completes a circuit for the operation of relay 732. Relay 732, in operating, interrupts the short circuit around its upper winding and thus locks operated in a circuit from ground through its upper winding, resistance 747, upper operated contacts of relay 716 to battery through the spacing or right-hand contacts of relay 714. Relay 732, in operating, completes a circuit for the operation of relay 715. Relay 715, in operating, interrupts the circuit through the lower winding of relay 706 and thus insures that relay 706 will remain in its spacing position and repeat spacing current over the ring of jack 701. Relay 715, in operating, also completes a circuit for the operation of relay 717 to its right-hand position. Relay 717 in its right-hand position now completes a circuit for the operation of relay 736. Relay 736, in operating, completes a locking circuit for holding itself operated under control of relay 732, and in addition interrupts the circuit through the upper winding of relay 717, thus permitting condenser 720 to again start to discharge through the upper winding of relay 717 and thus relay 717 starts to release.

However, approximately one-tenth of a second later, that is, approximately three-tenths of a second after the beginning of the break signal which caused both relays 508 and 714 to move to their spacing positions, condenser 548 has become sufficiently discharged through the lower winding of relay 533 to permit or cause relay 533 to be operated to its right-hand position. When relay 533 operates to its right-hand position a circuit is completed for the operation of relay 509 from ground through the upper inner operated contacts of relay 502, armature and right-hand contacts of relay 533 to battery through the winding of relay 509. Relay 509, in operating, connects source of ringing current 549 to the transmission circuit extending to repeater 601. Relays 610 and 612 of repeater 601 respond to this ringing current by transmitting impulses of alternate marking and spacing character of substantially unit length over the conductor 603. Relay 605 responds to these impulses and repeats them to relay 714. Relay 706 does not follow these impulses because the circuit of its lower winding is interrupted at the upper break contacts of relay 715. Relay 714, in responding to these impulses, moves alternately between its marking and spacing contacts. During the time relay 714 is in its marking position it completes a circuit through the upper winding of relay 717 for maintaining this relay in its right-hand position and also charges the left-hand terminal of condenser 720 to the potential of the positive battery connected to the armature of relay 714, thus preventing relay 717 from being operated to its left-hand position. In its spacing position relay 714 connects positive battery to the upper winding of relay 732 and the upper terminal of condenser 748, thus charging the upper terminal of condenser 748 to substantially the same positive battery potential. Relay 714 thus maintains relay 732 in its left-hand position during this time.

As pointed out above, relay 706 repeats the spacing impulse over the ring of jack 701. Spacing current is transmitted from the ring of jack 701 and ring of plug 804 to relay 902. Relay 902 responds and repeats the spacing impulse over the ring of plug 915 and ring of jack 1101 to relay 1105. Relay 1105 responds to this spacing current by moving to its spacing position and repeating spacing current over the transmission circuit of repeater 1201 at the second switching station. Relays 1210 and 1212 respond to this spacing signal and repeat spacing condition over line 1203 to the third central station where relay 1205 responds to the spacing condition by moving to its spacing position and repeats the spacing impulse to relays 1314 and 1306. Relay 1306 repeats the spacing impulse over the ring of jack 1301 and plug 1404 to repeating relay 1502. Repeating relay 1502 repeats the spacing impulse to the subscriber's station over ring of plug 1515 and jack 1730. The spacing impulse is transmitted to the subscriber's station over conductors 1716 and 1714. Relay 1707 at the subscriber's station responds to the spacing current and causes the operation of the so-called break-lock mechanism such as described in U. S. Patent 1,904,164, S. Morton et al., April 18, 1933, if such a mechanism is provided. Whether or not such a break mechanism is provided, when relay 1707 is operated to its spacing position, it repeats the spacing condition to the printing magnet 1701 and interrupts the home copy of the message being transmitted from the subscriber's station circuit shown in Fig. 17, thus indicating to the subscriber that the subscriber at the station shown in Fig. 1 wishes to interrupt the transmission from station 17 and transmit some information from station 1.

Relays 1108 and 1314 also respond to the spacing current transmitted from the second switching station to the third switching station. After approximately two-tenths of a second relay 1317 is operated to its left-hand position where it completes a circuit for the operation of relay 1332. Relay 1332, in operating, removes the short circuit from its upper locking winding and thus locks operated to its left-hand position under control of the spacing contacts of relay 1314. Relay 1332, in operating to its left-hand position, completes a circuit for the operation of relay 1315. Relay 1315, in operating, interrupts the transmission circuit through the lower winding of relay 1306 and thus insures that this relay will remain in its spacing position and transmit a spacing signal over the ring of jack 1301 to the subscriber's station shown in Fig. 17. Relay 1315, in operating, completes a circuit through the upper winding of relay 1317, causing this relay to operate to its right-hand position. In its right-hand position relay 1317 now completes a circuit for the operation of relay 1336. Relay 1336 completes a locking circuit for maintaining itself operated under control of relay 1332. Relay 1336 in operating also interrupts the circuit through the upper winding of relay 1317 so that relay 1317 again starts to operate to its left-hand position.

Approximately one-tenth of a second later, that is approximately three-tenths of a second after the break signal was first received by relays 1108 and 1314 and before relay 1317 again operates to its left-hand position, relay 1133 is operated to its right-hand position. The constants of this relay together with the constants of resistances 1141, 1142, 1139 and condenser 1140 are such that at the end of approximately three-tenths of a second the charging or discharging current through condenser 1140 falls to such a value that current flowing through the upper winding of relay 1133 operates this relay to its right-hand position. Relay 1133, in operating to its right-hand position, completes a circuit for the operation of relay 1109. The operation of relay 1109 connects source of ringing current 1149 to the transmission circuit extending to repeater 1201 at the second switching station. Relays 1210 and 1212 of repeater 1201 respond to this ringing current and transmit a series of impulses of alternate spacing and marking character of substantially unit length over channel 1203 to the third central station. Relay 1205 responds to and repeats this series of impulses to relay 1314.

Relay 1314 responds to these impulses and during the impulses of marking character connects positive battery to the upper winding of relay 1317 and the left-hand terminal of condenser 1320, thus maintaining relay 1317 in its right position. This ringing current arrives, as pointed out above, substantially three-tenths of a second after the break signal was first received or approximately one-tenth of a second after relay 1317 started to release the second time and thus before relay 1317 has operated to its left-hand position a second time.

During the spacing impulses of substantially unit length of the series of impulses of alternate spacing and marking character, relay 1314 charges the upper terminal of condenser 1348 to a positive potential and connects positive battery to the upper winding of relay 1332. The discharging current of condenser 1348 together with the current from the positive battery through the spacing contact of relay 1314 maintain relay 1332 operated to its left-hand position. During the remainder of the break signal transmitted from station 1 the circuits remain in the condition just described.

After an interval of several seconds the subscriber at station 1 will release the break key 115. This restores the transmission circuit through the subscriber's station and causes repeating relay 302 in the cord circuit at the first switching station to be operated to its marking position. Relay 302 repeats this marking condition to relay 505 over the ring of plug 315 and jack 501. Relay 505, in operating to its marking position, completes a circuit from negative battery through the marking contact and armature of relay 505, upper inner operated contacts of relay 504, upper break contacts of relay 507, upper winding of relay 508 to ground through the upper operated contacts of relay 509.

Relay 508 operates to its marking position in this circuit and interrupts the circuit through the upper winding of relay 533 and completes a circuit through the lower winding of relay 533, thus operating relay 533 to its left-hand position. In its left-hand position relay 533 interrupts the operating circuit of relay 509. Relay 509, in releasing, reestablishes the transmission circuit from relay 505 to repeater 601. The sending relays 610 and 612 of repeater 601 then respond to the marking current being transmitted by relay 505 and repeat a marking condition over line 603. Relay 605 responds to this marking condition and repeats marking current over lead 713 to relay 714 in a circuit from positive battery, marking contact and armature of relay 605, conductor 713, lower winding of relay 714 to negative battery through the upper operated contacts of relay 715. Relay 714 operates to its marking position in this circuit.

In operating to its marking position relay 714 maintains the circuit through the upper winding of relay 717, thus holding this relay in its right-hand position. Relay 714, in operating to its left-hand position, also interrupts the locking circuit through the upper winding of relay 732, thus permitting relay 732 to be operated to its right-hand position by current flowing through its center winding a short interval of time later, after the charging or discharging current of condenser 748 has fallen to such a value that the current flowing through the center winding of this relay overpowers this discharging current flowing through the upper winding. Relay 732, in operating to its right-hand position, interrupts the operating circuit of relay 715 and the locking circuit of relay 736, thus allowing these relays to release and restore the circuit to the transmitting condition.

The release of relay 715 reestablishes the transmission circuit through the lower winding of relay 706. Since relay 605 is now applying a marking condition to this transmission circuit, relay 706 will be operated to its marking position and in turn repeat marking current over the ring of jack 701 and plug 804 to repeating relay 902 of the cord circuit at the second or intermediate switching station. Relay 902 repeats this marking condition over the ring of plug 915 and jack 1101 to relay 1105. Relay 1105 repeats this marking condition to relay 1108.

Relay 1108 responds to this marking current by moving to its marking position where it interrupts current flowing through the upper winding of relay 1133 and completes a circuit through the lower winding of relay 1133, thus operating this relay to its left-hand position. The operation of relay 1133 to its left-hand position interrupts the operating circuit of relay 1109, permitting relay 1109 to release. The release of relay 1109 reestablishes the transmission circuit from the armature of relay 1105 to repeater 1201.

Since relay 1105 is now in its marking position, it applies a marking condition to this transmission circuit which causes relays 1210 and 1212 to be operated to their marking positions and repeat a marking condition over channel 1203. This marking condition is repeated by relay 1205 to relay 1314 which responds by remaining in its marking position.

In remaining in its marking position relay 1314 completes a circuit through its marking contacts for maintaining relay 1317 in its right-hand position. Relay 1314, in remaining in its marking position, interrupts the circuit through its spacing contacts for maintaining relay 1332 in its right-hand position. A short interval of time later after which the discharging or charging current of condenser 1348 has fallen to a sufficiently low value, relay 1332 will be operated to its right-hand position by current flowing through its middle winding. Relay 1332, in operating to its right-hand position, interrupts the operating circuit of relay 1315 and the locking circuit of relay 1336, allowing these relays to release and thus restores this circuit to its transmitting condition.

The release of relay 1315 reestablishes the transmitting circuit through the lower winding of relay 1306. Since relay 1205 is now transmitting marking condition, relay 1306 will be operated to its marking contact where it repeats the marking impulse or condition over the ring of jack 1301 and plug 1404 to the repeating relay 1502. Repeating relay 1502 repeats this marking condition over the ring of plug 1515 and jack 1730 to the subscriber's station shown in Fig. 17.

The circuits are now restored to their transmitting condition and the subscriber at the station shown in Fig. 1 may now transmit the desired information to the subscriber at station 17.

The subscriber at station 17 may similarly transmit a break signal to the subscriber at station 1. During this time the circuits operate in substantially the same manner as described above when the subscriber at station 1 transmitted a break signal to the subscriber at station 17 except that the relays involved in the transmission circuit in the opposite direction now function instead of those described. However, the operating circuits of these two sets of relays are substantially identical and they operate in the same manner. Consequently, it is not deemed necessary to repeat the above description for the transmission of the break signal in the opposite direction.

It should be noted that no supervisory signals are received by any of the operators at the switching stations during the transmission of break signals over the system.

*Disconnect*

When the communication has been completed between the subscribers' stations one or both of the subscribers may operate their respective stop keys 138 and 1738 to signal the operator that the communication is over. However, probably the preferred way of indicating that the communication has been completed is to transmit through the teletypewriter apparatus the proper signals to operate the automatic stop contacts 139 and 1739 as described in the above-identified Patent 1,904,164. Either subscriber or any of the operators may send these particular code combinations over the system and they will operate these contacts when they are received by the respective subscribers' teletypewriters. Assume first that such a series of telegraph signals has been transmitted by either subscriber or an operator, or that both subscribers have operated their stop keys 138 and 1738. The operation of the automatic stop contacts 139 or the stop key 138 at station 1 interrupts the locking circuit of relay 105. Relay 105 thereupon releases and disconnects source of power 103 from motor 102 and relay 104, thus deenergizing the subscriber's station circuit and apparatus. If sources of potential 150, 151 and 152 are supplied from a local rectifier from source 103 the release of relay 105 will deenergize this rectifier and thus remove these sources of potential. Release of relay 104 interrupts the transmission circuit through the subscriber's station equipment and completes a circuit for the operation of relay 112 from ground through the break contacts of relay 104, the upper break contacts of key 137, contacts of transmitting device 100, break contacts 115, upper winding of relay 107, lower normal contacts of key 137, winding of relay 136, conductor 116, upper operated contacts of relay 111, upper winding of relay 112 to negative battery through the armature and right-hand contacts of relay 124. The circuit from the ring of jack 130, lower operated contacts of relay 111, lower winding of relay 112, conductor 114, break contacts of recall key 140 is open at the upper released contact of relay 104, thus unbalancing the differential relay 112 and causing this relay to operate. Release of relay 104 in interrupting the transmission circuit transmits a break signal through the circuits at the first, second and third switching stations to the subscriber's station, Fig. 17, in the same manner as described above. This break signal is of short duration and is followed by a marking signal transmitted from the first switching station due to the operation of relay 226 as described hereinafter. The operation of relay 112 completes an obvious circuit for the operation of relay 118. The operation of relay 118 connects ground to the tip of jack 130 and completes a circuit for the operation of relays 234 and 229 from ground through the operated contacts of relay 118, the winding of relay 124, tip of jack 130, tip of plug 204, upper operated contacts of relay 209, upper inner break contacts of relay 220, winding of relay 234, right-hand winding of relay 229 to negative battery through the armature and break contacts of relay 228. Relays 234 and 229, in operating, complete a circuit for the operation of relay 226 from ground through the operated contacts of relay 234, operated contacts of relay 229 to battery through the winding of relay 226. The operation of relay 226 completes a circuit for lighting lamp 200 from battery through the winding of the pilot relay 401, lamp 200, left-hand inner operated contacts of relay 226 to ground through the right-hand inner break contacts of relay 225. Lamp 200 in lighting and remaining lighted indicates to the operator that the subscriber at station 1 has disconnected.

The operation of relay 226 also connects negative battery through resistance 252, the inner right-hand operated contacts of relay 226, contacts of relays 215, 221 and 220 to the upper winding of relay 302. Current flowing in this circuit causes relay 302 to move to its marking position and transmits a marking condition out to the second and third switching stations.

Similarly, the operation of the automatic stopping contact 1739 or the stop key contacts 1706 of the subscriber's station circuit shown in Fig. 17 interrupts the locking circuit of relay 1705 and thus permits this relay to release. The release of relay 1705 similarly disconnects the source of power 1703 from motor 1702 and relay 1704. If a rectifier is provided for supplying the sources of power 1750, 1751 and 1752, the release of relay 1705 will disconnect source of power 1703 from this rectifier. The release of relay 1704 interrupts the transmission circuit through the subscriber's station equipment shown in Fig. 17 and completes a circuit for the operation of relay 1712 from ground through the upper break contacts of relay 1704, upper break contacts of key 1737, transmitting contacts 1700, break key contacts 1715, upper winding of relay 1707, lower break contacts of key 1737, winding of relay 1736, conductor 1716, upper operated contacts of relay 1711, upper winding of relay 1712 to negative battery through the armature and left-hand contacts of relay 1724. The circuit through the lower winding of relay 1712 from the ring of jack 1730, lower operated contacts of relay 1711, lower winding of relay 1712, conductor 1714, break contacts of recall key 1740 is open at the unoperated contacts of relay 1704. Relay 1712 is thus unbalanced and is operated by current flowing through its upper winding. Relay 1704 in releasing transmits the break signal through the third, second and first switching stations in the same manner that the break signals are transmitted from the first station as described above. The operation of relay 1712 completes an obvious circuit for the operation of relay 1718 which in turn completes a circuit for the operation of relays 1521 and 1520 from ground through the upper operated contacts of relay 1718, winding of relay 1724, tip of jack 1730, tip of plug 1515, upper operated contacts of relay 1511, lower inner break contacts of relay 1420, lower break contacts of relay 1419, lower inner break contacts of relay 1509, lower break contacts of relay 1504, winding of relay 1521, left-hand winding of relay 1520 to negative battery through the armature and break contacts of relay 1519. The operation of relays 1520 and 1521 completes a circuit for the operation of relay 1517 from battery through the operated contacts of relay 1521, operated contacts of relay 1520 to ground through the winding of relay 1517. The operation of relay 1517 completes a circuit for the operation of relay 1428 from battery through the winding of relay 1428, lead 1443, right-hand operated contacts of relay 1517, lead 1444, to ground through the inner right-hand operated contacts of relay 1425.

The operation of relay 1428 connects positive battery to the tip of plug 1404 and jack 1301. This causes the operation of relay 1331 to its right-hand position in a circuit over the tip of plug 1404 and jack 1301. The operation of relay 1331 completes a circuit for the operation of relay 1335. The operation of relay 1335 completes a circuit for the operation of relay 1310. The operation of relay 1310 interrupts the transmission circuit over the lead 1312 through the upper windings of relays 1213 and 1211, thus causing these relays to be operated to their spacing positions by current flowing in an obvious circuit through their lower windings. The operation of relay 1310 also completes a locking circuit for locking relay 1335 operated.

The operation of relays 1213 and 1211 to their spacing positions repeats the spacing condition over line 1203 which is repeated by relay 1204 to relays 1106 and 1114. Relay 1106 repeats this spacing signal over the ring of jack 1101 and plug 915 to the repeating relay 903. Relay 903 repeats this spacing signal over the ring of plug 804 to relay 705. Relay 705 in turn repeats this spacing signal to relays 708, 613 and 611 which in turn repeat it to relay 604 and thence to relays 514 and 506.

Approximately two-tenths of a second after the break signal is received by relay 514, relay 517 is operated to its right-hand position where it completes a circuit for the operation of relay 532 to its right-hand position. The operation of relay 532 to its right-hand position removes the short circuit from its upper locking winding and thus locks operated to the spacing contact of relay 514. Relay 532, in operating to its right-hand position, completes a circuit for the operation of relay 515. Relay 515, in operating, disconnects the lower winding of relay 506 from the transmission circuit, thus insuring that relay 506 will remain in its spacing position.

Relay 515, in operating, also completes a circuit for the operation of relay 517 to its left-hand position. Relay 517, in operating to its left-hand position, completes a circuit for the operation of relay 536. Relay 536, in operating, interrupts the operating circuit of relay 517 through its upper winding and completes a locking circuit under control of relay 532.

Approximately one-tenth of a second later, that is approximately three-tenths of a second after the break signal is first received by relays 708 and 514 and before relay 517 again operates to its right-hand position a second time, relay 733 is operated to its left-hand position. In its left-hand position relay 733 completes a circuit for the operation of relay 709. Relay 709 connects source of alternating current or ringing current 749 to the transmission circuit extending to repeater 602. Relays 611 and 613 of repeater 602 respond to this ringing current and repeat a series of impulses of alternate marking and spacing character of substantially unit length over channel 603 to the repeater 601. Here receiving relay 604 responds to this series of impulses and repeats them to relay 514. Relay 514 responds to these impulses by alternately moving to its marking and spacing position. During the time relay 514 is in its marking position it completes a circuit through the upper winding of relay 517 and thus maintains this relay in its left-hand position. During the time relay 514 is in its spacing position it completes a circuit through the upper winding of relay 532 and this maintains relay 532 in its right-hand position.

Turning now to the second switching station, when relay 1114 is first operated to its spacing position in response to the break signal transmitted to it due to the operation of relay 1310 at the third central station, relay 1114 interrupts the circuit through the upper winding of relay 1117 and approximately two-tenths of a second later relay 1117 is operated to its right-hand position. In its right-hand position relay 1117 completes a circuit for the operation of relay 1132 to its right-hand position. Relay 1132 is so operating completes a circuit for the operation of relay 1115. Relay 1115, in operating, disconnects the lower winding of relay 1106 of the transmission circuit and thus insures that this relay will remain in its spacing position and continue to transmit the spacing impulse over the ring of jack 1101. The operation of relay 1115 completes a circuit through the upper winding of relay 1117 and causes this relay to again operate to its left-hand position. In its left-hand position relay 1117 now completes a circuit for the operation of relay 1136. Relay 1136 again interrupts the upper winding of relay 1117 and locks operated to the right-hand contact of relay 1132. Approximately two-tenths of a second later relay 1117 again operates to its right-hand position where it now completes a circuit for the operation of relay 1134. Relay 1134, in operating, completes a circuit through the upper winding of relay 1117, thus restoring relay 1117 to its left-hand position. Relay 1134, in operating, interrupts the locking circuit of relay 1127 and locks operated to the lower contacts of relay 1127. Relay 1127, in releasing, interrupts the operating circuit for relay 1129 and the locking circuit of relay 1116, causing these relays to release. The release of relay 1116 interrupts the locking circuit of relay 1132, thus permitting relay 1132 to release. Relay 1132 in releasing interrupts the operating circuit of relay 1115 and the locking circuit of relay 1136, thus permitting these relays to release. The release of relay 1127 also interrupts the locking circuit of relay 1134, thus allowing this relay to release.

In releasing, relay 1127 connects ground to the tip of jack 1101, which ground causes relay 920 to operate. Relay 920 in operating completes an operating circuit for relay 917. The operation of relay 917 connects negative battery through resistance 926, the left-hand inner operated contacts of relay 917, the lower middle break contacts of relay 909, upper inner break contacts of relay 904 to the upper winding of relay 903. This causes relay 903 to be operated to its marking position and transmits a marking impulse over the ring of plug 804 and ring of jack 701 to relay 705. Relay 705 responds to this marking impulse and is operated to its marking position. This completes a circuit for the operation of relay 708 to its marking position from ground through the upper operated contacts of relay 709, upper winding of relay 708, upper break contacts of relay 707, upper middle operated contacts of relay 704 to negative battery through the armature and marking contacts of relay 705. Relay 708, in operating to its marking position, interrupts the circuit through the upper winding of relay 733 and completes a circuit through the lower winding of relay 733, causing relay 733 to operate to its right-hand position substantially at once. In its right-hand position relay 733 interrupts the operating circuit of relay 709 which in turn releases. The release of relay 709 reestablishes the transmission circuit from the armature of relay 705 to repeater 602. Since relay 705 is now in its marking position, marking current is now transmitted to the sending relays 611 and 613 which move to their marking positions and repeat a marking condition over line 603. Relay 604 at the first central station responds to this marking condition by moving to its marking position and in turn repeats the marking condition to relay 514 which also responds thereto by remaining in its marking position. Relay 514, in remaining in its marking position, completes a circut through the upper wnding of relay 517 and thus maintains this relay in its left-hand position. Relay 514 when in its marking position also interrupts the locking circuit for relay 532, thus permitting relay 532 to release. The release of relay 532 in turn causes the release of relays 515 and 536, thus restoring this circuit to its transmission condition.

The operation of relay 917 at the second central station as descrbed above, also completes a circuit for the operation of relay 828. Relay 828, in operating, disconnects negative battery from the tip of jack 804 and connects positive battery thereto. This positive battery causes the operation of relay 731 to its right-hand position. The operation of relay 731 to its right-hand position completes a circuit for the operation of relay 735 and relay 735 in turn completes a circuit for the operation of relay 710. The operation of relay 710 completes a locking circuit for relay 735 and interrupts the transmission circuit to the sending relays 613 and 611 of repeater 602. These relays then move to their spacing positions and transmit a spacing condition over line 603. Receiving relay 604 responds to this spacing condition and repeats spacing current to relays 506 and 514. Relay 514, in operating to its spacing position, interrupts the circuit through the upper winding of relay 517, thus permitting this relay to release. Approximately two-tenths of a second later relay 517 operates to its right-hand position where it completes a circuit for the operation of relay 532. Relay 532, in operating, completes a circuit for the operation of relay 515 which in turn reestablishes a circuit through the upper winding of relay 517 and causes this relay to move to its left-hand position. In its left-hand position relay 517 now completes a circuit for the operation of relay 536. Relay 536, in operating, completes a locking circuit for maintaining itself operated under control of relay 532 and also interrupts the circuit through the upper winding of relay 517. Relay 517 will again operate to its right-hand position substantially two-tenths of a second later, where it now completes a circuit for the operation of relay 534. The operation of relay 534 interrupts the locking circuit of relay 527 which in turn releases. The release of relay 527 interrupts the operating circuit of relay 529 and the locking circuit of relay 516, thus allowing these relays to release. The release of relay 516 interrupts the locking circuit of relay 532 and also connects the upper winding of relay 517 to the spacing contacts of relay 514 and thus maintains relay 517 in its left-hand position so long as relay 514 remains in its spacing position. The release of relay 532 causes the release of relays 515 and 536.

The release of relay 527 disconnects negative battery from the tip of jack 501 and connects ground thereto. This causes relay 320 in the cord circuit at the first switching station to operate. This in turn completes a circuit for the operation of relay 317. Relay 317, in operating, completes a circuit for lighting the call lamp 300 before the operator at the first switching station. It should be noted that up to this point only supervisory signals appearing before any of the operators indicating a disconnect condition have appeared before the operator at the first switching station.

The operator at the first switching station, upon noting both lamps 200 and 300 lighted, knows that both the subscribers' stations shown in Figs. 1 and 17 transmitted a disconnect signal and that the connection should be taken down. The operator will then remove plug 204 from jack 130 and plug 315 from jack 501. This restores the relays in the subscriber's line circuit shown in Fig. 1 to their normal or idle condition. It also causes the relays of the cord circuit shown in Figs. 2 and 3 to return to their idle condition. When the operator removes plug 315 from jack 501 relay 502 will release and in turn permit the release of relay 503. Relay 503, in releasing, does not restore the circuit to its normal or idle condition because relay 528 is still held operated in the circuit from ground through its winding and upper inner operated contacts, lower break contacts of relay 511 to battery through the upper break contacts of relay 530. Relay 528, in remaining operated, connects battery to the lower winding of relay 502 and thus applies a busy potential to the sleeve of jack 501 to indicate to any operator who attempts to initiate a call over this circuit that it is busy. The release of relay 502 interrupts the transmission circuit through the lower winding of relay 505 and also permits the release of relay 504. This interrupts the transmission circuit from the armature of relay 505 to the sending relays 610 and 612 of repeater 601. These relays then move to their spacing positions and transmit a spacing condition over line 603 to repeater 602 where relay 605 responds to this spacing condition and repeats it to relays 714 and 706. Relay 706, in responding to this spacing condition, repeats it over the ring of jack 701 and ring of plug 804 to the repeating relay 902 which in turn repeats the spacing impulse over the ring of plug 915 and jack 1101.

The circuits shown in Figs. 11, 12 and 13 respond to this spacing impulse in the same manner that they respond to the spacing impulse described above when a break signal is transmitted from the station shown in Fig. 1 to the station shown in Fig. 17.

When relay 714 was first operated to its spacing position it interrupted the circuit through the upper winding of relay 717. Approximately two-tenths of a second later relay 717 will operate to its left-hand position where it completes a circuit for the operation of relay 732. The operation of relay 732 completes a circuit for the operation of relay 715. Relay 715, in operating, completes a circuit through the upper winding of relay 717, thus causing this relay to be operated to its right-hand position. In its right-hand position relay 717 now completes a circuit for the operation of relay 736. The operation of relay 736 completes a locking circuit for maintaining itself operated under control of the contacts of relay 732, and in addition interrupts the circuit from the upper winding of relay 717. Approximately two-tenths of a second later relay 717 will again be operated to its left-hand position where it now completes a circuit for the operation of relay 734. The operation of relay 734 interrupts the locking circuit of relay 727, thus permitting this relay to release. The release of relay 727 interrupts the locking circuit of relay 716 and the operating circuit of relay 729, thus permitting these relays to release. The release of relay 716 connects the upper winding of relay 717 to the spacing contact of relay 714, thus maintaining relay 717 in its right-hand position so long as relay 714 remains in its spacing position. The release of relay 716 interrupts the locking circuit of relay 732, thus permitting this relay to release. Relay 732, in releasing, interrupts the operating circuit of relay 715 and the locking circuit of relay 736, thus permitting these relays to release. The release of relay 727 disconnects negative battery from the tip of jack 701 and connects ground thereto. This ground causes the operation of relay 829 which in turn causes the operation of relay 826.

Relay 826 in operating removes negative potential through its right-hand outer break contacts from the upper terminal of condenser 831. It is to be noted that relays 825 and 917 have been previously operated so that no other source of negative potential is connected to the upper terminal of condenser 831. When negative potential is removed from the upper terminal of condenser 831 it starts to discharge or charge through resistance 832 which is of a high value. Sometime later, depending upon the constants of condenser 831 and resistance 832, the potential of the upper terminal of condenser 831 rises to a sufficiently high positive potential to cause a discharge to take place in the gas-filled tube 830.

The gas-filled tube or device 830 is of the type that allows substantially no current to flow until a certain critical potential between its electrodes is exceeded, after which a discharge current flows between them, which discharge current is then limited largely by the other elements of the circuit. In addition, this discharge current will continue to flow even though the potential across the tube falls to a lower value.

When this critical potential is exceeded a discharge current will be initiated through tube 830. This discharge current causes relay 922 to operate. The operation of relay 922 completes an obvious circuit for the operation of relay 923. The operation of relay 923 completes a circuit for the operation of lamp 800 from battery through pilot relay 1001, lead 1023 lamp 800 to ground through the right-hand outer operated contacts of relay 923.

The operation of relay 923 also inserts a high resistance in series with the sleeve circuits of plugs 804 and 915. The operation of relay 923 interrupts the circuit of relays 807 and 808 and permits these relays to release. Relay 808 in releasing in turn permits relays 809 and 825 to release. The release of relay 809 interrupts the operating circuit of relays 829 and 834 thus permitting these relays to release.

The operation of relay 923 also interrupts the circuit of relay 912 and permits this relay to release. The release of relay 912 interrupts the locking circuit of relay 916 and the operating circuit of relay 911 thus permitting these relays to release. The release of relay 912 together with the release of relay 808 interrupts the circuits through both the windings of relay 910 and thus permits this relay to release.

The release of relay 911 completes the circuit for lighting lamp 900 from ground from the operated right-hand outer contacts of relay 923, lower break contacts of relay 809, lower break contacts of relay 911, lamp 900, lead 1023, to battery through the winding of pilot relay 1001.

Both the answering supervisory lamp 800 and the calling supervisory lamp 900 are now lighted and that indicates to the operator that communication has terminated and that she should tear down the connection by removing plugs 804 and 915 from jack 701 and 1101, respectively. This permits the relays of the cord circuit shown in Figs. 8 and 9 to return to their normal or idle condition.

The insertion of the high resistance in the sleeve circuit of plug 915 as described above also permits relay 1102 to release. The release of relay 1102 in turn interrupts the operating circuits of relays 1103 and 1104, thus permitting these relays to release. It is noted that negative battery through the winding of relay 922 and high resistance 928 is still connected to the sleeve of plug 915 and jack 1101. Current flowing in this path is sufficient to maintain relay 922 operated but does not cause relay 1102 to operate or remain operated. The trunk circuit, however, does not return to its idle condition at this time because relay 1128 remains locked and operated in the circuit from ground through its winding and inner upper contacts to battery through the lower break contacts of relay 1111 and break contacts of relay 1130. Relay 1128 in remaining operated at this time maintains a negative potential upon the sleeve of jack 1101 and thus causes the circuit to test busy should an operator attempt to select this circuit for the establishment of another communication path.

The operation of relay 923 also interrupts the circuit over the sleeve of plug 804 and sleeve of jack 701, thus permitting relays 702, 703 and 704 to release. Here again the negative battery through the winding of relay 922 and high resistance 929 is connected to the sleeve of plug 804 and jack 701. The current flowing in this circuit, while being sufficient to maintain relay 922 operated, is insufficient to operate or maintain relay 702 operated. The potential applied to the sleeve of jack 701 is also insufficient to cause this jack or circuit to test busy should another operator desire to employ this circuit. The release of relay 702 interrupts the locking circuit through the upper winding of relay 735 and completes a locking circuit through the lower winding of relay 735 from battery and lower winding of relay 735, lower inner operating contacts of relay 735, lower inner break contacts of relay 711 to ground through the upper break contacts of relay 702. Relay 735 should be sufficiently slow in releasing to remain operated during the release of relay 702. The release of relay 702 completes a circuit for the operation of relay 711 from ground through the upper break contacts of relay 702, upper inner operated contacts of relay 710, winding of relay 711 to battery through the lower break contacts of relay 729. Relay 711, in operating, connects ground to lead 712 and transmits a momentary marking impulse thereover which is repeated by relays 611 and 613 to line 603. The operation of relay 711 also interrupts the locking circuit of relay 728, thus permitting this relay to release and remove battery from the lower winding of relay 702 and thus the last source of potential connected to the sleeve of jack 701. The operation of relay 711 interrupts the locking circuit of relay 735 and thus permits relay 735 to release. The release of relay 735 interrupts the operating circuit of relay 710 which in turn releases. The release of relay 710 interrupts the operating circuit of relay 711 and relay 711 in turn releases.

The short marking impulse transmitted over line 603 due to the momentary operation of relay 711 is repeated by receiving relay 604 to relay 514. Relay 514 responds to this marking impulse by operating to its marking position for a sufficiently long interval of time to operate relay 530. Relay 530, in operating, interrupts the locking circuit of relay 528 and thus restores the circuit to its idle condition by removing battery from the lower winding of relay 502 and thus removing the potential from the sleeve of jack 501, permitting this circuit to test idle should an operator touch the tip of a cord to the sleeve of jack 501 or to the sleeve of any jack connected in multiple with jack 501. It should be noted that relay 514 does not remain upon its marking contact sufficiently long to allow relay 517 to be operated to its right-hand position at this time since the marking impulse transmitted by relay 711 is of less than two-tenths of a second in duration. These circuits shown in Figs. 5, 6, 7, 8, 9 and 10 have now been restored to their normal, original or idle condition and are available for use for establishing any other desired connections in the same manner as described above, assuming of course that the operators have removed the plugs from the jacks. In case the operator has not removed the plugs from the jacks then the trunk circuit or circuits shown in Figs. 5, 6 and 7 have returned to their normal condition and are available for use in other connections or communications. Then when the operator removes the plugs from the jacks, the cord circuit will return to its normal condition and be available for establishing other connections. The operation of relay 826, as described above, but prior to the operation of relay 922 connects negative battery to the upper winding of relay 902 and thus causes this relay to repeat a marking signal over the ring of plug 915 and jack 1101 which causes the relays and circuits shown in Figs. 11, 12 and 13 to respond as described above at the end of the break signal transmitted from the station shown in Fig. 1 to the station shown in Fig. 17. The operation of relay 826 also completes a circuit for the operation of relay 919 from ground through the left-hand operated contacts of relay 916, winding of relay 919, left-hand outer operated contacts of relay 825, right-hand outer operated contacts of relay 826 to negative battery. Relay 919, in operating, disconnects negative battery from the tip of plug 915 and connects positive battery thereto. This causes the operation of relay 1131 to its left-hand position. The operation of relay 1131 to its left-hand position completes a circuit for the operation of relay 1135. The operation of relay 1135 in turn completes a circuit for the operation of relay 1110. The operation of relay 1110 completes a circuit for locking relay 1135 operated and in turn interrupts the transmission circuit to the sending relays 1210 and 1212 of repeater 1201. These relays then move to their spacing positions and repeat spacing condition over line 1203. Relay 1205 responds to this spacing condition and repeats it to relays 1314 and 1306. Relay 1314, in operating to its spacing position, interrupts the circuit through the upper winding of relay 1317 and approximately two-tenths of a second later this relay operates to its left-hand position. In its left-hand position relay 1317 now completes a circuit for the operation of relay 1332. The operation of relay 1332 to its left-hand position completes a circuit for the operation of relay 1315 and removes the short circuit from its locking winding, thus locking operated under control of the spacing contacts of relay 1314. The operation of relay 1315 again completes a circuit through the upper winding of relay 1317, causing this relay to be operated to its right-hand position. Relay 1317, in operating to its right-hand position, now completes a circuit for the operation of relay 1336. Relay 1336, in operating, completes a locking circuit for maintaining itself operated under control of relay 1332 and in addition interrupts the circuit through the upper winding of relay 1317. Approximately two-tenths of a second later relay 1317 is again operated to its left-hand position where it completes a circuit for the operation of relay 1334. The operation of relay 1334 interrupts the locking circuit of relay 1327, thus permitting relay 1327 to release. The release of relay 1327 interrupts the operating circuit of relay 1329 and the locking circuit of relays 1316 and 1334, thus permitting these relays to release. The release of relay 1316 completes a circuit through the upper winding of relay 1317 and the spacing contacts of relay 1314 for operating and maintaining relay 1317 in its right-hand position. The release of relay 1316 also interrupts the locking circuit of relay 1332, thus permitting this relay to be operated to its right-hand position by current flowing through its center winding. Relay 1332, in operating to its right-hand position, interrupts the operating circuit of relay 1315 and the locking circuit of relay 1336, thus permitting these relays to release.

The release of relay 1327 disconnects negative battery from the tip of jack 1301 and connects ground thereto. This causes the operation of relay 1429. The operation of relay 1429 completes a circuit for the operation of relay 1426. Relay 1426, in operating, completes a circuit for lighting lamp 1400 from positive battery through the pilot relay 1601, lead 1623, lamp 1400, left-hand inner operated contacts of relay 1426, lead 1442 to ground through the left-hand break contacts of relay 1516.

The operation of relay 1426 also removes negative battery from the upper terminal of condenser 1431 since relays 1425 and 1517 have previously been operated as described above. When relay 1426 removes the negative battery of the upper terminal of condenser 1431, this condenser starts to charge from positive battery 1433 through the high resistance 1432. Some time later, dependent upon the constant of condenser 1431 and resistance 1432, condenser 1431 will acquire sufficient positive charge to cause a discharge through the gaseous conduction tube 1430. Tube 1430 is similar to tubes 230 and 830 in that substantially no current passes through the tube until a critical potential is supplied across its electrodes. After this critical potential is exceeded the discharge is initiated through the tube. The discharge current is largely dependent upon other constants in the circuit, and continues to flow even when the potential between the electrodes falls below the critical voltage required to initiate the discharge.

When the discharge is initiated through tube 1430 as described above, a circuit is completed for the operation of relay 1522 from negative battery through winding of relay 1522, tube 1430 to positive battery 1433 through resistance 1432. The operation of relay 1522 completes an obvious circuit for the operation of relay 1523. Relay 1523 in operating inserts a high resistance in series with the sleeve circuits through plugs 1404 and 1515 and connects the winding of relay 1522 through high resistances 1529 and 1528 to the sleeve of these plugs. Relay 1522 remains operated in a circuit from negative battery through the winding of relay 1522, high resistance 1529, left-hand inner operated contact of relay 1523, lead 1437, sleeve of plug 1404, sleeve of jack 1301 to ground through the upper winding of relay 1302.

Relay 1523 in operating causes relays 1408 and 1512 to release. The release of relay 1512 interrupts the operating circuit of relay 1511 and permits this relay to release. The release of relay 1408 interrupts the operating circuit of relay 1409 and permits this relay to release. The release of relays 1409 and 1511 completes a circuit for lighting lamp 1500 from ground through the right-hand outer operated contacts of relay 1523, lower back contacts of relay 1409, lower back contacts of relay 1511, lamp 1500, lead 1623 to battery through the winding of relay 1601.

The operator upon noting that the answering supervisory lamp 1400 and the calling supervisory lamp 1500 are lighted will remove plugs 1404 and 1515 from jacks 1301 and 1730. This causes the relays of the cord circuits shown in Figs. 14 and 15 to return to their normal or idle condition.

When relay 1523 operated and inserted the high resistances in series with the circuit through the sleeve of jack 1515 the current flowing through the lower winding of relay 1711 is reduced sufficiently to permit or cause this relay to release. Relay 1711 when releasing, interrupts the circuit through the upper winding of relay 1712 and thus permits this relay to release. This restores the subscriber's line circuit to its normal condition.

When relay 1523 operated and inserted the high resistance in series with the sleeve circuit of plug 1404 it reduced the operating current of relay 1302 sufficiently to cause this relay to release.

Relay 1302 then releases and in turn releases relays 1303 and 1304. The release of relay 1302 also interrupts the operating circuit of relay 1331, thus permitting this relay to release. The release of relay 1302 interrupts the locking circuit through the upper winding of relay 1335 and completes a circuit for maintaining this relay operated through its lower winding. Relay 1335 is sufficiently slow in releasing to remain operated during the release of relay 1302. Release of relay 1302 completes a circuit for the operation of relay 1311 from ground through the inner upper break contacts of relay 1302, inner upper operated contacts of relay 1310, winding of relay 1311 to battery through the lower break contacts of relay 1329. The operation of relay 1311 connects ground to the transmission lead 1312 extending to repeater 1202 where the sending relays 1211 and 1213 repeat a marking impulse over line 1203. The operation of relay 1311 also interrupts the locking circuit of relay 1328, thus permitting this relay to release and in turn remove battery from the lower winding of relay 1302 and thus the negative potential from the sleeve of jack 1301. The operation of relay 1311 interrupts the locking circuit of relay 1335 from battery through the lower winding of relay 1335, its lower inner operated contacts, lower inner break contacts of relay 1311 to ground through the upper break contacts of relay 1302, thus permitting the release of relay 1335. Relay 1335 in releasing interrupts the operating circuit of relay 1310, thus permitting relay 1310 to release. The release of relay 1310 in turn interrupts the operating circuit of relay 1311, thus permitting relay 1311 to release. The release of relay 1311 again interrupts the transmission circuit over lead 1312, thus causing relays 1211 and 1213 to be again operated to their spacing positions and repeat a spacing condition over line 1203.

It is to be noted that the circuit shown in Fig. 13 has now been returned to its normal or idle condition and is available for the establishment of any other connection.

When relay 1311 operated, as described above, and caused the transmission of a momentary marking condition over line 1203, the receiving relay 1204 received this marking condition and responded by moving to its marking position. This caused relay 1114 to be momentarily operated to its marking position where a circuit is completed for the operation of relay 1130. Relay 1130, in operating, interrupts the locking circuit of relay 1128, thus permitting this relay to release. However, relay 1117 does not operate to its right-hand position at this time because the marking impulse transmitted from relay 1311 is of less duration than two-tenths of a second so that the charging or discharging current of condenser 1120 does not fall sufficiently to permit relay 1117 to be operated to its right-hand position. The circuits have now returned to their original conditions and are available for use on other calls, assuming the operator has removed the plugs from the jacks as described above. In case the operator has not removed the plugs from the jacks the trunk circuit will be returned to normal as described above and be available for use on other calls and the cord circuit will return to normal as soon as the plugs are removed from the jacks.

It should be noted that if the operator attempts to disconnect the circuit by merely removing a plug from a jack before receiving a disconnect signal, the calling lamp associated with the trunk will flash. For example, assume that the first switching operator attempts to remove plug 315 from jack 501 prior to the reception of a disconnect signal by the first switching operator, that is, prior to the lighting of the call lamp 300 as described above. When the operator removes plug 315 from jack 501 relays 502, 503 and 504 will release. The release of relay 502 completes a circuit for the operation of relay 537 from ground through the upper break contacts of relay 502, the inner upper break contacts of relay 510, lower middle operated contacts of relay 529 to battery through the winding of relay 537. The operation of relay 537 completes a circuit for reoperating relays 503 and 504 and thus maintaining this circuit in its previous condition. The operation of relay 537 also completes a circuit from battery through the winding of relay 521 through the upper inner make contacts of relay 537 to ground through the interrupter 538. Thus, when interrupter 538 is closed, a circuit is completed for the operation of relay 521. Relay 521 follows interrupter 538 and causes lamp 522 to light and be extinguished in accordance with the operation of relay 521. Thus the circuit remains in this condition with lamp 522 flashing until the operator reinserts plug 315 in jack 501, whereupon relay 502 reoperates and interrupts the operating circuit of relay 537, thus extinguishing lamp 522. The reoperation of relay 502 holds relays 503 and 504 operated. Thus the operator is unable to transmit a disconnect signal by merely removing the plug when no disconnect signal has been received by the operator. The circuits at the second and third switching stations operate in substantially the same manner so that the lamp associated with the trunk circuits at these stations will flash if the operator should either intentionally or accidentally remove the plug from the jack before receiving a disconnect signal and the lamp will continue to flash until the operator reinserts the plug in the jack, thus reestablishing the connection.

However, it is possible for any operator to transmit a disconnect signal over the system in the absence of a disconnect signal from the subscriber. Thus assume, for example, that the subscriber at station 1 either transmits a recall signal which will be described later, or operates the stop key 138 and that the subscriber at the station shown in Fig. 17 does not transmit any such disconnect signal by the operation of his key 1738. The operator at the first switching station upon observing that only lamp 200 lighted may operate the teletypewriter key 224 and splitting key 235 and attempt to communicate with the subscriber shown in Fig. 17 over the transmission circuit described above. The operator at the first switching station may also transmit the code combinations necessary to operate the automatic stopping contacts 1739 at the subscriber's station shown in Fig. 17. If this causes the motor to stop at that station at a somewhat later interval the operator will receive a disconnect signal due to lamp 300 lighting as described above when the subscriber at the station shown in Fig. 17 sends a disconnect signal. However, assuming that the operator does not receive such a signal it is still possible for the operator to transmit a disconnect signal over the system to the operator at the third switching station.

To accomplish this the operator first depresses the unattended key 218 and then removes plug 315 from jack 501. When the operator operates the unattended key 218 an obvious circuit is completed for the operation of relay 219. The operation of relay 219 disconnects negative battery through the windings of relays 320 and 321 from the tip of plug 315 and connects positive battery thereto. Connection of positive battery to the tip of plug 315 causes the operation of relay 531 which in turn causes the operation of relay 535. The operation of relay 535 completes a circuit for the operation of relay 510. The operation of relay 510 completes a locking circuit for holding relay 535 operated from battery through the upper winding of relay 535, lower operated contacts of relay 510, lower break contacts of relay 509 to ground through the upper operated contacts of relay 502. The operation of relay 510 also interrupts the transmission circuit from the armature of relay 505 to repeater 601 and causes sending relays 610 and 612 of repeater 601 to transmit a spacing condition over line 603. The operator may then, while she has the unattended key 218 depressed, remove plug 315 from jack 501. This causes relay 531 to be released or operated to its right-hand position. It also causes relay 502 to release. Relay 502, in releasing, completes a locking circuit for maintaining relay 535 operated from battery through the lower winding of relay 535, lower break contacts of relay 511 to ground through the upper break contacts of relay 502. Relay 535 should be sufficiently slow in releasing so it will remain operated during the time relay 502 is releasing. The release of relay 502 also interrupts the operating circuit for relays 503 and 504, which relays in turn release.

The spacing signal transmitted over line 603 from the first switching station to the second switching station at this time is repeated through the second switching station in the same manner that the spacing signal is repeated through the second switching station, as described above, when the operator at the first switching station removed her plug from jack 501. This eventually causes lamp 1400 at the third switching station to light and indicate to the operator at the third switching station that she should operate the printing or teletypewriter key 1424 and attempt to communicate over the circuit to any operator or subscriber connected thereto to determine what further service, if any is required. If she is unable to communicate with anybody or if the circumstances require it, she will then disconnect the circuit by removing her plugs from jacks 1301 and 1730. When the operator at the third switching station removes her plug 1404 from jack 1301, relay 1302 is released and this relay in turn releases relays 1303 and 1304 which causes a spacing signal to be transmitted over conductor 1203 to the second or intermediate switching station. This spacing signal is in turn repeated through the cord circuit at the second intermediate station over line 603. The circuits at the second switching stations operate at this time in the same manner as described above, when the subscriber at the station, shown in Fig. 17, first transmitted the disconnect signal to the first switching station. When this spacing signal is received at the first switching station, relay 604 is operated to its spacing position and repeats the spacing signal to relay 514. Relay 514 in operating to its spacing position, interrupts the circuit through the upper winding of relay 517. Approximately two-tenths of a second later relay 517 is operated to its right-hand position where it completes a circuit for the operation of relay 532. Relay 532, in operating to its right-hand position, completes a circuit for the operation of relay 515. Relay 515, in operating, again completes a circuit through the upper winding of relay 517 and causes this relay to operate to its left-hand position. Relay 517 now completes a circuit for the operation of relay 536. Relay 536, in operating, completes a locking circuit for maintaining itself operated under control of relay 532. Relay 536, in operating, again interrupts the circuit through the upper winding of relay 517 and approximately two-tenths of a second later relay 517 again is operated to its right-hand position. In its right-hand position, relay 517 now completes a circuit for the operation of relay 534. The operation of relay 534 interrupts the locking circuit of relay 527 which in turn causes the release of relays 516 and 529. The operation of relay 534 again completes the circuit through the upper winding of relay 517 and causes this relay to be operated to its left-hand position. The release of relay 516 connects the upper winding of relay 517 to the spacing contact of relay 514, thus maintaining relay 517 in its left-hand position so long as relay 514 remains in its spacing position. Relay 516, in releasing, also interrupts the locking circuit for relay 532, thus permitting relay 532 to be operated to its left-hand position by current flowing through its middle winding. Relay 532 in turn causes relays 515 and 536 to release. The release of relay 527 also interrupted the locking circuit of relay 534, thus permitting this relay to release.

When relay 529 released, it completed an operating circuit for operating relay 511 from battery through the lower break contacts of relay 529, winding of relay 511, upper inner operated contacts of relay 510 to ground through the upper break contacts of relay 502. The operation of relay 511 transmits a marking impulse over conductor 512 to the second central station. It also interrupts the locking circuit of relay 535, thus permitting relay 535 to release. The release of relay 535 interrupts the operating circuit of relay 510. The release of relay 510 interrupts the operating circuit of relay 511, thus releasing relay 511. When relay 511 operated as described above it interrupted the locking circuit of relay 528, thus permitting relay 528 to release and thus restore the circuit to its normal or idle condition. The circuits at the second and third switching stations are restored to their idle conditions in the same manner as described above when both subscribers transmitted disconnect signals to the operator at the first switching station.

*Recall*

Either subscriber may recall the operator at the first switching station either by first operating the disconnect key 138 and then start key 106 at the subscriber's station shown in Fig. 1, or the stop key 1738 and then the start key 1706 at the subscriber's station shown in Fig. 17. However, the preferred manner of initiating a recall signal at the subscriber's station shown in Fig. 1 is to momentarily operate recall key 140 and at the subscriber's station, shown in Fig. 17, by momentarily operating recall key 1740. It is to be understood that it is not necessary for the subscribers at both of these stations to operate these keys at the same time. Usually only one subscriber operates the recall key. When the subscriber at the station shown in Fig. 1 operates recall key 140, the circuits operate in substantially the same manner as described above when the subscriber sends a disconnect signal. When the subscriber releases the recall key 140 the differential relay 112 of the subscriber's station releases and removes ground from the tip of jack 130. When the ground is removed from the tip of jack 130 and tip of plug 204 relays 234 and 229 release. However, when relays 234 and 229 had previously operated and completed a circuit for the operation of relay 226 to light lamp 200 a circuit was also completed for the operation of relay 227 from battery through the right-hand winding of relay 227 to ground through the left-hand outer operated contacts of relay 226 and the right-hand middle break contacts of relay 225. Relay 227, in operating, locks in a circuit from battery through its left-hand winding, left-hand operated contacts, upper break contacts of relay 213, upper operated contacts of relay 211 to ground through the inner left-hand break contacts of relay 222 and right-hand break contacts of relay 221. Then when relays 234 and 229 release due to ground being removed from the tip of jack 130 and plug 204 a circuit is completed from interrupter 417 through the right-hand operated contacts of relay 227, left-hand break contacts of relay 226, lamp 200 to battery through the winding of supervisory relay 401. This causes lamps 200 and 400 to flash and indicates to the operator at the first switching station that the subscriber at the station shown in Fig. 1 wishes to recall the operator, whereupon the operator will operate the typing key 224. This in turn causes the operation of relays 221, 222 and 223 as described above. The operation of relays 221 and 222 interrupts the locking circuit of relay 227, thus permitting this relay to release which in turn extinguishes lamps 200 and 400.

If the subscriber at the station shown in Fig. 17 wishes to recall the operator and momentarily operates key 1740, the lamp 300 at the first switching station is eventually operated in the same manner as described above when the subscriber shown in Fig. 17 transmits a disconnect signal. It should be noted that when relay 317 operates at this time and completes a circuit for lamp 300, it also completes a circuit for operating relay 318 from battery through the outer left-hand operated contacts of relay 317, the left-hand winding of relay 318, lead 250 to ground through the outer right-hand break contacts of relay 225. Relay 318 in operating locks operated in a circuit from battery through its right-hand winding and right-hand operated contacts, upper break contacts of relay 304, inner upper operated contacts of relay 311 to ground through the left-hand outer break contacts of relay 222 and right-hand break contacts of relay 221.

Then when the subscriber releases the key 1740, the circuits at the third and second switching stations operate as described above when the subscriber at the station shown in Fig. 17 answers the call. This eventually causes relay 317 to release. However, relay 318 does not release at this time but instead connects ground from interrupter 417, through the left-hand operated contacts of relay 318, inner right-hand break contacts of relay 317, lamp 300, lead 423 to battery through the winding of pilot relay 401. This causes lamps 300 and 400 to flash in accordance with the interruptions of interrupter 417 and thus indicate to the operator that the subscriber at station 17 wishes to recall the operator. The operator will then reoperate the typing key 224 which operates relays 221, 222 and 223. The operation of relays 221 and 222 interrupts the locking circuit of relay 318 and permits this relay to release and thus extinguish lamps 300 and 400. The operator may then communicate with the subscriber at the station shown in Fig. 17, as described above, to determine what additional service is required.

In case either or both of the subscribers send disconnect signals and shut down their stations the operator at the first switching may recall either subscriber by operating ringing keys 216 or 217. The operation of key 216 completes a circuit for the operation of relay 213 and relay 213 in operating completes a circuit for the operation of relay 210 from battery through the winding of relay 210, the upper operated contacts of relay 213, upper operated contacts of relay 209, tip of plug 204, tip of jack 130, winding of relay 124 to ground through the operated contacts of relay 118. The operation of relay 210 supplies ringing current to the subscriber's line extending to the station shown on Fig. 1.

To recall the subscriber at the station shown on Fig. 17 the operator will operate ringing key 217. The circuit then operates as described above when the subscriber's station shown in Fig. 17 was originally called by the first operator.

Under special circumstances or trouble conditions the operators at the second and third switching stations may also recall the subscriber's station shown in Fig. 17 by operating either ringing key 817 or 1417 as the case may be. In this case the circuits between the operated ringing key and the subscriber's station operate substantially the same as described above when the subscriber was originally called.

The first operator may also recall the third operator by momentarily operating the unattended key 218. The operating of key 218 completes an obvious circuit for the operation of relay 219. Relay 219 in operating connects positive battery to the tip of plug 315 through its lower operated contacts, the inner lower back contacts of relay 220, and the upper operated contacts of relay 311. This positive battery connected to the tip of plug 315 causes the operation of relay 531 to its left-hand position in the circuit from the tip of jack 501, upper operated contacts of relay 502, winding of relay 531 to negative battery through the upper operated contacts of relay 527 and resistance 545. Relay 531 in operating to its left-hand position completes a circuit for the operation of relay 535 from ground through the armature and left-hand contacts of relay 531 to battery through the upper winding of relay 535. Relay 535 in operating completes a circuit for the operation of relay 510 from battery through the lower operated contacts of relay 535 to ground through the winding of relay 510.

Relay 510 in operating completes a circuit for holding relay 535 operated from battery through the upper winding of relay 535 lower operated contacts of relay 510, lower back contacts of relay 509 to ground through the upper operated contacts of relay 502.

Relay 510 in operating interrupts the transmission lead 512 and connects ground to the transmission circuit extending through the upper back contacts of relay 509, upper winding of relay 508, back contacts of relay 507, middle upper operated contacts of relay 504 to negative battery through the armature and marking contacts of relay 505. Relay 508 is maintained in its marking position by current flowing through its upper winding in this circuit. Relay 510 in interrupting the transmission circuit of lead 512 causes relays 610 and 612 to move to their spacing positions and transmit a spacing condition over line 603 by moving to its spacing position. Relay 605 in operating to its spacing position repeats the spacing condition to relays 714 and 706. Relay 706 repeats the spacing condition over the ring of jack 701. Relay 714 in operating to its spacing position interrupts the circuit through the upper winding of relay 717. This causes relay 717 to start to release. When condenser 720 has sufficiently discharged, which in the preferred embodiment of this invention is approximately .2 of a second later, relay 717 is operated to its left-hand position where it completes a circuit for the operation of relay 732. Relay 732 in operating completes a circuit for the operation of relay 715. Relay 715 in operating interrupts the circuit through the lower windings of relay 706 and thus insures that this relay will remain in its spacing position. Relay 715 in operating completes a circuit through the upper winding of relay 717 thus causing this relay to be operated to its right-hand position where it completes a circuit for the operation of relay 736. Relay 736 in operating completes a locking circuit through its upper winding for holding itself operated under control of relay 732. Relay 736 in operating interrupts the circuit through the upper winding of relay 717. Approximately .2 of a second later, relay 717 again operates to its left-hand position for it now completes the circuit for the operation of relay 734.

Relay 734 in operating completes a locking circuit for maintaining itself operated under control of relay 727. Relay 734 in operating again completes a circuit through the upper winding of circuit 717 and causes this circuit to again more its armature to its right-hand position.

When lamp 1400 at the third switching station remains lighted for a short interval of time without lamp 1500 lighting it indicates to the operator that the first switching operator requires further services from the third switching operator. However, the third switching operator may not immediately notice the lighting of lamp 1400 in which case the circuits operate in the following manner.

Relay 734 in operating also interrupts the locking circuit of relay 727 thus causing this relay to release. The release of relay 727 in turn interrupts the operating circuit of relay 729 and the locking circuits of relays 716 and 734 and causes these relays to release. The release of relay 716 interrupts the locking circuit of relay 732 and connects the upper winding of relay 717 to the spacing contacts of relay 714. Relay 717 is thus maintained in its right-hand position under control of relay 714. The release of relay 732 interrupts the operating circuit of relay 715 and the locking circuit of relay 736 thus permits these relays to release.

The release of relay 727 connects ground to the tip of jack 701. This causes the operation of relay 829 in the cord circuit of the second switching station. The operation of relay 829 completes the operating circuit of relay 826. Relay 826 in operating completes the operating circuit of relay 919. Relay 919 in operating connects positive battery to the tip of plug 915. This in turn causes the operation of relay 1131. Relay 1131 in turn completes the circuit for the operation of relay 1135. The operation of relay 1135 completes a circuit for the operation of relay 1110. Relay 1110 in operating completes a locking circuit for relay 1135, interrupts the transmission circuit over lead 1112 and connects ground to the upper winding of relay 1108 for maintaining relay 1108 in its marking position under control of relay 1105.

The interruption of lead 1112 causes relays 1210 and 1212 to operate to their spacing positions and transmit a spacing condition over line 1203 to the third central station. Relay 1205 of repeater 1202 at the third switching station responds to this spacing condition by operating to its spacing position. This repeats the spacing condition to relays 1314 and 1306. Relay 1306 repeats the spacing condition over the ring of jack 1301.

Relay 1314 responds to the spacing condition by moving to its spacing position where it interrupts the circuit of upper winding of relay 1313. Approximately .2 of a second later, relay 1317 operates to its left-hand position where it completes a circuit for the operation of relay 1332 to its left-hand position. Relay 1332 in operating to its left-hand position completes a circuit for the operation of relay 1315. Relay 1315 in operating interrupts a circuit through the lower winding of relay 1306 and completes a circuit through the upper winding of relay 1317. Relay 1317 then operates to its right-hand position where it completes a circuit for the operation of relay 1336. Relay 1336 in operating completes a locking circuit for holding itself operated under control of relay 1332 and again interrupts the circuit through the upper winding of relay 1317.

Approximately .2 of a second later relay 1317 operates to its left-hand position where it now completes a circuit for the operation of relay 1334. Relay 1334 in operating interrupts the locking circuit of relay 1327. Relay 1327 in releasing causes relay 1329, 1334, and 1316 to release. The release of relay 1316 connects the upper winding of relay 1317 to the spacing contact of relay 1314 and thus causes relay 1317 to be maintained in its right-hand position under control of relay 1314. Relay 1316 in releasing causes relays 1332, 1315 and 1336 to release.

The release of relay 1327 connects ground to the tip of jack 1301. This in turn causes the operation of relay 1429. The operation of relay 1429 completes a circuit for the operation of relay 1426. Relay 1426 in operating completes a circuit for the operation of relay 1427 and also a circuit for lighting lamp 1400.

Returning now to the first switching station, the operator after holding the unattended key 218 operated for a short interval of time will release the key. This interrupts the operating circuit of relay 219 which then releases. The release of relay 219 disconnects positive battery from the tip of plug 315 and connects negative battery thereto from the break contacts of relay 319, left-hand winding of relay 320, winding of relay 321 through contacts of relays 304, 309, 219, 220 and 311.

When the positive battery is disconnected from the tip of jack 501 and negative battery connected thereto by the release of relay 219, relay 531 is operated to its right-hand position where it completes a circuit for the operation of relay 507 from ground through the armature and right-hand contacts of relay 531, lower operated contacts of relay 510 to battery through the winding of relay 507. The operation of relay 507 interrupts the upper winding of relay 508 whereupon relay 508 operates to its spacing position. Relay 508 in operating to its spacing position interrupts the circuit through the lower winding of relay 533 and completes a circuit through the upper winding of relay 533. Relay 535 is operated at this time so that the entire resistance 541 is connected in series with the bias winding of relay 533. The bias current is thus reduced so that the operating time of this relay is increased from the .3 second as described above. After this increased time interval, which in the preferred embodiment of this invention is over .4 of a second, relay 533 is operated to its right-hand position where it completes a circuit for the operation of relay 509 from battery through the winding of relay 509, the right-hand contact of relay 533 to ground through the inner upper operated contacts of relay 502. Relay 509 in operating interrupts the locking circuit of relay 535 thus permitting this relay to release relay 535. Relay 535 in releasing releases relay 510 and relay 510 in turn causes relay 507 to release. The release of relay 507 reestablishes a circuit through the upper winding of relay 508. Current flowing in this circuit causes relay 508 to be operated to its marking position. In its marking position relay 508 interrupts the circuit through the upper winding of relay 533 and again completes a circuit through the lower winding of this relay. This causes the relay 533 to operate to its left-hand position and where it interrupts the operating circuit of relay 509. The release of relays 507, 509 and 510 reestablishes the transmission circuit from the armature of relay 505 to the upper windings of relays 610 and 612. Current flowing in this circuit causes relays 610 and 612 to be operated to their marking positions where they repeat the marking conditions over line 603.

When the marking condition is received at the second switching station, relay 605 of repeater 602 repeats this marking condition to relay 714. Relay 714 responds to this marking condition and moves to its marking position. In operating to its marking position relay 714 interrupts the circuit through the upper winding of relay 717. Relay 714 in operating to its operating position at this time also completes a circuit for the operation of relay 730. Relay 730 in operating interrupts the locking circuit of relay 728 and thus permits relay 728 to release. Approximately .2 of a second after relay 714 interrupts the circuit through the upper winding of relay 717, relay 717 operates to its left-hand position where it completes a circuit for the operation of relay 727. Relay 727 in operating completes a circuit for the operation of relay 728. Relay 727 in operating also completes an obvious circuit for the operation of relay 729. Relay 729 in operating interrupts the operating circuit of relay 730 thus allowing this relay to release. Relay 729 in operating also completes a circuit through the upper winding of relay 717 which causes relay 717 to be operated to its right-hand position where it completes a circuit for the operation of relay 716. Operation of relay 716 connects the upper winding of relay 717 to the marking contacts of relay 714. Thus relay 717 is held in its right-hand position under control of relay 714.

The operation of relay 727 disconnects ground from the tip of jack 701 and connects negative battery thereto. This causes relay 829 to release but relay 834 remains operated at this time. Release of relay 829 interrupts the operating circuit of relay 826 whereupon relay 826 releases. The release of relay 826 causes the relay 919 to release and the release of relay 919 in turn disconnects positive battery from the tip of plug 915 and connects negative battery thereto. When positive battery is disconnected from the tip of plug 915 and the tip of jack 1101 and negative battery connected thereto, relay 1131 is operated to its right-hand position where it complete a circuit for the operation of relay 1107.

The operation of relay 1107 interrupts the circuit through the upper winding of relay 1108. Relay 1108 is then operated to its spacing position. Relay 1135 is operated at this time so that the bias current flowing through the upper winding of relay 1133 is reduced. Consequently it now requires a longer time interval for relay 1133 to move to its right-hand position. At the end of this interval which is over .4 of a second later, relay 1133 is operated to its right-hand position where it completes a circuit for the operation of relay 1109. The operation of relay 1109 interrupts the locking circuit of relay 1135 causing relay 1135 to release. The release of relay 1135 causes the release of relays 1110 and 1107. The release of relay 1107 reestablishes a circuit through the upper winding of relay 1108 from the marking contacts of relay 1105. Relay 1108 operates to its marking position in this circuit and causes relay 1133 to be operated to its left-hand position. The operation of relay 1133 to its left-hand position interrupts the operating circuit of relay 1109. The release of relays 1109, 1110 and 1107 reestablishes the transmission circuit from the marking contacts and armature of relay 1105 to the upper windings of relays 1210 and 1212 of repeater 1201. Relays 1210 and 1212 are operated to their marking position and repeat a marking signal over line 1203 to the third switching station. The receiving relay 1205 of repeater 1202 repeats the marking signal over the line 1313 to relay 1314. Relay 1314 responds to this marking signal by moving to its marking position. In operating to its marking position relay 1314 completes a circuit for the operation of relay 1330. The operation of relay 1330 interrupts the locking circuit of relay 1328 thus permitting relay 1328 to release.

The operation of relay 1314 to its marking position interrupts the circuit through the upper winding of relay 1317. Approximately .2 of a second later relay 1317 operates to its left-hand position where it completes a circuit for the operation of relay 1327.

Relay 1327 in operating completes circuits for the operation of relays 1328 and 1329. The operation of relay 1329 interrupts the operating circuit of relay 1330 and permits this relay to release. The operation of relay 1329 completes a circuit through the upper winding of relay 1317 which causes this relay to operate to its right-hand position. In its right-hand position relay 1317 now completes a circuit for the operation of relay 1316. The operation of relay 1316 connects the upper winding of relay 1317 to the marking contact of relay 1314. This provides a circuit for holding relay 1317 in its right-hand position under control of relay 1314.

The operation of relay 1327 disconnects ground from the tip of jack 1301 and connects negative battery thereto. This causes relay 1429 to release and in turn release relay 1426. The release of relay 1426 disconnects the ground from the break contacts of relay 1516 from lamp 1400 and connects interrupted ground from interruptor 1617 to lamp 1400 through the right-hand operated contacts of relay 1427, and left-hand break contacts of relay 1426. This interrupted ground causes lamp 1400 to flash and indicates to the operator at the third switching station that the operator at the first switching stations wishes to recall her. The operator at the third switching station will then operate her typing key 1424 to connect her position equipment, including her teletypewriter to the circuit. The operator at the third switching station can then communicate to the operator at the first switching station or any of the other operators or subscribers and determine what additional service is required. The operation of the teletypewriter key 1424 causes the operation of relays 1421, 1422 and 1423 as described above. The operation of these relays interrupts the locking circuit of relay 1427 and permits this relay to release. The release of relay 1427 disconnects the interrupted ground from lamp 1400 thus extinguishing this lamp.

While the first operator is the only operator who will normally recall the third operator the second operator may under unusual circumstances or trouble conditions recall either the first operator or the third operator by operating her unattended key either by itself or in combination with splitting keys. Similarly, under unusual circumstances or trouble conditions the third operator may recall the first operator in a similar manner.

*Unattended service*

In case the called subscriber does not answer, unattended service may be furnished to him whereby the calling subscriber may leave any message he desires. To accomplish this it is necessary for some one of the operators to start the called subscriber's motor. In other words, in the specific system shown in the drawings it is necessary for the motor 1702 at the subscriber's station shown in Fig. 17 to be started and relay 1704 operated.

This service may be furnished in a number of different ways. For example, the operator at the first switching station, upon observing that the call lamp 300 remains lighted for an unreasonably long period of time, may recall the third operator, or the first operator may transmit a disconnect signal to the operator at the second and third switching stations and they will disconnect the circuit. Thereupon the operator at the first switching station may again attempt to establish a communication circuit over the same lines or other similar lines and when the operator at the third switching station answers the first operator, the first operator may inform the third switching operator that unattended service is desired and that the third switching operator should immediately start the called subscriber's motor. To accomplish this the operator at the third switching station will operate the unattended key as soon as she has inserted plug 1515 into jack 1730. As described above when the third switching operator inserts plug 1515 into jack 1730, relays 1711, 1712 and 1718 are operated. The operation of relay 1718 connects ground through the winding of relay 1724 to the tip of jack 1730. Then the operator operates the unattended key 1418. This causes relay 1419 to operate and connect positive battery to the tip of plug 1515. This positive battery causes current to flow through the tip of jack 1730 and through the winding of relay 1724 to ground through the operated contacts of relay 1718. This current flows in such a direction as to cause relay 1724 to be operated to its right-hand position. Relay 1724, in operating to its right-hand position, completes a circuit from positive battery through the right-hand contacts and armature of relay 1724, upper winding of relay 1712, upper operated contacts of relay 1711, conductor 1716, polarized relay 1736, lower break contacts of key 1737, upper winding of relay 1707, break contacts 1715, contacts 1700 of the transmitting device and upper break contacts of key 1737 to ground through the upper break contacts of relay 1704. Current flowing in this circuit is in such a direction as to cause relay 1736 to operate to its right-hand position. Relay 1736, in operating to its right-hand position, completes a circuit from source of power 1703, winding of relay 1705, contacts of relay 1736 back to the other terminal of source of power 1703, causing relay 1705 to operate. The operation of relay 1705 connects source 1703 to motor 1702 and to relay 1704 in the same manner as if start key 1738 had been operated, thus starting the equipment at the subscriber's station shown in Fig. 17. When relay 1704 operates, relay 1712 releases and interrupts the operating circuit of relay 1713 which in turn releases. This interrupts the operating circuit of relay 1724 and relay 1724 thereupon releases. The release of relay 1718 also causes relays 1520 and 1521 to release and transmit a signal back to the first switching operator as described herein when the subscriber at station 17 answers.

The operator at the third switching station will ordinarily only momentarily operate the unattended start key 1418. Usually this operator will be instructed to monitor on the circuit for a short interval of time after she has operated the unattended key 1418 to insure that the subscriber's motor and equipment shown in Fig. 17 has been started and energized. In case the subscriber's motor did not start she may communicate with the first operator and again attempt to start the subscriber's station equipment shown in Fig. 17.

In case it is desired to have the originating operator, that is the operator at the first switching station, start the subscriber's motor, it is necessary to provide the subscriber's station with additional remote starting equipment which is operated by ringing current. This additional equipment is illustrated in Fig. 17 by relays 1748 and 1749. Relay 1748 is connected in series with condenser 1747 and this series combination connected in parallel with ringer 1708 and its associated condenser 1742. Thus every time ringer 1708 is operated relay 1748 is also operated. Relay 1748 in operating completes an obvious circuit for the operation of relay 1749 from the source of power 1703. Relay 1749, however, is a slow operate relay which requires, in the preferred embodiment of this invention, a time interval in the neighborhood of approximately six seconds to operate. When the subscriber's station is so equipped it is possible for the operator at the first switching station to start the subscriber's motor at the subscriber's station shown in Fig. 17. In this case the operator operates ringing key 217 and maintains it operated for a period in excess of six seconds and usually about ten seconds. During this time ringing current is transmitted over the ring of plug 315 over the trunk circuits to the second and third switching stations as described above when the operator at the first switching station first starts the application of ringing current to the line extending to the subscriber's station circuit shown in Fig. 17. Inasmuch as the operator holds key 217 operated for an interval of time from six to ten seconds, ringing current is continuously applied to the subscriber's line for this interval of time. Consequently, relay 1748 continuously maintains the circuit of relay 1749 during this period so that relay 1749 will operate. Relay 1749, in operating, completes a circuit from source of power 1703 for operating relay 1705. The operation of relay 1705 completes a circuit for the operation of relay 1704 and for the energization of motor 1702, thus causing the equipment at the subscriber's station to start and become energized. At the end of this time interval the operator will release ringing key 217 which in turn disconnects ringing current from the trunk circuits extending to the second and third switching stations and also from the line circuit extending to the subscriber's station shown in Fig. 17. Then a short interval of time thereafter the ring guard lamp 301 will be extinguished in the same manner described above when the called subscriber answers, provided, of course, the called subscriber's motor and station equipment have started and become energized. If they did not start, lamp 301 will not be extinguished and the operator can again attempt to start them by again holding key 217 operated for an interval of time exceeding six to ten seconds. When lamp 301 eventually is extinguished, due to the starting of the subscriber's station circuit shown in Fig. 17, the operator will instruct the calling subscriber that the called subscriber's station has become energized and ready to receive any message the calling subscriber may care to leave.

In case relays 1748 and 1749 and condenser 1747 are provided, the operator at the third switching station may also remotely start the subscriber's station equipment by operating her ringing key 1417 and holding it operated for an interval of time which exceeds six seconds, when the equipment at the subscriber's station will be operated as above. It should also be noted that both remote start relay 1736 and remote start equipment comprising relays 1748, 1749 and condenser 1747 may be both provided if it is so desired. However, if the equipment comprising relays 1748 and 1749 is provided it is unnecessary to provide the remote start relay 1736 since unattended service may be provided from either the local operator or the distant operator. Usually only one or the other of these remote starting equipments will be provided at any given subscriber's station.

In case a subscriber's station equipment is started by an operator at one of the switching stations it will be necessary for either the subscriber located at the station shown in Fig. 1 or one of the operators to transmit the signals required to operate the automatic stop contacts 1739 to deenergize the subscriber's equipment shown in Fig. 17.

As pointed out above it is within the scope of this invention to build up a connection through any number of switching stations necessary to connect a calling subscriber's station with the called subscriber's station. As many additional intermediate switching stations may be interposed between the first and last switching station as are necessary and the circuits will operate at each of these additional switching stations in the same manner as the circuits described at the second switching station. Also, the circuits will work equally well if only two switching stations are involved in the connection.

In order to simplify the description and more clearly show the principles of this invention the switching circuits and in particular the same cord circuit have been employed at each of the switching stations. It is to be understood however that it is within the scope of this invention to employ different cord circuits at the different switching stations and to employ cord circuits at each of the respective stations which function substantially the same when cooperating with trunk circuits in accordance with this invention as when cooperating with local subscribers' lines terminating at the respective switching stations.

It is also within the scope of this invention to employ trunk circuits in combination with automatic or semiautomatic machine switching at any of the switching stations.

The slight modifications of the local circuits at each end of the trunk circuit necessary to adapt it to the particular switching system with which it cooperates will readily appear to those skilled in the art and need not be described in detail.

What is claimed is:

1. A telegraph system comprising a first central station, a second central station, a trunk circuit interconnecting said stations capable of transmitting only two signal conditions, means at said central stations for transmitting and responding to at least three supervisory signals transmitted over said trunk comprising relay circuits for transmitting a series of impulses alternating in character over said trunk to indicate one of said supervisory signaling conditions.

2. In a telegraph switching system comprising at least two central exchanges, a trunk circuit extending between said stations comprising a full duplex channel capable of transmitting only two different signaling conditions in each direction over said trunk, terminal relay equipment connected to each end of said trunk comprising means for transmitting calling signals, disconnect signals, break signals and ringing current which includes means for transmitting a series of impulses of alternate character of substantially unit length representing ringing current and an impulse of one character of a predetermined length followed by a series of alternately different impulses representing break signals.

3. A telegraph system comprising two main stations, a trunk circuit extending between said main stations capable of transmitting two signaling conditions over said trunk in both directions simultaneously, means for transmitting supervisory signals which comprise long impulses of both of said signaling conditions, means for transmitting other supervisory signals which comprise a series of impulses of alternate character of substantially unit length and still other means for transmitting signaling conditions comprising an impulse of one character of predetermined duration followed by a series of impulses of alternate marking and spacing character of substantially unit length.

4. In a telegraph system comprising at least two central stations, a trunk circuit extending between said stations, local subscriber stations connected to each of said central stations, means for transmitting break signals from said subscriber stations to said central stations, means for transmitting the beginning of each break signal over said trunk circuit, and means for interrupting the transmission of said break signal over said trunk circuit and replacing it with a series of impulses of alternate character of substantially unit length at the first switching station, and means at said switching station receiving said series of impulses and transmitting a break signal to the subscriber's station connected to said trunk circuit during the reception of said series of impulses.

5. In a communication system, a switching station, a plurality of communication lines terminating at said station, apparatus in said station for manually interconnecting said lines including means for receiving disconnect signals from the lines to which said apparatus is connected, and disconnecting instrumentalities controlled by said receiving means for restoring said communication lines to normal even when said apparatus is connected thereto.

6. In a telegraph system operating with direct current pulses employed for the communication of intelligence, a plurality of telegraph lines, a switching station at which said lines terminate, a manually operated link circuit for interconnecting two of said lines, a signal device at said station to indicate a disconnect condition received over one of said lines when connected to said link circuit, means for operating said signal device in response to a disconnect condition and devices controlled by reception of said disconnect condition over two lines connected to a link circuit to render said lines available for use with another link circuit although still connected to a first link circuit.

7. A communication system comprising two stations, a communication circuit extending between said stations, means for applying two signaling conditions to each end of said circuit, receiving apparatus connected to each end of said circuit for responding to the signaling conditions applied thereto, supervisory equipment connected to at least one end of said circuit comprising means responsive to long signaling impulses of at least one of said signaling conditions, other supervisory means responsive to a series of alternate impulses of substantially equal length of said signaling conditions, and still other supervisory means responsive to an impulse of one of said signaling conditions for a predetermined duration of time followed by a series of alternate impulses of equal length of said signaling conditions.

8. A communication system comprising two main stations, a trunk circuit extending between said main stations, means for applying two signaling conditions to each end of said trunk circuit, means responsive to the application of one of said signaling conditions thereto for a predetermined interval of time for automatically applying a series of alternate impulses of said two signaling conditions to said trunk circuit.

9. In a communication system, two main stations, a trunk circuit extending between said stations, a subscriber's station associated with each of said main stations, a subscriber's line extending between each of said subscriber's stations and its respective main station, interconnecting means at said main stations for connecting said subscribers' lines to said trunk circuit, means at said subscribers' stations for transmitting two signaling conditions over said line circuits, means at said central stations for repeating said signaling conditions to said trunk circuit, and means at said central station responsive to the application of one of said signaling conditions to said subscribers' line circuit which exceeds a predetermined interval of time for automatically applying said two signaling conditions to said trunk circuit alternately for substantially equal periods of time.

10. A communication system comprising two main stations, a trunk circuit extending between said main stations, means for applying only two signaling conditions to each end of said trunk circuit, receiving apparatus connected to each end of said trunk circuit for responding to the signaling conditions applied thereto, a transmission circuit connected to each end of said trunk circuit, supervisory equipment also connected to each end of said trunk circuit comprising means responsive to the application of one signaling condition to said transmission circuit which exceeds a predetermined interval of time for applying said signaling conditions to said trunk circuit alternately.

11. A telegraph system comprising two main stations, a trunk circuit extending between said stations, means for applying only two signaling conditions to each end of said trunk circuit, receiving apparatus connected to each end of said trunk circuit for responding to the signaling conditions applied to the opposite end thereof, supervisory equipment at at least one end of said trunk circuit controlled by said receiving apparatus comprising signaling means responsive to long impulses of one of said signaling conditions applied to the opposite end of said trunk, other supervisory equipment responsive to the application of one of said signaling conditions for a predetermined interval of time followed by a series of alternate impulses of said signaling conditions for disabling said first-mentioned supervisory signaling means.

JOSEPH A. KRECEK.